Dec. 26, 1961  G. E. FLINN  3,014,383
TRANSMISSIONS
Filed Nov. 26, 1956  10 Sheets-Sheet 1
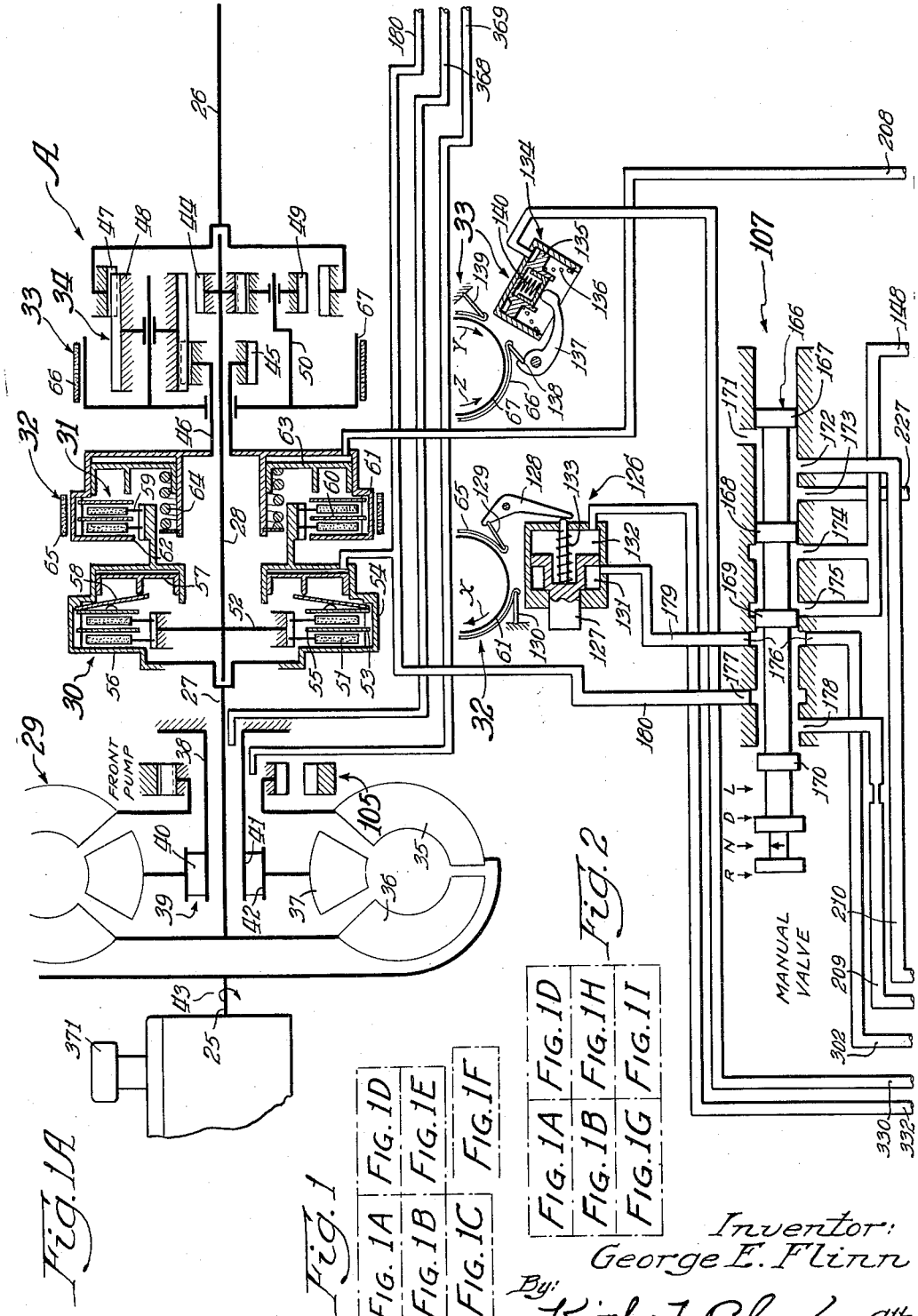
Inventor:
George E. Flinn
By:  Atty.

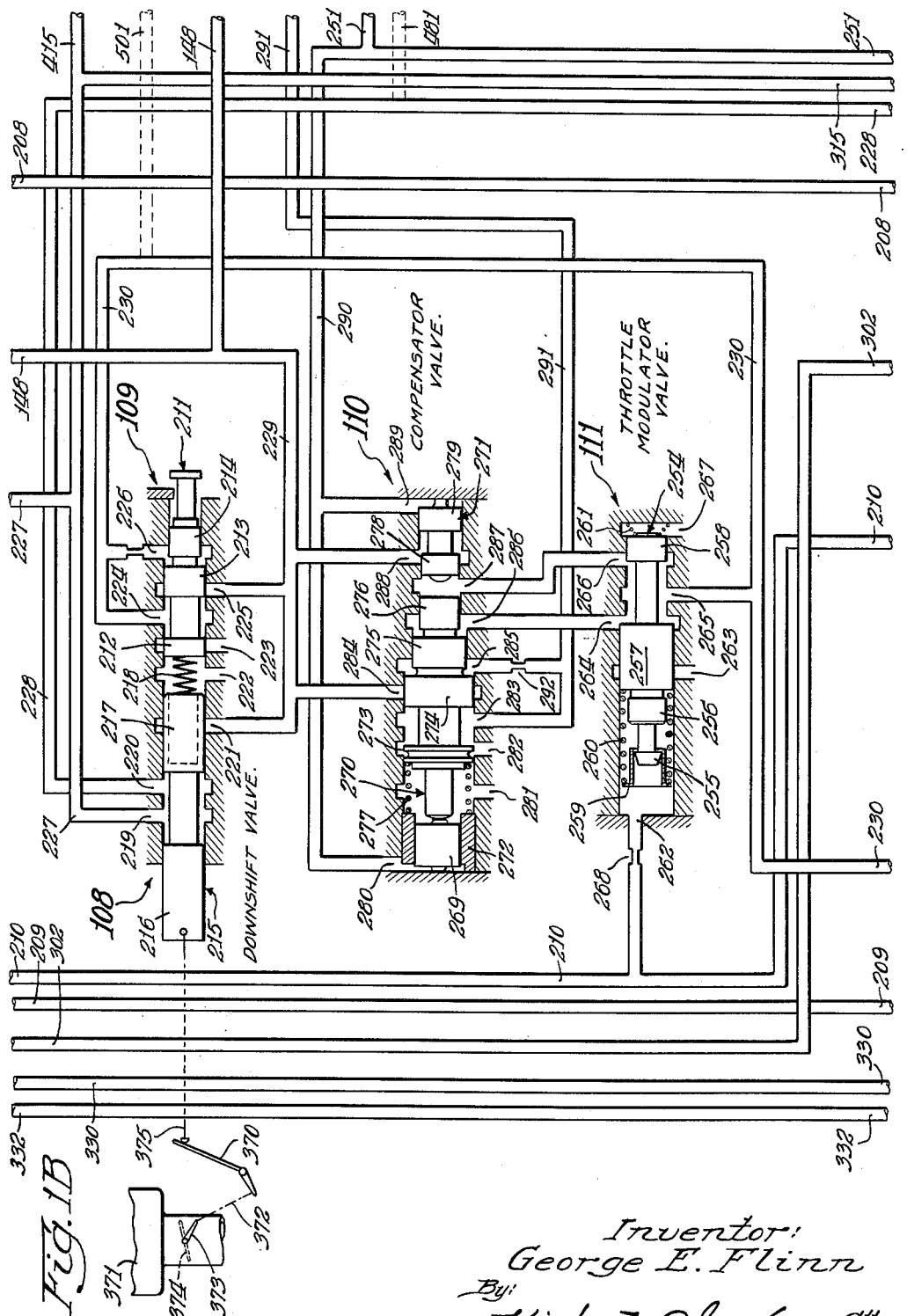

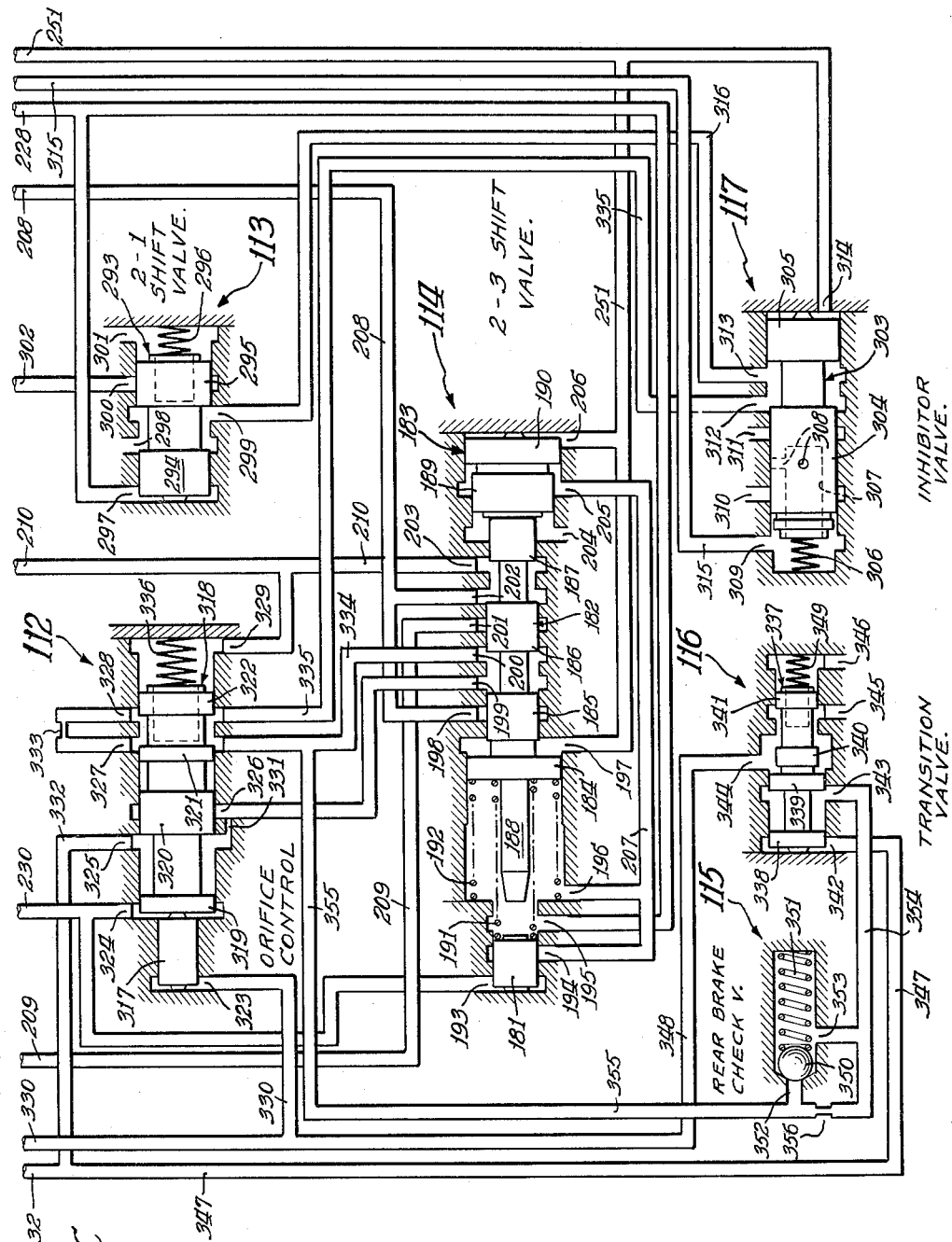

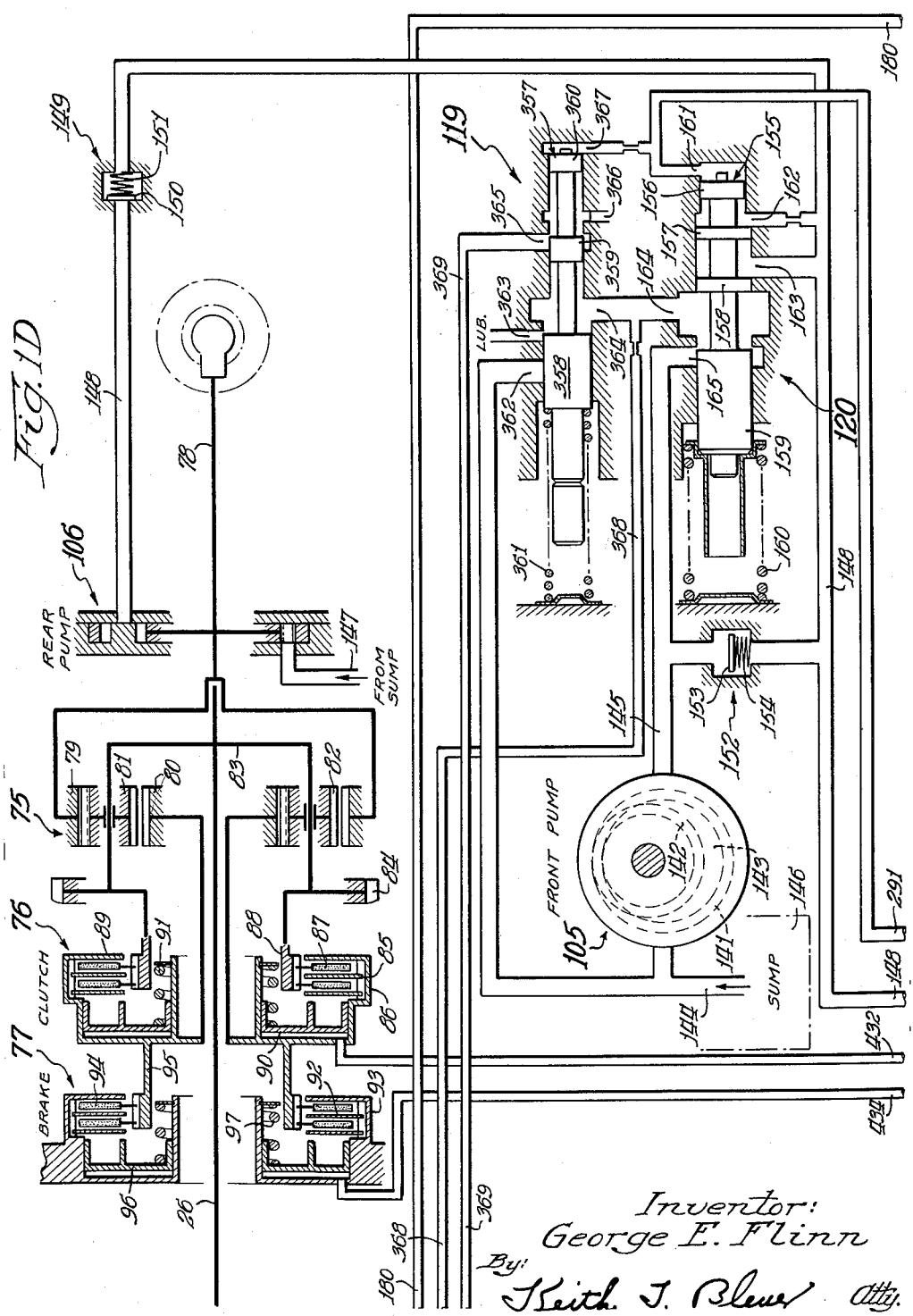

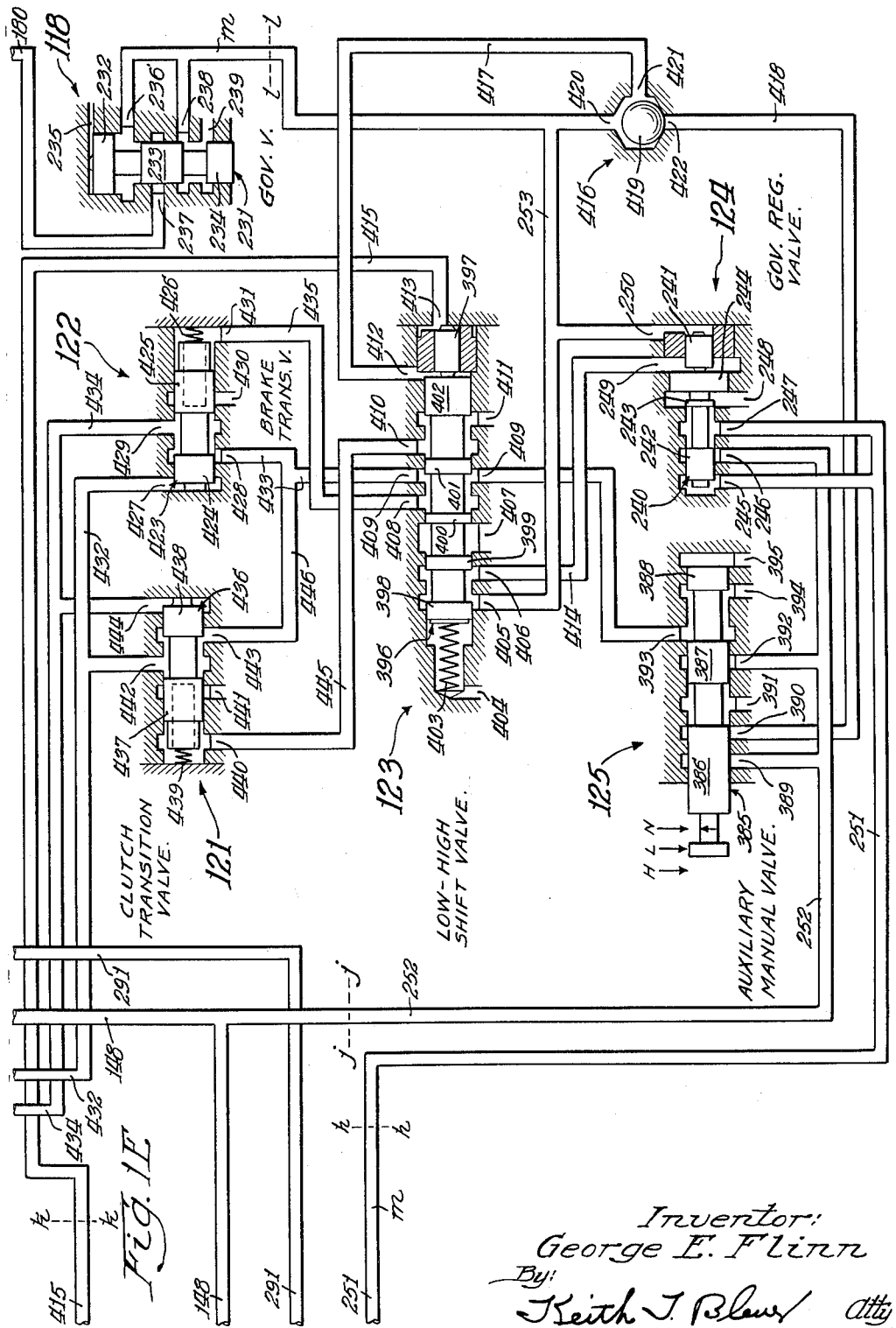

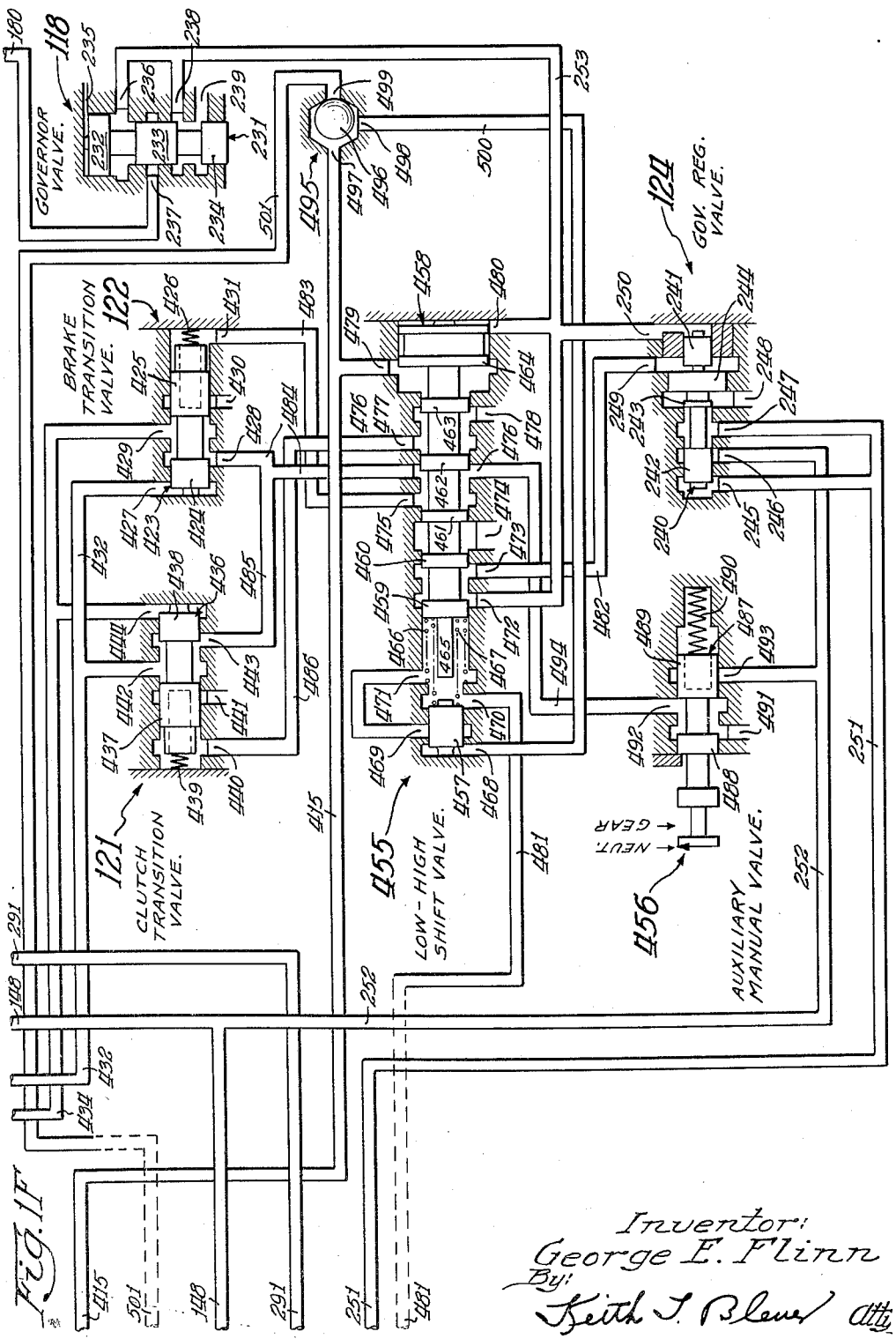

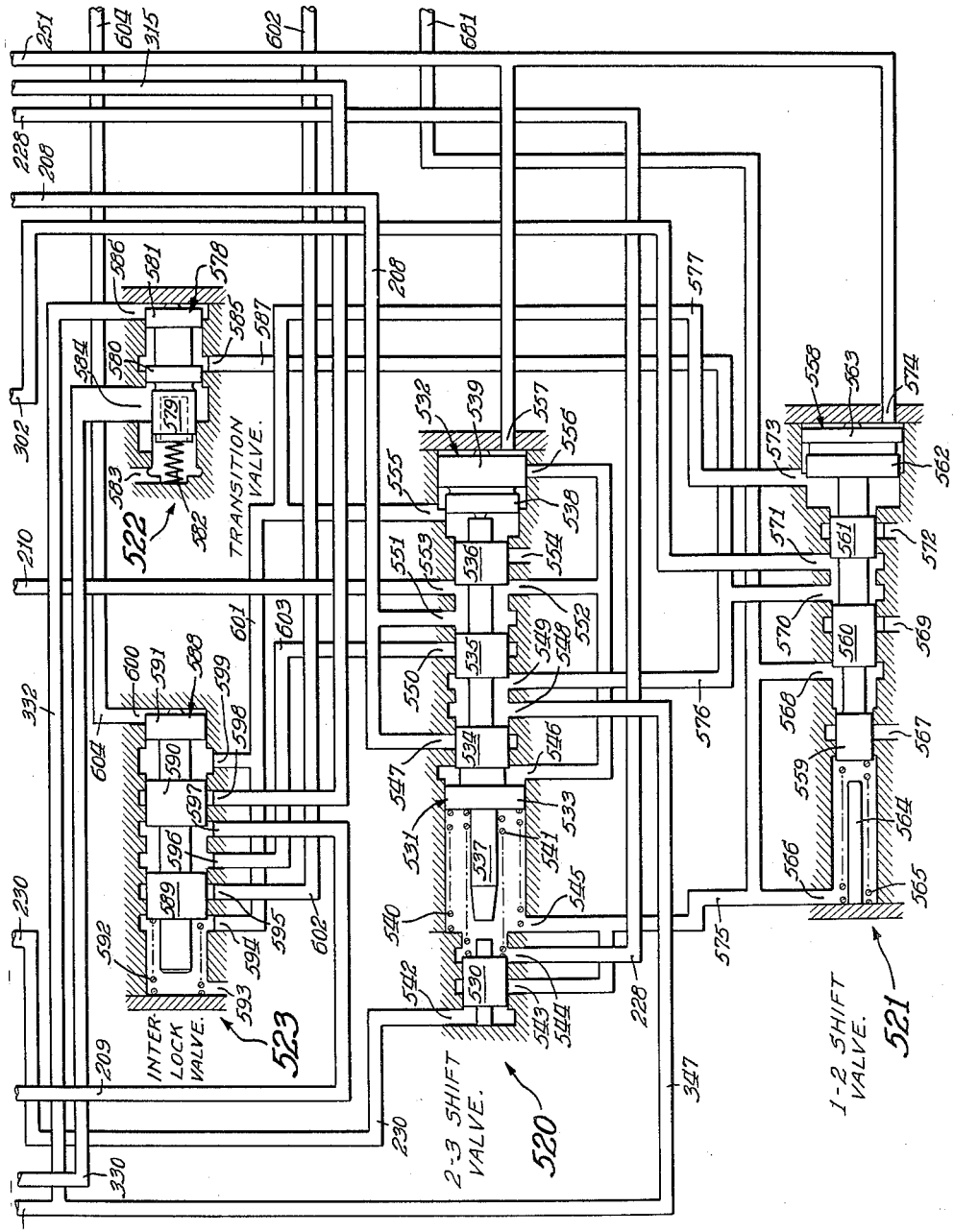

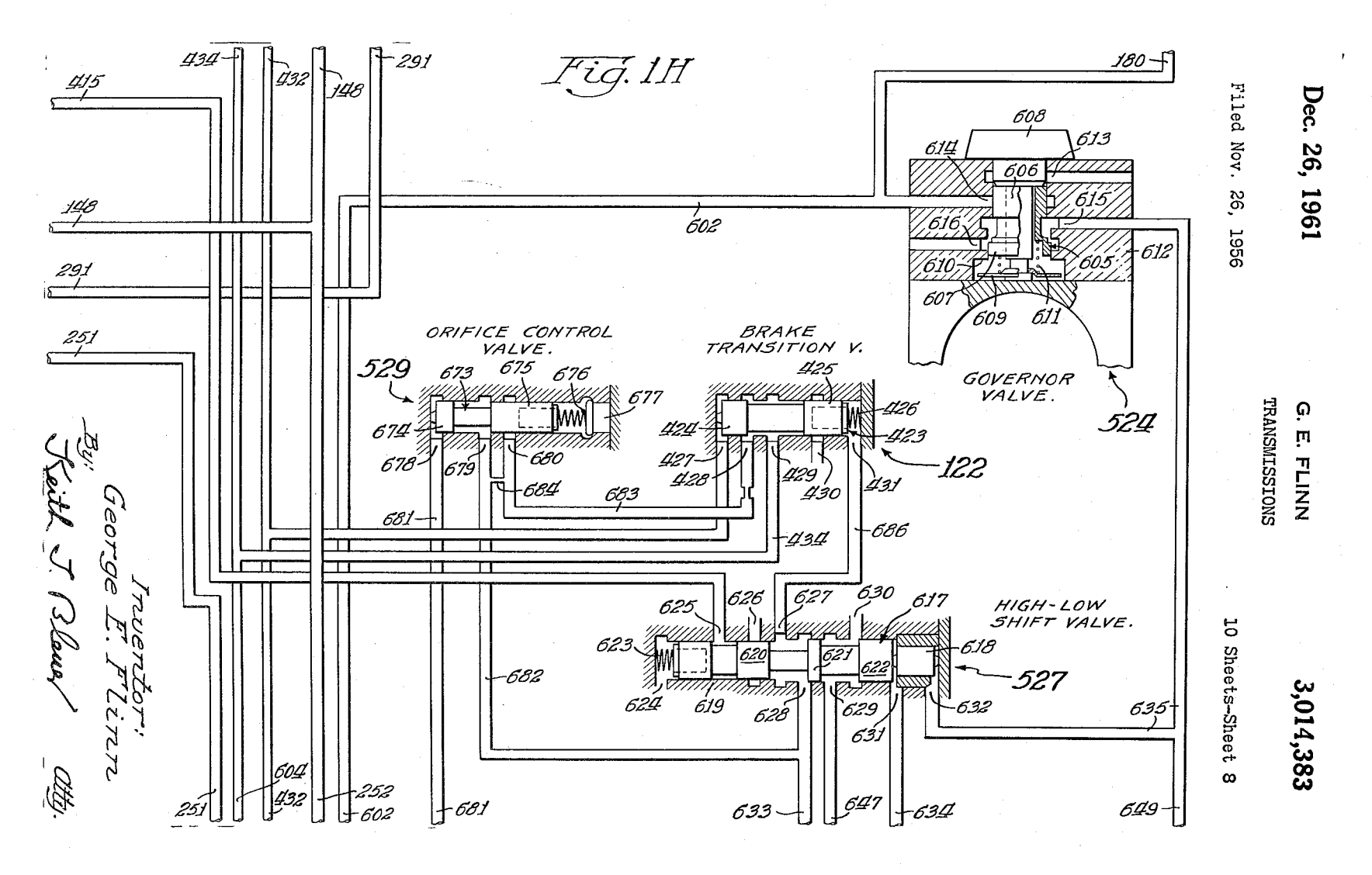

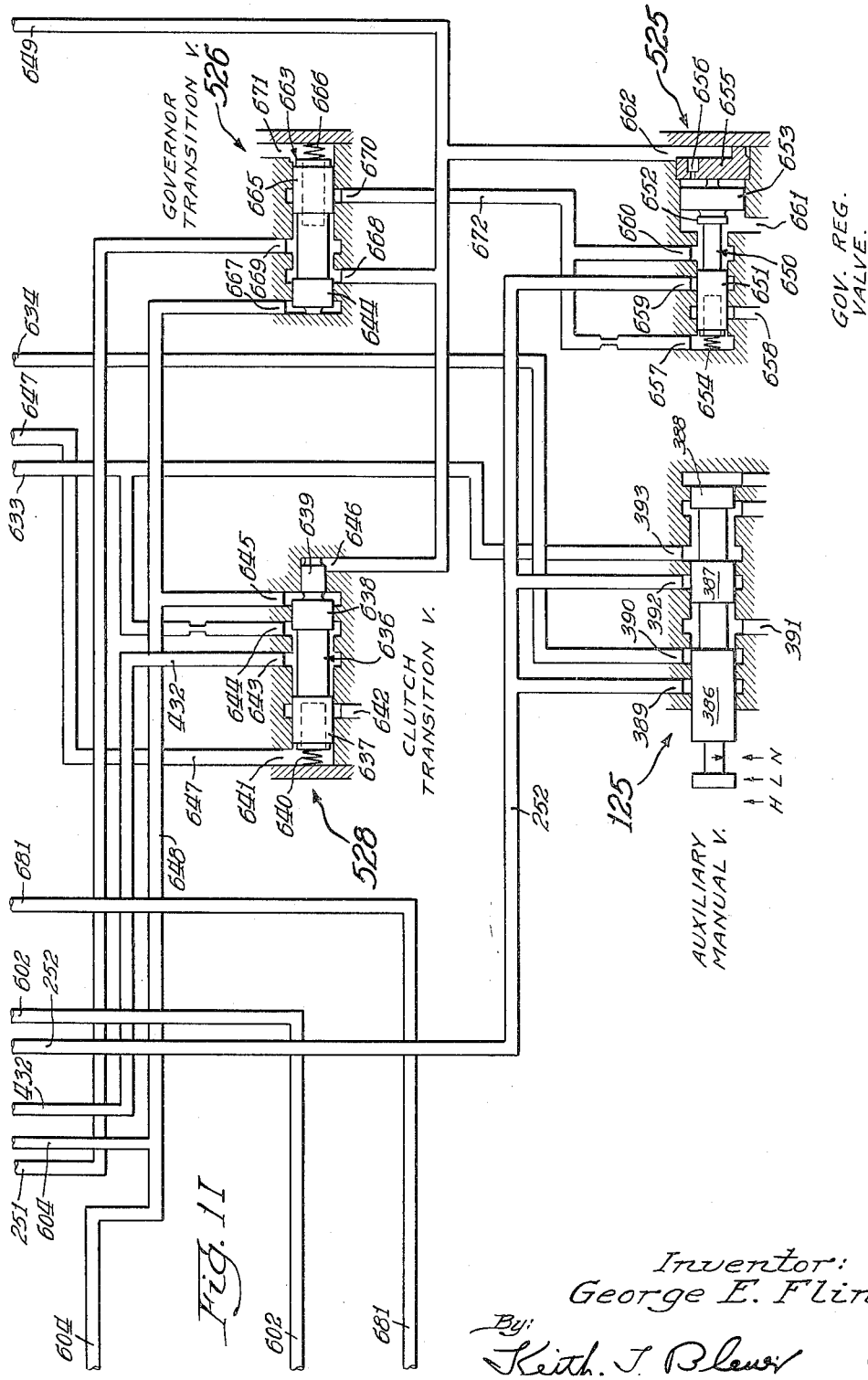

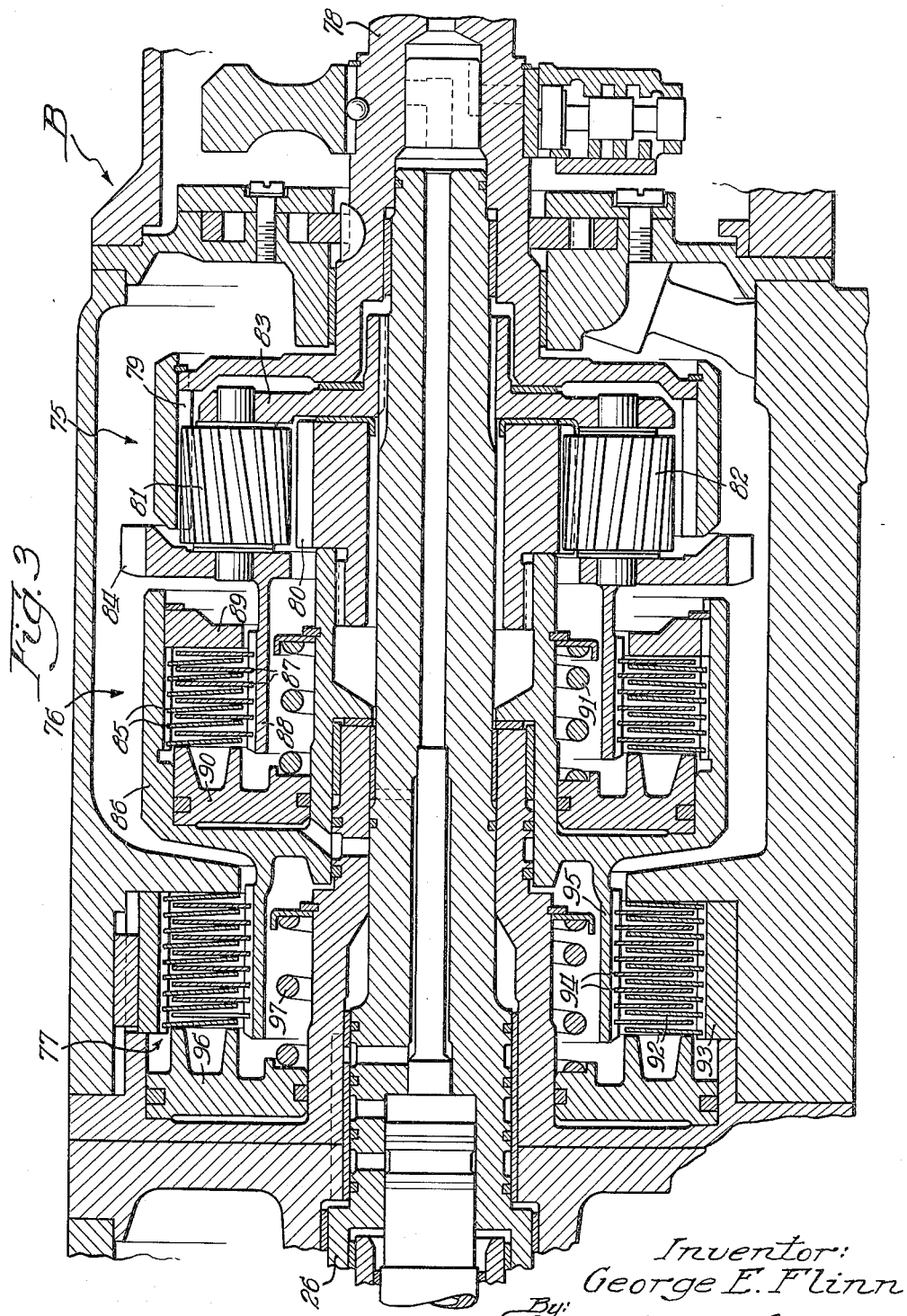

United States Patent Office 3,014,383
Patented Dec. 26, 1961

3,014,383
TRANSMISSIONS
George E. Flinn, Muncie, Ind., assignor to Borg-Warner Corporation, Chicago, Ill., a corporation of Illinois
Filed Nov. 26, 1956, Ser. No. 624,240
20 Claims. (Cl. 74—645)

My invention relates to transmissions and more specifically to transmissions particularly suitable for use in heavy automotive vehicles such as trucks.

It is an object of my invention to provide an improved transmission comprising a main unit connected to be driven from the vehicle engine and an auxiliary unit connected to be driven from the main unit. It is contemplated that both of these units shall be hydraulically controlled and that the main unit shall be automatically controlled in accordance with the speed of the vehicle and that the auxiliary unit may be either manually controlled to be in its various speed ratios or automatically controlled, also in accordance with the speed of the vehicle. Preferably, the main unit is under the control of a manually operated valve for operating the main unit in various speed ranges and drives and the auxiliary unit is under the control of another manually operated valve which may be so arranged as to complete the various drives through the auxiliary unit at the will of the operator or else may be arranged to condition the auxiliary unit for automatic operation.

The controlling mechanism for the main gear unit preferably includes a fluid pressure shifted valve for changing the main unit between various speed ratios, and it is an object of the present invention to provide a hydraulic governor driven by the driven shaft of the auxiliary unit providing an output fluid pressure that varies with the speed of this shaft and to provide valve mechanism effectively between the governor and the shift valve for the main gearing unit which varies the governor pressure as applied to the shift valve in accordance with the speed ratio of the auxiliary gear unit. More specifically, it is an object to so arrange the valve mechanism that the governor pressure as applied to the shift valve for the main gearing unit is raised when the auxiliary gear unit is in a low, reduced speed drive, so that the shift valve for the main gear unit is effectively controlled by a governor pressure that varies with the speed of the drive shaft of the auxiliary gear unit instead of its driven shaft.

It is another object of the invention to provide a fluid pressure engaged brake and a fluid pressure engaged clutch in the auxiliary unit for respectively completing a low, reduced speed drive and a direct drive through the auxiliary gearing unit and to provide valve mechanism in connection with the brake and clutch, so that when fluid pressure is applied to one or the other of the brake and clutch, the pressure of engagement must increase to a predetermined value before disapplication of the other is initiated so as to provide a predetermined overlap of engagement between the brake and clutch.

It is another object of the invention to provide a so-called low-high shift valve for controlling fluid pressure application to the brake and clutch of the auxiliary unit and to interconnect the low-high shift valve with a so-called governor regulator valve for providing a higher governor pressure for the low speed drive in the auxiliary unit and a lower governor pressure for the high speed drive in the auxiliary unit, with the low-high shift valve being under the control of the manual valve for the main gearing unit so that the low-high shift valve is moved to its direct drive position when the manual valve for the main gear unit is in a low range position providing a low ratio drive through the main gear unit, the low-high shift valve thus assuring that the auxiliary unit is at this time in its direct drive.

It is another object of the invention to provide an embodiment of hydraulic controls in connection with both the main gear unit and also the auxiliary gear unit which includes an automatic shift valve for each of the units for shifting the respective unit from a lower to a higher speed ratio drive, with both of the shift valves being under the control of a hydraulic governor driven from the driven shaft of the auxiliary unit, the arrangement preferably being such that the shift valve for the main gear unit is shifted from a low speed drive position to a high speed drive position prior to the shift valve for the auxiliary unit. It is contemplated that the cooperation between the shift valve for the auxiliary unit and the valve mechanism hereinbefore mentioned in connection with the hydraulic governor shall be such that when the shift valve for the auxiliary unit moves into its high speed drive position, the governor pressure applied to the shift valve for the main gear unit shall be so increased that the main unit shall be shifted back into its low speed drive condition simultaneously with the upshift in the auxiliary gear unit.

It is also an object of the invention to provide, in connection with the auxiliary gear unit and its hydraulic controls, hydraulic controlling mechanism for the main gear unit which in one embodiment upshifts the main gear unit from a low to an intermediate and finally to a high speed drive as the vehicle speed increases and in another embodiment upshifts the main gear unit from its intermediate speed drive as a starting ratio to its high speed ratio, the low speed drive being obtained for starting the vehicle at the will of the operator by moving the vehicle accelerator to an open throttle kickdown position.

It is an object of the invention to arrange the valve mechanism which has been hereinbefore mentioned in connection with the hydraulic governor for changing the governor pressure as applied to the hydraulic controls for the main gear unit with a change in drive to the auxiliary unit, to comprise a so-called governor regulator valve providing multiplied governor pressure and a so-called governor transition valve under the control of the fluid pressure applied to one of the engaging devices of the auxiliary unit for either directly connecting the hydraulic governor with the automatic hydraulic controls for the main gear unit or for connecting the hydraulic controls for the main unit with the multiplied governor pressure supplied by the governor regulator valve.

It is an object of the invention to provide, in connection with the hydraulically engaged brake of the auxiliary unit, an orifice valve that is under the control of the vehicle accelerator so as to provide an orifice in series with the brake for cushioning its engagement when the vehicle accelerator is in a relatively closed throttle position. It is also an object to provide a valve for disengaging the clutch of the auxiliary unit by draining the clutch which is under the control of the hydraulic governor driven by the driven shaft of the auxiliary unit, so that the hydraulic conduit to the clutch is drained sooner on a downshift in the auxiliary unit with higher vehicle speeds and the brake engagement pressure of the auxiliary unit brake need build up to a lower value with higher vehicle speeds than otherwise.

In connection with the main gear unit, it is an object to provide an embodiment of hydraulic controls having an automatic shift valve for automatically upshifting from low to second speed ratio and an automatic shift valve for subsequently upshifting from second speed ratio to direct ratio and to provide interlock valve mechanism under the control of fluid pressure applied to the low speed drive brake for the auxiliary unit for applying fluid pressures on these two automatic shift valves for maintaining them in their downshifted positions once they reach these positions when the auxiliary unit brake is engaged.

The invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

FIG. 1 is a diagram illustrating the manner in which a complete diagram of one embodiment of the hydraulic transmission controls of the invention may be formed by placing FIGS. 1A, 1B, 1C, 1D and 1E together and also illustrating how a full diagram of a second embodiment of the invention may be formed by placing FIGS. 1A, 1B, 1C, 1D and 1F together, with FIG. 1F taking the place of FIG. 1E;

FIGS. 1A, 1B, 1C, 1D, 1E and 1F are diagrams of portions of the hydraulic control systems of the invention;

FIG. 2 is a diagram showing how FIGS. 1A, 1B, 1G, 1D, 1H and 1I may be placed together in order to form a diagram of a third embodiment of the invention;

FIGS. 1G, 1H and 1I are diagrams of portions of the third embodiment of the invention; and FIG. 3 is a longitudinal, sectional view of an auxiliary gear unit adapted to be under the control of the controlling mechanism illustrated in FIGS. 1A, 1B, 1C, 1D, 1E, 1F, 1G, 1H and 1I.

Like characters of reference designate like parts in the several views.

The illustrated transmission comprises a main transmission unit A and an auxiliary reduction unit B connected in tandem with and behind the main unit A. The main transmission unit may be seen to comprise a drive shaft 25, a driven shaft 26, and intermediate shafts 27 and 28. The shaft 25 may be the usual crankshaft of the vehicle engine, and the shaft 26 forms the input shaft of the auxiliary unit B. The shafts 27 and 28 are in effect piloted with respect to the shafts 25 and 26. The main transmission unit A comprises, in general, a hydraulic torque converter 29, hydraulically operated friction clutches 30 and 31, hydraulically operated friction brakes 32 and 33 and a planetary gear set 34.

The hydraulic torque converter 29 comprises a vaned impeller element 35, a vaned rotor or driven element 36 and a vaned stator or reaction element 37. The impeller 35 is driven from the drive shaft 25, and the rotor 36 is fixed to the intermediate shaft 27. The stator 37 is rotatably disposed on a stationary sleeve 38, and a one-way brake 39 is disposed between the stator and the sleeve 38. The one-way brake 39 may be of any suitable construction, and, in the illustrated embodiment, comprises a plurality of tiltable sprags 40 disposed between an inner race surface 41 fixed with respect to the sleeve 38 and an outer race surface 42 fixed with respect to the stator 37. The one-way brake 39 is so arranged as to allow a free rotation of the stator 37 in the forward direction, that is, in the same direction in which the drive shaft rotates and which is indicated by the arrow 43, and prevents a rotation of the stator in the reverse direction.

The torque converter 29 functions in a manner well-known for such torque converters for driving the rotor or driven element 36 at an increased torque with respect to the torque impressed on the impeller 35 of the converter. The vanes of the stator 37 function to change the direction of flow of fluid between the rotor and impeller so as to provide this increased torque on the driven element 36. In this case, the reaction on the stator 37 is in the direction reverse to the rotation of the drive shaft 25, so that the one-way brake 39 engages and prevents rotation of the stator in this direction. When the speed of the driven element or rotor 36 reaches a predetermined value, the reaction on the vanes of the stator 37 changes in direction, tending to rotate the stator in the forward direction, and the brake 39 releases and allows such rotation of the stator. In this case, the torque converter 29 functions as a simple fluid coupling to drive the rotor 36 at substantially the same speed and with no increase in torque with respect to the impeller 35.

The planetary gear set 34 comprises a sun gear 44 which is fixed on the shaft 28, a second sun gear 45 fixed on a sleeve portion 46 which is rotatable on the shaft 28, a ring gear 47 fixed with respect to the driven shaft 26, a plurality of planet gears 48, a plurality of planet gears 49 and a planet gear carrier 50. Each planet gear 48 and each of the planet gears 49 is rotatably disposed in the carrier 50. The carrier 50 is rotatably disposed with respect to the shaft 28 and the shaft portion 46 by any suitable bearings. The planet gears 49 are each in mesh with the sun gear 44 and also with a planet gear 48. The gears 48 are also in mesh with the ring gear 47, and the gears 48 are in mesh with the sun gear 45.

The clutch 30 is arranged to connect the shaft 27 driven by the rotor 36 with the shaft 28 and the sun gear 44 formed thereon. The clutch 30 comprises clutch discs 51 splined on a hub member 52 which is fixed on the shaft 28. The clutch also comprises clutch discs 53 interleaved between the discs 51 and fixed within a member 54 rotatably disposed on the shaft 28 and fixed to the shaft 27 so as to be driven by the latter shaft.

The clutch 30 comprises a movable pressure plate 55 splined within the member 54 and adapted to press the friction discs 51 and 53 together in frictional engagement between it and an enlarged annular part 56 of the shaft 27 to which the member 54 is fixed, the part 56 acting as a pressure member on the other side of the discs. An annular piston 57 is provided for actuating the movable pressure plate 55. Pressure from the piston 57 is transmitted to the pressure plate 55 through an annular spring strut 58. The strut 58 at its inner periphery is acted on by the piston 57, so that its inner periphery moves axially with respect to its outer periphery and moves the pressure plate 55 which is acted on by the strut 58 at intermediate points thereof. The resilient action of the strut 58 functions to return the piston back into its illustrated position when fluid pressure, applied as will be hereinafter described, is released from the piston.

The clutch 31 is arranged to connect the part 54 and thereby the shaft 27 with the shaft portion 46 and sun gear 45 and comprises clutch discs 59 splined onto the member 54 and clutch discs 60 splined within a member 61 which is fixed to the shaft portion 46. A pressure plate 62 is fixed to the member 61 on one side of the clutch discs, and an annular hydraulic piston 63 is provided on the other side of the discs for compressing the discs between it and the pressure plate portion 62. A return spring 64 is provided for acting on the piston 63 and yieldably holding it in its clutch disapplying position.

The brake 32 comprises a brake band 65 adapted to be contracted on the part 61 for thereby braking the sun gear 45. The brake 33 comprises a brake band 66 adapted to be contracted on a drum portion 67 of the planet gear carrier 50.

In operation, the transmission unit A has a neutral condition and provides low, intermediate and high speed ratios in forward drive and a drive in reverse. The transmission unit A is in neutral condition when the clutches 30 and 31 and the brakes 32 and 33 are disengaged. For ordinary driving conditions of the vehicle, the transmission unit A may be operated in its high range which includes only the intermediate and high speed ratios or it may be operated in a high range which includes all three forward drives, as will be subsequently described.

The intermediate speed ratio power train is completed by engaging the clutch 30 and the brake 32. The clutch 30 is engaged by applying fluid pressure to the piston 57. The intermediate speed power train exists from the drive shaft 25 through the torque converter 29, the intermediate shaft 27, the clutch 30, the shaft 28, and the planetary gear set 34 to the shaft 26. The brake 32 is effective to hold the shaft 46 stationary and to brake the sun gear 45 of the planetary gear set, so that the sun gear 45 constitutes the reaction element of the gear set. The shaft 28 is driven as just described, and the sun gear 44 of the gear set 34 thus constitutes the driving element of the gear set. The drive is transmitted through the planet gears 48 and 49 to the ring gear 47, driving the shaft 26. Since there are sets of two planet gears 48 and 49 between the sun gear 44 and the ring gear 47, and the sun gear 45 in mesh with the gears 48 functions as the reaction element of the gear set, the ring gear 47 and thereby the shaft 26 are driven at a reduced speed, intermediate speed ratio with respect to the shaft 27.

The high speed ratio power train through the transmission unit A, which constitutes a substantially direct drive between the shafts 25 and 26, may be obtained by engaging the clutch 31, allowing the clutch 30 to remain engaged. The brake 32 is disengaged at this time. The clutch 31 may be engaged by applying fluid pressure to the piston 63. In this drive, the shaft 27 is driven through the torque converter 29 from the drive shaft 25, and the shaft 27 is connected through the clutch 30 to drive the sun gear 44, as was the case in intermediate speed drive. The clutch 31 functions to connect the part 54, which in turn is connected to the shaft 27, with the part 61 and thereby with the sun gear 45 splined thereto. Thus both the sun gear 44 and also the sun gear 45 are driven by the shaft 27, and is well-known in connection with planetary gear sets, when two elements of the gear set are driven at the same speed, the gear set becomes locked up so that all of its gears and elements rotate as a unit, and there is thus a direct drive between the shaft 27 and the shaft 26. A substantially direct drive generally exists in this power train between the shafts 25 and 26, since the converter 29 may be expected to function as a simple fluid coupling generally in this drive.

The low speed forward drive may be obtained by engaging the clutch 30 and the brake 33. Engagement of the brake 33 causes the planet gear carrier 50 to function as the reaction element of the gear set, and the sun gear 44 is driven from the shafts 25 and 27 substantially as in intermediate speed drive. Since there are sets of the two planet gears 49 and 48 between the sun gear 44 and the ring gear 47, the ring gear 47 is driven at a reduced speed drive with respect to the sun gear 44 and shaft 28, and the speed of the ring gear 47 and shaft 26 connected therewith is lower than their speeds relative to the shaft 28 for intermediate speed drive. For most vehicle driving conditions when low speed drive is used, the rotor 36 is driven at increased torque, and the gear set 34 connected in tandem with the converter 29 also increases the torque to provide a relatively great overall torque ratio between the shafts 25 and 26.

Reverse drive may be obtained through the transmission unit A by engaging the brake 33 and the clutch 31. For this drive, the power train exists from the drive shaft 25 through the torque converter 29, the intermediate shaft 27, the clutch 31, the sun gear 45, and the planetary gear set 34 to the shaft 26. The brake 33 causes the planet gear carrier to function as the reaction element of the gear set, and since there are only the single planet gears 48 between the sun gear 45 and the ring gear 47, the ring gear 47 will be driven at a reduced speed in the reverse direction with respect to the sun gear 45 and the shaft 27, in accordance with well-known principles of operation of planetary gear sets. For this drive, the torque converter 29 generally functions to increase torque, and thus the torque impressed on the shaft 26 is the product of the torque increases by the torque converter 29 and the planetary gear set 34.

I am of the opinion that a person skilled in the art will secure adequate understanding of the transmission unit A as it is described above; however, if further details of construction of a transmission of this type are desired, the copending application of Robert W. Wayman, S.N. 166,136, filed June 5, 1950, may be referred to.

The auxiliary reduction unit B connected in tandem with the transmission unit A comprises, in general, a planetary gear set 75, a friction clutch 76 and a friction brake 77. The input shaft of the unit B is the shaft 26 constituting the output shaft of the unit A, and the unit B has a driven shaft 78 which may be connected by any suitable drive transmitting mechanism (not shown) with the rear driving road wheels of the vehicle in which the transmission is installed. The shaft 78 is concentrically disposed with respect to the shaft 26, and the latter is piloted within the shaft 78.

The planetary gear set 75 comprises a ring gear 79 fixed with respect to the shaft 78, a sun gear 80 rotatably disposed on the shaft 26, a set of planet gears 81 in mesh with the ring gear 79, a set of planet gears 82 each in mesh with one of the planet gears 81 and also with the sun gear 80 and a carrier 83 on which the planet gears 81 and 82 are rotatably disposed. The carrier 83 is fixed onto the shaft 26. The carrier 83 is provided with a power take-off gear 84 which is directly connected with the shaft 26 through the carrier 83.

The clutch 76 comprises a plurality of clutch plates 85 splined within a shell 86 fixed to the sun gear 80, a plurality of friction discs or plates 87 splined on a cylindrical shell portion 88 of the carrier 83 and interleaved with the plates 85, a pressure plate 89 fixed within the shell 86 on one end of the stacked plates, and a piston 90 on the other end of the stacked plates. The piston 90 is slidably disposed within an annular cavity provided in the shell 86 and is adapted to have fluid pressure applied to it so as to move the piston to compress the plates 85 and 87 in frictional engagement between the piston 90 and pressure plate 89. A piston return spring 91 fixed at one end with respect to the shell 86 is provided for acting on the piston 90 for holding the piston yieldably in its clutch disengaged position.

The brake 77 comprises a plurality of discs 92 splined within a fixed cylindrical shell 93, a plurality of friction discs 94 splined with respect to the shell 86, a fixed pressure plate portion 95 on one end of the stacked discs and an annular piston 96 on the other end of the stacked discs. The piston 96 is movably disposed within an annular cavity and is adapted to have fluid pressure applied behind it for compressing the discs 92 and 94 between the piston and the pressure plate portion 95. A piston return spring 97 is fixed at one end and has its other end bearing on the piston 96 for yieldably holding the piston 96 in its brake disengaging position.

The auxiliary unit B provides a direct drive and a reduction drive between the shafts 26 and 78. When the clutch 76 is engaged, it thereby connects together the carrier 83 and the sun gear 80, thereby locking up the gear set 75 so that all of its parts rotate together as a unit, and a direct drive exists between the shafts 26 and 78.

The reduction drive between the shafts 26 and 78 is obtained by engaging the brake 77. The brake 77 effectively brakes the shell 86 and thereby the sun gear 80 connected with the shell 86. The sun gear 80 then functions as the reaction element of the gear set 75; and, since the carrier 83 is driven from the shaft 26 constituting the drive shaft of the unit B, the ring gear 79 and thereby the shaft 78 constituting the output shaft of the unit B, are driven at a reduced speed in the same direction with respect to the shaft 26. This reduced speed drive is obtained, with the carrier 83 constituting the input element of the gear set 75, due to the fact that the gear set 75 is of the duplex pinion type.

It is contemplated that the auxiliary unit B can be either in its direct drive or in its reduced drive condition for any of the power trains provided through the main transmission unit A. The gear sizes in both the units A and B may, of course, be varied in size as desired; however, for certain gear sizes, the ratios set forth by the following table are obtained, this table being set forth for purposes of example only:

| Gear (Unit A) | Low Range (Unit B) | High Range (Unit B) |
| --- | --- | --- |
| 1st | 5.23 | 2.40 |
| 2nd | 3.21 | 1.47 |
| 3rd | 2.18 | 1.00 |
| Reverse | 4.36 | 2.00 |

In the particular example given above, the main transmission unit A has a 2.4 ratio for first gear, a 1.47 ratio for second gear, a 1.00 ratio for third gear and a 2.00 ratio for reverse; and the particular auxiliary transmission unit B provides a 1.00 and 2.18 ratio. The low range speeds are obtained when the main transmission unit A is changed between its various forward drives and reverse drive while the auxiliary transmission unit B continues to drive in reduction speed ratio. The high range drives are obtained when the auxiliary unit B is in its direct drive condition while the main transmission unit A is changed between its various forward drives and its reverse drive. These ratios, of course, do not include the torque multiplication that is provided by the hydraulic torque converter 29, and the ratios set forth above are multiplied by the torque conversion produced by the hydraulic torque converter 29, assuming that the transmission is operated at such low speeds that the torque converter 29 is effective to actually multiply torque instead of simply providing a simple fluid coupling connection. A torque converter of the type illustrated may be expected to provide at least a 2.1 to 1 ratio of torque conversion under stall conditions, and of course, this ratio decreases gradually to 1 to 1 ratio as the speeds of the torque converter parts increase.

The main transmission unit A is automatically changed between its various ratios in forward drive in accordance with various combinations of engine throttle and vehicle speeds, and the auxiliary unit B is changed under manual control or the unit B may also be automatically controlled. In the embodiment of the invention illustrated in FIGS. 1A, 1B, 1C, 1D and 1E, the auxiliary unit B is manually controlled and the main unit A is automatically controlled, while in the embodiment of the invention illustrated in FIGS. 1A, 1B, 1C, 1D and 1F, both units are automatically controlled. The controls shown in FIGS. 1A, 1B, 1C, 1D and 1E will first be described.

Referring now to FIGS. 1A, 1B, 1C, 1D and 1E, the hydraulic control system comprises in general a front pump 105, a rear pump 106, a manual valve 107, a downshift valve 108, a throttle valve 109, a compensator valve 110, a throttle modulator valve 111, an orifice control valve 112, a 2 to 1 shift valve 113, a 2 to 3 shift valve 114, a rear brake check valve 115, a transition valve 116, an inhibitor valve 117, a governor valve 118, a converter pressure regulator valve 119, a control pressure regulator valve 120, a clutch transition valve 121, a brake transition valve 122, a low-high shift valve 123, a governor regulator valve 124 and an auxiliary manual valve 125. The valves 107 to 120 are associated in particular with the driving unit A, and the valves 121 to 125 are associated in particular with the auxiliary unit B.

The brake 32 is applied by means of a hydraulic servomotor 126. The motor 126 comprises a piston 127 connected by means of a bell crank 128 and a strut 129 with one end of the brake band 65, the other end of the brake band 65 being held fixed by means of a strut 130. The motor 126 has a brake applying fluid pressure cavity 131 and a brake disapplying fluid pressure cavity 132. A spring 133 acts on the piston 127 tending to hold it in its brake disapplying position. Fluid pressure supplied to the cavity 131 moves the piston 127 against the spring 133 so as to move one end of the brake band 65 to engage it with the drum 61. It may be noted at this point that the direction of reaction on the sun gear 45 and the drum 61 is in the reverse direction as indicated by the arrow X when the brake 32 is engaged for the intermediate speed ratio power train. This direction is opposite the direction of rotation of the drive shaft 25 as indicated by the arrow 43, and the drum 61 in tending to rotate in this direction augments the action of the strut 129 in engaging the band 65 and causes increased band engagement, since the drum 61 tends to carry the end of the band acted on by the strut 129 in the same direction in which this end of the band is urged by the strut, the other end of the band 65 being permanently fixed by means of the strut 130. It is apparent that the band 65 wraps or is partially self-energizing for this rotative tendency of the drum 61.

The brake 33 is engaged by means of a fluid pressure servo-motor 134 which comprises a piston 135 movable by fluid pressure applied thereto against the action of a spring 136. Motion of the piston 135 is transmitted to one end of the brake band 66 by means of a bell crank 137 and a strut 138, the other end of the brake band 66 being held fixed by means of a strut 139. A cushioning spring 140 is provided effectively between the piston 135 and the end of the lever 137. In low speed drive through the unit A, the reaction of the planet gear carrier 50 and on the drum 67 is in the reverse direction as indicated by the arrow Y in FIG. 1A which is opposite to the direction of rotation of the drive shaft 25, and this reaction or tendency to rotate tends to move the band to unwrap and disengage the band from the drum 67. For this direction of reaction, the brake 33 is thus self-deenergizing and provides a less braking effect than for a case in which this reaction did not exist. The reaction on the brake drum 67 for reverse drive is in the forward direction as indicated by the arrow Z in FIG. 1A, that is, in the same direction as the drive shaft 25 rotates. This tendency of the drum 67 to rotate in this direction assists the strut 138 in forcing the movable end of the band 66 to move in the direction indicated by the arrow Z, and the brake 33 thus wraps or is self-energizing for this direction of reaction, so that the braking effect is greater than would be the case if there were no tendency for the drum to rotate. The reaction on the drum 67 is greater for reverse drive than for low forward drive, and hence the brake 33 has been constructed to wrap for the reaction for reverse drive instead of that for low speed forward drive.

The pump 105 may be of any suitable fixed displacement type and may comprise an outer gear 141 and an inner gear 142 in mesh with the outer gear and a crescent shaped casing portion 143 between the gears. The gears 141 and 142 carry fluid between their teeth and across the inner and outer surfaces of the casing portion 143 so as to draw fluid from an inlet conduit 144 and discharge into an outlet conduit 145. The inlet conduit 144 is adapted to draw fluid from a sump 146. The pump 105 is driven directly from the drive shaft 25 through the impeller 35. The pump 106 is of the same construction as the pump 105 and is driven from the driven shaft 78 of the transmission. The pump 106 draws fluid from the sump 146 through an inlet conduit 147 and discharges it into an outlet conduit 148.

The conduit 148 constitutes the supply or line pressure conduit for supplying fluid pressure to the power train completing friction clutches and brakes of the transmission and also for supplying various valves in the transmission control system with fluid pressure. A check valve 149 is disposed in the conduit 148 and comprises a piston 150 yieldably held in its closed position by means of a spring 151. The check valve 149 blocks fluid flow through the conduit 148 to the rear pump 106.

A similar check valve 152 comprising a piston 153 and a spring 154 acting on the piston is provided between the line pressure conduit 148 and the outlet conduit 145 for the front pump 105. The check valve 152 functions to prevent fluid flow from the line pressure conduit 148 to the conduit 145 when the pressure in the latter conduit is lower than in the conduit 148.

The control pressure regulator valve 120 functions to regulate the pressure in the line pressure conduit 148. The valve 120 comprises a piston 155 having lands 156, 157, 158 and 159. A spring 160 is provided for moving the piston 155 toward the right as seen in FIG. 1D. The valve 120 comprises ports 161, 162, 163, 164 and 165. The ports 162 and 163 are connected with the line pressure conduit 148, and the port 165 is connected with the outlet conduit 145 of the pump 105.

The manual valve 107 functions, in general, to direct the line pressure from the conduit 148 to the various clutch and brake operating pistons and motors and to various valves in the transmission control system in accordance with the various driving conditions desired for the front unit A. The manual valve 107 comprises a valve piston 166 having lands 167, 168, 169 and 170, and the valve 107 is provided with ports 171, 172, 173, 174, 175, 176, 177 and 178. The ports 174 and 175 are connected with the line pressure supply conduit 148. The port 171 is a bleed port discharging into the sump 146. There are two ports 176, and one of these is connected with the brake applying fluid pressure cavity 131 in the brake motor 126 by means of a conduit 179. The port 177 is connected by means of a conduit 180 with the piston 57 for the clutch 30.

The 2 to 3 shift valve 114 utilizes line pressure supplied from the manual valve 107 for causing engagement and disengagement of the proper clutch and brake (clutch 31 and brake 32) for causing changes between second and third speed drives. The valve 114 comprises three valve pistons 181, 182 and 183. The piston 181 is a simple plug; the piston 182 comprises lands 184, 185, 186 and 187 and a stem 188; and the piston 183 comprises lands 189 and 190. A spring 191 is disposed between the piston 181 and the land 184, and a spring 192 is disposed between the land 184 and a stationary part for yieldably moving the piston 182 to the right as seen in FIG. 1C.

The valve 114 is provided with ports 193, 194, 195, 196, 197, 198, 199, 200, 201, 202, 203, 204, 205 and 206. The ports 194 and 196 are connected with the port 205 by means of a conduit 207; the ports 198 and 202 are connected by means of a conduit 208 with the piston 63 for the clutch 31; the port 201 is the line pressure supply port for the valve 114 and is connected by means of a conduit 209 with the port 178 of the manual valve 107; and the port 203 is connected by means of a conduit 210 with the port 172 of the manual valve 107.

A throttle pressure is applied on the left end of the 2 to 3 shift valve 114, and this throttle pressure is obtained from the throttle valve 109 acted on by the downshift valve 108. The throttle valve 109 comprises a valve piston 211 having lands 212, 213 and 214. The downshift valve 108 comprises a valve piston 215 having lands 216 and 217. A spring 218 is disposed between the pistons 215 and 211. The valves 108 and 109 are provided with ports 219, 220, 221, 222, 223, 224, 225 and 226. The port 219 is connected by a conduit 227 with the port 173 of the manual valve 107; the port 220 is connected by means of a conduit 228 with the port 195 of the 2 to 3 shift valve 114; the port 221 and port 225 are connected by means of a branch conduit 229 with the line pressure supply conduit 148; the ports 222 and 223 are bleed ports freely discharging into the sump 146; and the ports 224 and 226 are connected by means of a conduit 230 with the port 193 of the 2 to 3 shift valve 114, functioning as will be hereinafter described to supply a throttle pressure to the valve 114.

A governor pressure that varies in accordance with the speed of the driven shaft 78 of the transmission is applied to the 2 to 3 shift valve 114 on its right end tending to oppose the throttle pressure applied also to this valve. The governor pressure applied to the valve 114 is varied primarily by the governor valve 118 which extends radially with respect to the driven shaft 78 and is rotated along with the shaft 78. The governor valve 118 comprises a piston 231 having lands 232, 233 and 234. The valve 118 comprises also ports 235, 236, 237, 238 and 239. The port 237 is connected with the conduit 180, and the ports 235 and 239 are bleed ports adapted to freely discharge into the sump 146.

The governor valve 118 provides a pressure that varies in accordance with the speed of the shaft 78, and this pressure is at times modified by the governor regulator valve 124. The governor regulator valve 124 comprises pistons 240 and 241. The piston 240 is provided with lands 242, 243 and 244; and the piston 241 is simply a plug adapted to contact and act on the piston 240. The governor regulator valve 124 is provided with ports 245, 246, 247, 248, 249 and 250. The ports 245 and 247 are output ports of the governor regulator valve 124 and provide a governor pressure on the 2 to 3 shift valve 114 by means of a conduit 251 connecting these ports with the ports 197 and 206 of the 2 to 3 shift valve; the port 246 is connected by means of a branch conduit 252 with the line pressure supply conduit 148; the port 248 is a bleed port; and the port 250 is connected by means of a conduit 253 with the ports 236 and 238 of the governor valve 118.

The throttle valve 109 produces a throttle pressure which acts on the throttle modulator valve 111 which in turn produces a modulator pressure acting on the compensator valve 110. The compensator valve 110 is acted on by both the modulator pressure from the valve 111 and also by the governor pressure, and this valve 110 produces a resultant compensator pressure that is applied to the control pressure regulator valve 120. The throttle modulator valve 111 comprises a valve piston 254 having lands 255, 256, 257 and 258. A sheet metal spring retainer 259 is carried by the land 255, and a spring 260 is disposed between the land 257 and the spring retainer 259. A spring 261 acts on the other end of the valve piston 254. The valve 111 comprises ports 262, 263, 264, 265, 266 and 267. The port 262 is connected through a restriction 268 with the conduit 210; the ports 263 and 267 are bleed ports; and the port 265 is connected with the conduit 230.

The compensator valve 110 comprises valve pistons 269, 270 and 271. The piston 269 is a simple plug slidably disposed in a sleeve 272. The piston 270 comprises lands 273, 274, 275 and 276; and a spring 277 is disposed between the land 273 and the sleeve 272. The piston 271 comprises lands 278 and 279. The valve 110 is provided with ports 280, 281, 282, 283, 284, 285, 286, 287, 288 and 289. The ports 280 and 289 are connected by means of a conduit 290 with the governor pressure conduit 251; the ports 281 and 282 are bleed ports; the ports 283 and 285 are connected by means of a conduit 291 with the port 161 of the control pressure regulator valve 120, a restriction 292 being between the port 285 and the conduit 291; the ports 284 and 288 are connected to the line pressure supply conduits 229 and 148; and the ports 286 and 287 are connected respectively with the ports 264 and 266 of the throttle modulator valve 111.

The 2 to 1 shift valve 113 is utilized for controlling engagement of the rear brake 33 for completing the low speed power train through the front unit A. The valve 113 comprises a valve piston 293 having lands 294 and 295. A spring 296 is provided for yieldably holding the piston 293 to the limit of its movement to the left as seen in FIG. 1C. The valve 113 is provided with ports 297, 298, 299, 300 and 301. The port 297 is connected with the conduit 228; the ports 298 and 301 are bleed ports; and the port 300 is connected by means of a conduit 302 with the port 176 of the manual valve 107.

The inhibitor valve 117 inhibits the engagement of the rear brake 33 below certain vehicle speeds. The valve 117 comprises a valve piston 303 having lands 304 and 305. A spring 306 is provided at one end of the piston 303 and extends into an internal cavity 307 in the piston 303 and tends to hold the valve piston 303 at the limit of its movement to the right as seen in FIG. 1C. The piston 303 is provided with radially extending ports 308 in communication with the cavity 307. The valve 117 is provided with ports 309, 310, 311, 312, 313 and 314. The port 309 is connected by means of a branch conduit 315 with the conduit 227 which is connected with the port 173 of the manual valve 107; the ports 310 and 311 are bleed ports; the port 313 is connected by means of a conduit 316 with the port 299 of the 2 to 1 shift valve 113; and the port 314 is connected to the conduit 251.

The orifice control valve 112 provides orifices in connection with both the rear brake 33 and also in connection with the front brake 32. The valve 112 comprises pistons 317 and 318. The piston 317 is a simple plug, and the piston 318 is provided with lands 319, 320, 321 and 322. The valve 112 comprises ports 323, 324, 325, 326, 327, 328 and 329. The port 323 is connected by means of a conduit 330 with the servomotor 134; the port 324 is connected with the conduit 230; the ports 325 and 326 are connected together by means of a restriction 331; the upper port 325 is connected by means of a conduit 332 with the brake apply cavity 132 of the servomotor 126; the port 326 is connected with the port 199 of the 2 to 3 shift valve 114; the two upper ports 327 and 328 are connected together by means of a restriction 333; the lower port 327 is connected by means of a conduit 334 with the port 200 of the 2 to 3 shift valve 114; the lower port 328 is connected by means of a conduit 335 with the port 312 of the inhibitor valve 117; and the port 329 is connected with the conduit 210. A spring 336 is provided on the right end of the orifice control valve piston 318 yieldably holding it moved to the limit of its movement to the left as seen in FIG. 1C.

The transition valve 116 functions to provide a suitable overlap of engagement between the two brakes 33 and 32 when there is a change between first and second speed ratios. The transition valve 116 comprises a valve piston 337 having lands 338, 339, 340 and 341. The valve 116 comprises ports 342, 343, 344, 345 and 346. The port 342 is connected by means of a branch conduit 347 with the conduit 332; the port 344 is connected by means of a branch conduit 348 with the conduit 330; and the ports 345 and 346 are bleed ports. A spring 349 is provided for yieldably holding the piston 337 to the limit of its movement to the left as seen in FIG. 1C.

The rear brake check valve 115 comprises a ball 350 movable in a cavity and acted on by a spring 351. Ports 352 and 353 are provided for the cavity, and the ball 350 under the influence of the spring 351 closes the port 352. The port 353 is connected by means of a conduit 354 with the port 343 of the transition valve 116, and the port 352 is connected by means of a branch conduit 355 with the conduit 334. A restriction 356 connects the ports 353 and 352, as shown.

The pressure in the torque converter 29 is controlled by the converter pressure regulator valve 119. The valve 119 comprises a piston 357 having lands 358, 359, and 360. A spring 361 is disposed about the end of the piston 357 and functions to yieldably hold the piston 357 to the limit of its movement to the right as seen in FIG. 1D. The valve comprises ports 362, 363, 364, 365, 366 and 367. The port 362 is connected to the inlet conduit 144 for the pump 105; the port 363 is connected to supply lubricant to any desired lubricating surfaces within the transmission; the port 364 is connected with the port 164 of the control pressure regulator valve 120 and is connected by means of a conduit 368 to supply fluid under pressure to the hydraulic torque converter 29; the port 365 is connected by means of a conduit 369 to receive fluid discharged from the torque converter 29; the port 366 is a bleed port; and the port 367 is connected to the conduit 291.

The transmission unit A is under operator control principally by means of the manual valve 107, but the vehicle accelerator 370 also under the operator's immediate control, also exerts a controlling influence. The accelerator 370 has a usual connection with the engine carburetor 371, being connected by any suitable linkage 372 with a throttle lever 373 which turns the butterfly valve 374 of the carburetor 371. The accelerator 370 is connected by any suitable linkage 375 with the downshift valve piston 215.

The auxiliary unit B is under the primary control of the manual valve 125. The manual valve 125 comprises a valve piston 385 having lands 386, 387 and 388. The valve 125 has ports 389, 390, 391, 392, 393, 394 and 395. The ports 389 and 392 are connected with the conduit 252; and the ports 391, 394 and 395 are bleed ports.

The low-high shift valve 123 determines the speed ratio that shall exist in the auxiliary unit B. The shift valve 123 comprises pistons 396 and 397. The piston 396 is provided with lands 398, 399, 400, 401 and 402. A spring 403 acts on the valve piston 396 moving it to a limit of its movement to the right as seen in FIG. 1E. The piston 397 constitutes a simple one land plug, as shown. The shift valve 123 is provided with ports 404, 405, 406, 407, 408, 409, 410, 411, 412 and 413. The ports 404, 407, and 411 are bleed ports; the port 405 is connected with the conduit 253; the port 406 is connected by means or a conduit 414 with the port 249 of the governor regulator valve 124; and the port 413 is connected by means of a conduit 415 with the conduit 315.

A three position ball check valve 416 is provided for connecting any two of a certain three conduits together. The latter conduits are the conduit 253, a conduit 417 connected with the port 412 of the low-high shift valve 123 and a conduit 418 connected with the port 390 of the auxiliary manual valve 125. The check valve 416 comprises a ball 419 and three ports 420, 421 and 422 connected respectively with the conduits 253, 417 and 418.

The brake transition valve 122, which functions to control the brake 77, comprises a valve piston 423 having lands 424 and 425. A spring 426 is provided for yieldably holding the piston 423 to the limit of its movement to the left as seen in FIG. 1E. The valve 122 comprises ports 427, 428, 429, 430 and 431. The port 427 is connected by means of a conduit 432 with the piston 90 of the clutch 76; the port 428 is connected by means of a conduit 433 with the port 409 of the low-high shift valve 123; the port 429 is connected by means of a conduit 434 with the piston 96 for the brake 77; the port 430 is a bleed port; and the port 431 is connected by means of a conduit 435 with the port 408 of the low-high shift valve 123.

The clutch transition valve 121, which is for the purpose of controlling the clutch 76, comprises a valve piston 436 having lands 437 and 438. A spring 439 is provided for yieldably holding the piston 436 to the limit of its movement to the right as seen in FIG. 1E. The valve 436 comprises ports 440, 441, 442, 443 and 444. The port 440 is connected by means of a conduit 445 with the port 410 of the low-high shift valve 123; the port 441 is a bleed port; the port 442 is connected to the conduit 432; the port 443 is connected by means of a branch conduit 446 with the conduit 433; and the port 444 is connected to the conduit 434.

In operation, the transmission and its hydraulic control system are under the control of the vehicle operator by means of the accelerator 370 and the two manual selector valves 107 and 125, the valve 107 controlling in particular the front unit A and the manual valve 125 controlling in particular the auxiliary unit B.

The transmission is maintained in its neutral condition by having the manual selector valve piston 166 in its neutral position as indicated in FIG. 1A and by having the auxiliary manual valve piston 385 in its neutral position in which it is shown in FIG. 1E. When the engine of the vehicle begins operating, the pump 105 which is driven through the drive shaft 25 and the impeller 35 of the torque converter 29, supplies line pressure to the conduit 145 and connected conduits, pumping oil from the sump 146. The conduit 148 is connected with the conduit 145 and has line pressure therein supplied from the pump 105, the connection being through the check valve 152 which is held open by the fluid pressure from the pump 105. The pressure in the conduit 148 holds the check valve 151 closed so that pressure from the front pump 105 cannot flow to the rear pump 106. The line pressure conduit 148 is connected to the ports 174 and 175 of the manual valve 107; and, in the neutral position of the valve piston 166, the lands 169 and 168 straddle the ports 174 and 175 and thus block these ports, thereby preventing application of fluid pressure to various clutch and brake pistons of the unit A for maintaining the clutches and brakes disengaged. The conduit 252 which also carries line pressure is connected to the ports 389 and 392, and the piston 385 of the auxiliary manual valve 125 in the neutral position of this piston blocks both of the ports 389 and 392 thus preventing application of fluid pressure to the pistons of the clutch and brake of the rear unit B and maintaining the clutch and brake disengaged and the rear unit B in neutral condition.

The control pressure regulator valve 120 functions for all conditions of the transmission and its hydraulic control system to regulate the line pressure in the conduit 148 and connected conduits to predetermined maximum values. For this purpose, the line pressure is supplied through the port 162 from the conduit 148 to the lands 157 and 156 of the valve piston 155. The land 157 is greater in area than the land 156, and, accordingly, this fluid pressure tends to move the valve piston 155 to the left as seen in FIG. 1D against the action of the spring 160. This movement of the piston 155 tends to release pressure from the output conduit 145 of the pump 105 through the port 165 and between the lands 158 and 159 of the valve piston 155 to the port 164. The spring 160 is of such strength that the port 165 will not be thus opened until a certain output pressure of the pump 105 and line pressure in the conduit 148 are reached, and the piston 155 remains in a position in which the port 165 is cracked by the land 159 just sufficiently to relieve enough output from the pump 105 to maintain the line pressure in the conduit 148 at substantially this certain valve.

For most conditions of operation, an additional variable force is applied to the piston 155 tending to move it so as to change the line pressure in the conduit 148 and connected conduits, and this third force is due to so-called "compensator" pressure of different values applied to the right end of the valve piston 155 through the port 161. For the neutral condition of the transmission with the accelerator 370 in its closed throttle position, the compensator pressure is equal to full line pressure and is applied to the right end of the control pressure regulator valve piston 155, line pressure flowing from the line pressure conduit 148 through the conduit 229 to the port 284 of the compensator valve 110, between the lands 273 and 274 of the compensator valve piston 270, and through the port 283 and the conduit 291 to the port 161 of the control pressure regulator valve 120. This line pressure is applied through the port 285 and restriction 292 between the lands 274 and 275 of the compensator valve piston 271; and, since the land 274 is larger in diameter than the land 275, this pressure tends to move the valve piston 271 to the left. However, for this condition of operation, the spring 277 acting on the piston 270 is of sufficient strength to hold the piston 270 to the limit of its movement to the right, and the fluid pressure applied between the lands 274 and 275 has no effect.

The fluid pressure applied to the right end of the control pressure regulator valve piston 155 provides a force on the piston acting against the spring 160 tending to move the valve piston to the left as seen in FIG. 1D to more fully open the port 165. The full line pressure applied to the right end of the valve piston together with the effect of line pressure applied between the lands 156 and 157 thus maintains the line pressure at a predetermined minimum, which for one certain embodiment of the invention is 75 lbs. p.s.i.

The converter pressure regulator valve 119 is for the purpose of regulating the fluid pressure within the conduit 368 and thereby within the torque converter 29 to which the conduit 368 supplies fluid pressure. The pressure in the conduit 368 is applied to the piston 357 between the lands 358 and 359 through the port 364. Due to the fact that the land 358 is larger in diameter than the land 359, an increase in the fluid pressure in the conduit 368 and thereby in the converter 29 tends to cause a movement of the piston 357 to the left against the action of the spring 361 to open the bleed port 363 and meter fluid between the land 358 and an edge of the port 363. Thus, as the fluid pressure in the conduit 368 and in the converter 29 tends to increase, the excessive fluid pressure is discharged through the port 363, and the pressure in the conduit 368 and converter 29 is regulated to a predetermined maximum. The fluid from the port 363 is preferably utilized for lubricating various bearing parts within the transmission mechanism.

The pressure within the conduit 291 is also applied to the valve piston 357 for changing the regulated converter pressures for various conditions of operation of the transmission and controls. The fluid pressure in the conduit 291 is applied to the right end of the valve piston 357 through the port 367 and tends to move the piston 357 to the left against the action of the spring 361 and augment the action of the converter pressure applied through the port 364 to the adjacent sides of the lands 358 and 359 to open the relief port 363 and thus further relieve the pressure in the conduit 368 and converter 29. With full line pressure in the conduit 291 for conditions of operation just mentioned, the regulated converter pressure in the conduit 368 is thus at a minimum, which, for one particular embodiment of the invention is substantially 30 lbs. p.s.i. The conduit 369 also connected with the converter 29 may be connected with the bleed port 366 of the converter pressure regulator valve 119 for further relieving pressure in the converter 29, under certain conditions, as for example, when the speed of the engine has increased substantially giving a correspondingly increased output from the pump 105. In this case, the resultant increased pressure in the conduit 368 applied to the land 358 will move the valve piston 357 still farther to the left against the action of the spring 361 so as to connect the ports 365 and 366 by the groove between the lands 359 and 360, and the land 359 and port 365 will, in this case, meter and regulate the pressure in the converter 29.

The transmission unit A is controlled by means of the manual valve 107 and the auxiliary unit B is controlled by means of the auxiliary manual valve 125. The auxiliary unit B may be operated in either high or low range for any of the conditions of operation of the main unit A. If it is desired to operate the auxiliary unit B in high range, the valve piston 385 of the auxiliary manual valve 125 is moved from its N or neutral position to its H or high range position. Such a movement of the valve piston 385 connects the ports 392 and 393 by means of the groove between the lands 387 and 388, and line pressure from the conduits 148 and 252 is thus supplied through the ports 392 and 393, the permanently connected pair of ports 409 in the low-high shift valve and the conduits 433 and 446 to the ports 428 and 443 of the brake and clutch transition valves respectively.

The valve piston 385 of the auxiliary manual valve 125 also connects in its high range position the ports 389 and 390 thus supplying line pressure from the line pressure conduit 252 to the check valve 416 through the conduit 418. The ball 419 of the check valve is thus moved to close the port 420, and the ports 422 and 421 are connected together so that line pressure is supplied to the port 412 through the conduit 417 from the check valve 416. The line pressure from the port 412 is applied on the land 402 of the high-low shift valve piston 396 and moves this piston to the left against the action of the spring 403 to thereby connect together the ports 409 and 410 by means of the groove between the lands 401 and 402 of the valve piston 396. Fluid pressure is thus supplied through the conduit 445 to the port 440 of the clutch transition valve 121, and the fluid pressure thus applied on the left end of the valve piston 436 of the clutch transition valve augments the action of the spring 439 and holds the piston 436 to the limit of its movement to the right as seen in FIG. 1E. Line pressure thus flows from the conduit 446 through the ports 443 and 442 and through the conduit 432 to the clutch piston 90 for engaging the clutch 76. The direct or high range drive through the auxiliary unit B is thus completed. The line pressure in the conduit 432 is also supplied through the port 427 to the left end of the valve piston 423 of the brake transition valve 122 and moves the piston 423 against the action of the spring 426 to the limit of its movement to the right, and the piston 426 in this position blocks the port 428 by means of the land 424 and prevents the application of fluid pressure to the brake 77 through the conduit 434.

The valve piston 396 of the low-high shift valve 123 in its illustrated low speed position provides a pressure through the conduit 414 to the governor regulator valve 124 as will be subsequently explained; however, in its high speed position (shifted to the left against the action of the spring 403), the valve piston 396 connects the port 406 for the conduit 414 to the bleed port 407 so that there can be no application of fluid pressure to the conduit 414 at this time.

The transmission control system is conditioned for operation in high range, particularly with respect to the front unit A, by moving the manual selector valve piston 166 into its D or drive range position in which position the piston 166 connects the ports 178, 177, 176 and 175 together. The port 175 is a line pressure supply port and line pressure is thus supplied through the port 177 and conduit 180 to the clutch piston 57 for thereby engaging the clutch 30. Line pressure is also supplied from the port 175 to the upper port 176 and the conduit 179 to the brake apply cavity 131 in the servomotor 126 for the front brake 32. The piston 127 of the front servomotor 126 is thus moved to the right against the action of the spring 133 and engages the brake 32 by means of the bell crank 128 acting through the link 129 on one end of the brake band 65. The brake 32, the clutch 30 and the clutch 76 are thus all engaged at this time with the engagements being with a minimum engaging pressure corresponding to the minimum line pressure that exists assuming that the accelerator 370 is in closed throttle position. The intermediate speed power train through the front unit A is thus completed, and the direct drive is completed through the auxiliary unit B. Line pressure is also supplied through the port 178 of the manual valve 107 and the conduit 209 to the 2 to 3 shift valve 114; however, under these conditions of the transmission controls, the land 186 of the valve 114 blocks the port 201 with which the conduit 209 is connected. Fluid pressure is also supplied from the lower port 176 of the manual valve 107 through the conduit 302 to the 2 to 1 shift valve 113; however, under the present conditions of the transmission controls, the piston 293 of the valve 113 is in its illustrated position and blocks the port 300 connected with the conduit 302.

Thus with the manual valve 107 in its D position and the auxiliary manual valve 125 in its H position, the intermediate speed drive is completed through the unit A and the direct drive is completed through the unit B. The accelerator 370 is assumed to be in its closed throttle position, and the vehicle engine is rotating at idling speed, and under these conditions there is not sufficient power transmitted through the transmission and in particular through the hydraulic torque converter 29 for driving the driven shaft 78 and the vehicle; however, the drive may be made effective by simply depressing the accelerator to open the throttle valve 374, thereby increasing the speed and power output of the vehicle engine.

Throttle opening movement of the accelerator also has other effects on the hydraulic control system including an increasing of the line pressure in conduit 148 and connected conduits for increasing the applying pressures for the clutch 30, the brake 32 and the clutch 76 and an increasing of the fluid pressure within the converter 29.

The accelerator 370 acts on the throttle valve 109 through the intermediary of the downshift valve 108 to provide a throttle pressure in conduit 230 which is less than line pressure, and which increases from zero at closed throttle position of the accelerator to line pressure at open throttle accelerator position. The throttle valve 109 is a regulator valve, providing a variable fluid pressure by metering fluid flow between a valve land and a valve port in accordance with variable forces impressed on the valve. The accelerator 370 tends to move the piston 211 of the throttle valve 109 to the right as seen in FIG. 1B upon depression of the accelerator by means of the link 375, the downshift valve piston 215 and the spring 218. Such movement of the throttle valve piston 211 provides a connection between the ports 225 and 224 by means of the groove between the lands 212 and 213 admitting fluid under pressure into the conduit 230 through the port 224. The port 225 is supplied with line pressure from the conduits 148 and 229. This fluid pressure in the conduit 230 is supplied between the lands 214 and 213 through the port 226. Since the land 213 is larger than the land 214, the fluid pressure effective between the lands tends to move the valve piston 211 back to the left against the action of the spring 218, so that the land 213 tends to again close the port 225 and block further admittance of fluid pressure to the conduit 230. The greater the depression of the accelerator, the greater will be the force from the spring 218 on the throttle valve piston 211, and the greater must be the pressure in the conduit 230 for closing the port 225 by means of the land 213, and hence the valve 109 has a regulating action to provide a throttle pressure in the conduit 230 which increases with accelerator depression.

The throttle pressure from the throttle valve 109 is supplied through the conduit 230 to the throttle modulator valve port 265. The throttle modulator valve 111 functions to provide a limited or so-called "modulated TV pressure" in its port 264 which is connected to the port 286 of the compensator valve 110. At this time, there is no fluid pressure in the conduit 210 connected with the port 262 of the throttle modulator valve 111, and the spring 261 of the valve 111 holds the valve piston 254 to the limit of its movement to the left. This limited pressure in the port 264 is the same as the throttle pressure in the conduit 230 up to a predetermined maximum value, and for further increases in throttle pressure corresponding to increased openings of the engine throttle, the modulator pressure in the port 264 remains at this predetermined maximum value. The throttle pressure in conduit 230 flows through the port 265 of the throttle modulator valve and through the groove between the lands 257 and 258 to the port 264. The spring 261 is a relatively light spring as compared to the spring 260, and this spring 261 functions to normally maintain the valve piston 254 in its position in which the spring retainer 259 contacts the adjacent end of the bore for the piston 254 and with the part of the retainer 259 overlying the land 255 being held in contact with the right end face of the land 255 by the spring 260, and the spring 261 is then substantially at its free length. The spring 261 assures that the ports 265 and 264 remain in communication by means of the groove between the lands 257 and 258 until the modulator pressure in the port 264 reaches its predetermined maximum value.

Modulator pressure in the port 264 is applied to the lands 257 and 258, and since the land 257 is larger than the land 258, this fluid pressure tends to move the piston 254 to the left against the action of the spring 260, the spring retainer being bottomed under these conditions on the adjacent end of the cavity in which the piston 254 is disposed. When the fluid pressure in the port 264 reaches its predetermined maximum value, the pressure moves the piston 254 to the left and closes the port 265 by means of the land 258, so that the pressure of the fluid in the port 264 increases no further. In the particular embodiment of the invention mentioned before, the modulator pressure in the port 264 had a maximum of 50 lbs. p.s.i. at about 25% throttle opening, and the modulator pressure remained constant for additional throttle opening movements of the accelerator.

The modulator pressure in port 264 is applied to the compensator valve 110, which is a regulator valve, for providing a compensator pressure in the conduit 291 that decreases with depression of the accelerator pedal 370 for initial throttle opening movements of the accelerator. The compensator pressure in the conduit 291 also increases with the speed of the driven shaft 78 and the vehicle. In this connection, the action of the governor valve 118 in producing a governor pressure in conduit 253, which is connected to the compensator valve through and by means of the governor regulator valve 124, will now be described.

The governor valve 118, like the throttle valve 109, for example, is a regulator valve; that is, it produces an output pressure that varies gradually with changing forces on the valve. The piston 231 of the valve 118 is constrained to rotate with the driven shaft 78 of the transmission, and the piston 231 tends to move longitudinally outwardly under the influence of centrifugal force, that is, in a direction with the land 232 moving away from the adjacent end of the cavity in which the piston 231 is disposed. Line pressure is present in the conduit 180 from the manual valve 107 in its D position; and, on outward movement of the piston 231, fluid flows through the port 237, the groove between the lands 233 and 232, and the port 236 into the conduit 253 to supply governor pressure to the latter conduit. The pressure in the conduit 253 is applied to the facing ends of the lands 233 and 232, and since the land 232 is larger in diameter than the land 233, this fluid pressure tends to move the piston 231 inwardly toward the shaft 78, so that the land 233 will move over the port 237 and block any further admission of fluid pressure to the conduit 253. A balance is attained between the centrifugal force effective on the valve piston 231 tending to move the piston outwardly, which increases with vehicle speed, and the force derived from the fluid pressure in the conduit 253 effective on the lands 232 and 233 tending to move the piston 231 inwardly, which increases with the pressure in the conduit 253, for every speed of the driven shaft 78. The valve piston 231 thus meters the flow of fluid under pressure to the governor output conduit 253 between the land 233 and an edge of the port 237, and it provides a regulated governor pressure in the conduit 253 that increases with the speed of the driven shaft 78 and of the vehicle.

As has been previously explained, the ball 419 of the check valve 416 closes the port 420 connected with the governor pressure conduit 253 when the auxiliary manual valve 125 is in its high range condition, and the governor pressure is thus supplied to the port 250 of the governor regulator valve 124 but not to the conduit 418. The ball check valve 416 under these conditions also supplies line pressure through the conduits 418 and 417 to the low-high shift valve 123 holding the valve piston 396 to the limit of its movement to the left; and therefore, the port 405 connected with the conduit 253 is blocked. Both the check valve 416 and the low-high valve 123 for low range operation supply the governor pressure to other parts, as will be hereinafter described; but for high range operation of the unit B, the valves 416 and 123 block such governor pressure application as just described.

The governor pressure supplied from the conduit 253 to the governor regulator valve 124 through the port 250 is effective on the right end of the piston 241 and tends to move the piston 240 to the left so as to open the line pressure supply port 246 which is connected with the line pressure conduit 252, to the port 247 through the groove defined by the lands 242 and 243. Pressure is thus supplied to the port 247 and the conduit 251, and this pressure is applied on the left end of the piston 240 through the port 245 and tends to move the piston 240 back into its original position in which its land 242 blocks the port 246. The valve piston 240 and in particular its land 242 thus meters fluid flow from the line pressure supply port 246 into the port 247 and the conduit 251 connected therewith, opening the port 246 for increasing the pressure in the conduit 251 as the governor pressure applied on the right end of the piston 241 increases and blocking the port 246 when such increases terminate, so as to provide a regulated governor pressure in the conduit 251 which is substantially the same as the pressure in the governor output conduit 253. The pressure in the conduit 251 will be different for low range drive as compared to the pressure in the conduit 253, as will be subsequently explained. The regulated governor pressure in the conduit 251 is supplied to the compensator valve through the branch conduit 290 and the ports 289 and 280.

The governor pressure supplied through the port 280 is applied on the left end of the compensator valve piston 269 and tends to move the compensator valve piston 270 to the right, the piston 270 being the regulating piston of the compensator valve 110. The governor pressure applied through the port 289 on the right end of the compensator valve piston 271 is not immediately effective on the piston 270 when the vehicle is being started, since line pressure is supplied between the lands 278 and 279 from the conduit 229 and the port 288. The governor pressure starts from zero when the vehicle is at a standstill and increases, while the line pressure is at some much higher value, such as 75 lbs. p.s.i., under the same conditions. Since the land 279 is larger than the land 278, the piston 271 is held to the limit of its movement to the right out of contact with the regulating piston 270 until the governor pressure increases sufficiently to overcome the effect of line pressure on the lands 278 and 279. The governor pressure in the conduit 290 is initially, at low speeds of the vehicle, effective through the valve piston 269 on the regulating piston 270.

The modulator pressure in the port 264, that increases with accelerator opening to a predetermined maximum, is impressed through the port 286 on the lands 275 and 276; and, since the land 275 is larger than the land 276, this modulator fluid pressure tends to move the compensator piston 270 to the left. This is just opposite to the effect of the increasing governor pressure in the conduit 290.

Line pressure is supplied to the port 284 from the conduit 229, and the piston 270 functions to regulate so as to provide compensator pressure in the conduit 291 connected with the compensator valve port 283. This compensator pressure increases with increasing governor pressure in the conduit 290 and decreases with increasing throttle pressure in the throttle pressure conduit 230 and modulator pressure in the ports 264 and 286. The spring 277 tends to hold the piston 270 to the limit of its movement to the right opening the port 284 by means of the groove between the lands 273 and 274 to the port 283 and the compensator conduit 291. Fluid thus flows into the conduit 291. The compensator pressure in the conduit 291 flows through the restriction 292 and the port 285 between the lands 274 and 275 and tends to move the piston 270 back again so as to close the port 284 by means of the land 274, this return movement of the piston 270 being by virtue of the fact that the land 274 is larger than the land 275. Thus, the land 274 meters fluid flow between it and an edge of the port 284, providing a certain regulated compensator pressure in the conduit 291. The governor pressure tends to move the piston 270 to the right as above described, so as to move the land 274 off the port 284 and admit further fluid pressure to the compensator conduit 291. Thus, the compensator pressure in the conduit 291 increased with governor pressure and vehicle speed. The modulator pressure, as above described, tends to move the piston 270 to the left to close the line pressure supply port 284 by means of the land 274, and thus the compensator pressure in the conduit 291 decreases with increasing throttle pressure and modulator pressure.

The piston 271, at higher speeds of the vehicle, reduces the effect of the governor pressure just described in increasing the compensator pressure in the conduit 291. As the governor pressure in the conduit 290 rises, eventually it is sufficient so as to move the piston 271 to the left, so that this piston acts on the piston 270 and tends to move the latter piston to the left against the action of the governor pressure transmitted through the piston 269. The piston 271 is moved to the left by the governor pressure when the governor pressure overcomes the effect of the line pressure impressed through the port 288 on the lands 278 and 279 tending to move the piston 271 to the right. The line pressure in the conduit 229 and applied to the land faces 278 and 279 decreases with increasing governor speeds, as will be hereinafter described, and there thus exists a crossing of the effect of line pressure which decreases with increasing vehicle speed and governor pressure which increases with vehicle speed, both effective on the piston 271, after which the piston 271 is effective on the valve piston 270 and its regulating action.

When the vehicle starts to move, after the accelerator 370 has been moved toward its open throttle position to increase the speed and power output of the vehicle engine, the rear pump 106 begins its pumping action and draws fluid through the intake conduit 147 from the sump 146 and discharges it into the outlet conduit 148. The check valve 151 remains closed until the pressure of the fluid discharged by the rear pump 106 increases to a sufficient value to overcome the forces due to the line pressure and the spring 151 effective on the piston 150; and at this time, the check valve 149 opens and the rear pump discharges into the portion of the conduit 148 beyond the check valve 149. The fluid flow through the latter portion of the conduit 148 then reverses and closes the check valve 152 by moving the piston 153 upwardly onto its seat. The closing of the check valve 152 blocks discharge by the front pump 105 into the line pressure conduit 148 and its connected conduits, and the rear pump now becomes the sole supply of line pressure for the conduit 148 and connected conduits. The line pressure in the conduit 148 is impressed on the main oil pressure regulator valve piston 155 and particularly its lands 157 and 156 through the port 162 to provide the regulating action between the land 159 and the port 165 when the front pump 105 is alone providing the line pressure, and when the line pressure increases slightly due to closing of the check valve 152 and opening the check valve 149 as just described, the piston 155 is moved slightly to the left, since the line pressure is effective to move the piston 155 in this direction due to the land 157 being larger than the land 156, and under these conditions, the port 165 is fully opened so as to connect the ports 165 and 164. With the rear pump 106 being active, the regulating effect of the valve 120 is between the edge of the land 158 and the right hand edges of the port 164, with the excess pressure produced by the rear pump 106 escaping from the port 163 through the groove between the lands 157 and 158 to the port 164. With the rear pump 106 being thus active to produce the line pressure, the line pressure is now regulated exactly as has been previously described, except that it is slightly higher in value and is metered between the land 158 and the port 164 instead of between an edge of the port 165 and the land 159. The front pump now functions solely to supply fluid under pressure to the converter 29.

The compensator pressure in the conduit 291 as it changes with accelerator opening and vehicle speed causes a change in the line pressure regulating action of the main oil pressure regulator valve 120 as compared with its operation when the accelerator is in its closed throttle position and the vehicle is stationary. The pressure in the conduit 291 is impressed on the right end of the valve 120 through the port 161 and tends to move the piston 155 to the left against its spring 160 to more fully open the port 165 or the port 164 depending on which of these ports is regulating, with the driven shaft pump 106 being inactive in one case and active in the other case. The piston 155 thus vents the line pressure conduit 148 less and maintains the line pressure in the conduit 148 at a higher value as the compensator pressure in the conduit 291 decreases and acts conversely to maintain the line pressure at a lower value as the compensator pressure increases.

As has been explained, the compensator pressure in the conduit 291 increases with increasing governor pressure in the conduits 253 and 251 and increasing vehicle speed and decreases with increasing throttle pressure and throttle opening. Therefore, the line pressure, which is initially supplied to the servomotor 126 for the front brake 32 and also to the piston 57 for the front clutch 30 for engaging the friction devices when the selector valve piston 166 is put in its drive range position, increases with accelerator opening and decreases with increasing vehicle speed. The line pressure is made to increase with increased accelerator opening so that the front clutch 30 and the front brake 32 have the capacity to take the additional torque from the vehicle engine which results from depression of the accelerator 370 and opening of the engine throttle. As has been hereinbefore explained, the hydraulic torque converter 29 is of the usual type providing a decreased torque multiplication as the speed increases; and, therefore, line pressure can be and is decreased with increasing governor pressure and vehicle speed since the engaging devices and the gearing behind the torque converter 29 need take a decreasing torque with the decreasing torque multiplication of the torque converter 29. The line pressure is also supplied at times to the servomotors for the other brakes and clutches for engaging these friction devices; and the line pressure is made to vary as above described, in accordance with throttle opening and vehicle speed, so that the engaging pressures of the friction brakes and clutches are just a little higher than is required to carry the torque by each of these clutches and brakes. It has been found that if these clutches and brakes are engaged for changing drive through the transmission with engaging pressures which are just a little higher than sufficient for carrying the torque, the engagement of these friction devices and the consequent completions of the power trains are relatively smooth.

The compensator pressure in the conduit 291 functions on the low oil pressure regulator valve 119 to cause an increase in the pressure within the torque converter 29 as the accelerator is depressed and to cause a decrease in the pressure within the torque converter 29 as the vehicle speed increases. The compensator pressure is applied to the right end of the regulator valve 119 and tends to move the piston 357 to the left against the action of the spring 361 so as to increase the metering effect between the land 359 and the edge of the port 365, thereby relieving a greater amount of fluid from the torque converter 29 flowing through the outlet conduit 365 of the torque converter 29. Thus, as the compensator pressure in the conduit 291 increases, the bleeding effect of the valve 119 is increased to decrease the fluid pressure in the torque converter 29, and as the compensator pressure decreases, this bleeding effect decreases to cause an increase in the pressure in the torque converter 29. Thus, the pressure in the torque converter 29 is increased as the vehicle accelerator is moved toward open throttle position, and the pressure in the torque converter 29 is decreased as the vehicle speed increases. This regulating of the fluid pressure in the torque converter 29 is provided, since a greater fluid pressure is required in the torque converter with increasing torque output of the vehicle engine; and a decreasing pressure in the torque converter 29 is sufficient with decreased torque multiplication by the torque converter with increasing speeds.

The governor pressure in the conduit 251, which is the same as the governor pressure in the conduit 253 at this time, is effective through the ports 206 and 197 on the 2 to 3 shift valve 114 and particularly is effective on the piston 183 and the piston 182 of this valve tending to move the valve piston 182 to the left from its intermediate speed position in which it is illustrated to its high speed position. Such movement of the piston 182 is against the action of the so-called "shift valve plug pressure" which is provided by the plug 181 in the conduit 207. The throttle pressure within the conduit 230 is impressed through the port 193 on the left end of the plug 181 and tends to move the plug against the action of the spring 191 so as to connect the ports 193 and 194 and supply pressure to the conduit 207. The pressure in the conduit 207 is supplied through the port 196 to the right hand end of the plug 181, and this pressure augments the action of the spring 191 in returning the plug 181 to a position blocking the port 194. The plug 181 thus functions as a regulating valve, opening the port 194 on an increase of throttle pressure and closing the port 194 when the pressure within the conduit 207 applied to the right end of the plug 181 becomes sufficient to augment the force due to the spring 191 sufficiently so as to move the plug 181 to the left. The plug 181 thus provides a "shift valve plug pressure" in the conduit 207 that increases with throttle pressure but is less than throttle pressure by a predetermined value due to the force provided by the spring 191 on the plug 181. When the speed of the vehicle becomes sufficiently great to produce a sufficiently high governor pressure, the plug 183 and the piston 182 move into their high speed drive positions with the piston 182 being in contact with the plug 181 which is bottomed in its cavity. Movement of the piston 182 from its intermediate speed to its high speed position is due to the action of the governor pressure effective through the port 206 on the right end of the valve piston 183 and effective through the port 197 on the right face of the land 184, both applications of governor pressure tending to move the piston 182 to the left into its high speed position. This movement of the pistons 182 and 183 is opposed by the action of the throttle pressure, the "shift valve plug pressure" and the springs 191 and 192. Throttle pressure is effective on the left end of the piston 181 and is transmitted through the spring 191 to the piston 182. The "shift valve plug pressure" is effective on the left face of the land 184 from the port 196, and this pressure is also transmitted through the conduit 207 and the port 205 to the left face of the land 190 of the plug 183 and is effective on both lands to oppose movement to the left of the respective valve pistons 182 and 183. The springs 191 and 192, of course, oppose movement of the piston 182 to the left. When the forces on the pistons 182 and 183 due to governor pressure overcome the forces due to the throttle pressure, the "shift valve plug pressure" and the springs 191 and 192, the piston 182 moves to the left into its high speed position.

In the high speed position of the piston 182, it connects the ports 201 and 202 by means of the groove between the lands 186 and 187, the land 186 having been moved off the port 201. Line pressure is supplied to the port 201 through the conduit 209 and the port 178 of the manual valve 107, and line pressure thus flows from the port 201, through the groove between the lands 186 and 187 and into the port 202 and the conduit 208. The conduit 208 is connected with the piston 63 for the clutch 31 engaging the clutch and thereby completing the high speed forward drive. The line pressure in the port 202 also flows to the port 198 connected therewith and through the groove between the lands 185 and 186, the port 197, the port 326 of the orifice control valve 112, the groove between the lands 319 and 320, the upper port 325 and the conduit 332 to the disapply cavity 132 of the servomotor 126 for the front brake 32. The orifice control valve 112 is under the control of throttle pressure in the throttle pressure conduit 230, and the throttle pressure is applied on the orifice control valve piston 318 through the port 324. The throttle pressure holds the piston 318 moved to the limit of its movement to the right as seen in FIG. 1C against the action of the spring 336 whenever the accelerator is depressed to a substantial extent to provide a substantial throttle pressure. It is assumed that this change from intermediate speed drive to high speed drive is made when the accelerator is at some open throttle position so that the upper port 325 and the port 326 are completely opened with respect to each other; and, therefore, the fluid flowing through the conduit 332 to the disapply cavity 132 of the servomotor 126 is not impeded by the restriction 331 of the orifice control valve 112. The line pressure supplied to the disapply cavity 132 of the servomotor 126 augments the action of the spring 133 to move the piston 127 of the servomotor 126 back into its brake disapplying position, such movement being against the action of line pressure within the cavity 131 of the servomotor 126. The disengagement of the brake 32 breaks the intermediate speed drive.

A downshift from high to intermediate speed ratio may be obtained by moving the accelerator 370 to a fully opened throttle or kickdown position. The downshift valve piston 215, when the accelerator is so positioned, is moved toward the right so as to connect the ports 221 and 220 by means of the groove between the lands 216 and 217. The port 221 is supplied with line pressure from the conduits 148 and 229; and line pressure is thus supplied through the port 220, the conduit 228, and the port 195 into the cavity the piston 182 of the 2 to 3 shift valve 114 and on the left face of the land 184. The piston 182 and the plug 183 are moved by the line pressure, as so applied, to the right to the limit of their movement into their intermediate drive positions, assuming that the vehicle is not travelling at some unduly speed, such as 70 miles per hour, at which the governor pressure is so high that the line pressure impressed on the land 184 cannot move the pistons 182 and 183 to the right against the effect of governor pressure on the end of the plug 183 and on the right face of the land 184.

The valve piston 182 in its intermediate speed drive position connects the ports 202 and 203 by means of the groove between the lands 186 and 187 and drains the clutch piston 63 through the conduit 208, the ports 202 and 203, the conduit 210, and the ports 172 and 171 of the manual selector valve 107. The clutch 31 is thus disengaged to break the high speed power train in the unit A.

The 2 to 3 shift valve piston 182 also connects together the ports 199 and 200 in the intermediate speed drive position of the piston 182 by means of the groove between the lands 185 and 186, and the release cavity 132 of the servomotor 126 for the brake 32 is drained to the sump through the conduit 332, the ports 325 and 326, which are connected together by means of the groove between the lands 319 and 320 of the orifice control valve 112 when the accelerator is in its open throttle position, the ports 199 and 200, the conduit 334, the ports 327 and 328 also connected together by the orifice control valve piston 318 when the accelerator is in its open throttle position, the conduit 335, the port 312 of the inhibitor valve 117, the groove between the lands 304 and 305 of the valve 117 and the bleed port 311. The inhibitor valve piston 303 is at this time moved to the limit of its movement to the left against the action of the spring 306 so as to connect the ports 311 and 312. The inhibitor valve 117 is under the control of the regulated governor pressure in the conduit 251 which is applied through the port 314 on the right end of the piston 303, and the governor pressure holds the piston 303 to the limit of its movement to the left above relatively slow speeds of the vehicle, such as 18 m.p.h., when the auxiliary unit B is in its high ratio. The release cavity 132, being thus drained, allows engagement of the brake 32 under the action of the line pressure in the cavity 131 of the servomotor 126. The clutch 31 is thus disengaged, and the brake 32 is engaged to again complete the intermediate speed drive.

A downshift from high speed drive to intermediate speed drive may also be obtained under the action of the governor valve 118 and the governor regulator valve 124 as the vehicle speed decreases, as for example, when the accelerator is in a closed throttle position. Under these conditions, the orifice control valve 112 functions to retard the draining of fluid from the brake release cavity 132 of the servomotor 126 for the front brake 32 so as to cushion the engagement of this brake and prevent an unduly harsh completion of the intermediate speed drive. As the vehicle speed and the governor pressure in the conduits 253 and 251 decrease, the springs 191 and 192 of the 2 to 3 shift valve 114 eventually overcome the governor pressure applied to the piston land 190 through the port 206 and on the piston land 184 through the port 197 and move the piston 182 to the right into its intermediate speed position. The conduit 208 connected with the clutch 31 is drained as just described to disengage the clutch 31, through the ports 202 and 203, the conduit 210, and the ports 172 and 171. Since the accelerator is released, the throttle pressure in the conduit 230 is at substantially zero value, and the spring 336 of the orifice control valve 112 is effective to hold the valve piston 318 at the limit of its movement to the left so as to block the port 326 with respect to the upper port 325. Pressure drains from the release cavity 132 through the conduit 332, the port 325, the restriction 331, the ports 199 and 200. The conduit 334, the ports 327 and 328 which are connected at this time by the groove between the lands 321 and 322 of the orifice control valve piston 318, the conduit 335, the ports 312 and 313 which are connected at this time by the groove between the lands 304 and 305 of the inhibitor valve 117, the conduit 316 and the ports 299 and 298 of the 2 to 1 shift valve 113. The spring 296 of the 2 to 1 shift valve 113 at this time is effective to hold the piston 293 to the limit of its movement to the left. The 2 to 1 shift valve piston 293 is under the control of the downshift pressure in the conduit 228 provided by the downshift valve 215; and this downshift pressure, of course, is not present at this time when the governor is effective to downshift the transmission unit A from its high speed drive to its intermediate speed drive. Since the fluid from the release cavity 132 of the servomotor 126 drains through the restriction 331, application of the brake 32 is delayed, thereby smoothing the shift from third speed ratio to second speed ratio with the accelerator in closed throttle position.

A kickdown from intermediate to low speed drive in the unit A may be obtained when the vehicle is being started, for the purpose of additional acceleration, by moving the accelerator 370 to its kickdown position. As previously described, when the accelerator 370 is in its kickdown position, the downshift valve piston 215 connects the ports 221 and 220 thus supplying line pressure to the conduit 228. The port 297 connected with the conduit 228 supplies this line pressure to the left end of the 2 to 1 shift valve piston 293 and moves this piston to the right to the limit of its movement against the action of the spring 296. Line pressure is supplied to the port 300 of the 2 to 1 shift valve 113 through the conduit 302 and the port 176 of the manual valve 107, and line pressure flows from the port 300 between the lands 294 and 295 of the 2 to 1 shift valve piston 293, the port 299, the conduit 316, the ports 313 and 312 connected by the groove between the lands 304 and 305 of the inhibitor valve 117, the conduit 335, and the ports 327 and 328 connected by the groove between the lands 320 and 321 of the orifice control valve piston 318 which is moved to the right by the action of throttle pressure on the land 319 from the port 324, to the conduit 334. The line pressure thus supplied to the conduit 334 divides, part of it going to the 2 to 3 shift valve 114 and the other part going into the branch conduit 355. The line pressure flowing through the conduit 334 to the 2 to 3 shift valve 114 flows through the ports 200 and 199 with the 2 to 3 shift valve piston 182 being in its intermediate speed position, the ports 326 and 325, conduit 332 to the release cavity 132 of the servomotor 126 for the front brake 32. The line pressure flows from the conduit 355 through the ports 352 and 353, the ball 350 of the check valve 115 being moved by the line pressure against the action of its spring 351 so as to open the port 352, and the conduit 354 to the port 343 where it is blocked in the groove between the lands 338 and 339.

As the pressure builds up in the disapply cavity 132 of the servomotor 126, it builds up correspondingly on the left end of the transition valve piston 337, since the disapply cavity 132 is connected through the conduits 332 and 347 with the port 342 of the transition valve 116. When the pressure builds up sufficiently, the transition valve piston 337 is moved to the right against the action of the spring 349 so as to connect the ports 343 and 344 by means of the groove between the lands 338 and 339. Fluid pressure then flows from the branch conduit 355 through the check valve 115, by-passing the restriction 356, the conduit 354, the ports 343 and 344, and the conduits 348 and 330 to the servomotor 134 for the rear brake 33. The rear brake is then engaged; and, as is apparent, rear brake engagement is begun when front brake disengagement has progressed to a predetermined degree with a corresponding rise of pressure within the disapply cavity 132, due to the functioning of the transition valve 116. The transmission unit A is now in low speed ratio.

With the accelerator 370 remaining in its kickdown position, the transmission unit A will remain in its low speed drive until the vehicle speed increases sufficiently to move the inhibitor valve piston 303 to the limit of its movement to the left against the action of the spring 306. Regulated governor pressure in the conduit 251 is applied through the port 314 to the right end of the inhibitor valve piston 303; and, when the vehicle reaches a predetermined speed, such as 18 m.p.h., the regulated governor pressure will move the inhibitor valve piston 303 to the left. In this position, the piston 303 connects the ports 312 and 311, and the conduit 335 and connected parts are drained to the sump through the bleed port 311. The disapply cavity 132 is drained to the sump by means of the same ports and conduits connected with the conduit 335 as were used for supplying fluid pressure to the disapply cavity 132 as just described. The conduit 355 connected with the conduit 354 and which supplies fluid pressure to the rear brake servomotor 134 as just described, is also connected with the conduit 335 that is in turn connected with the bleed port 311 of the inhibitor valve through the same connections as were previously described in connection with the supply of fluid pressure to the servomotor 134, and fluid flows from the servomotor 134 through the conduits 330 and 348, the ports 344 and 343 of the transition valve 116 and through the restriction 356 to the conduit 355 in such draining of the servomotor 134. The check valve 115 is effective to close the port 352 when the servomotor 134 is drained, and the restriction 356 is effective to retard the draining, so that the low speed drive is maintained longer than would otherwise be the case to assure that the low speed drive does not disengage prematurely, before the intermediate speed drive is effective. When the pressure in the disapply cavity 132 of the forward brake servomotor 126 decreases sufficiently on being drained; the transition valve piston 337, since it is subjected through the port 342 and conduits 347 and 332 to the same pressure as is present in the disapply cavity 132 of the servomotor 126, eventually moves to the limit of its movement to the left under the action of the spring 349, and at this time the conduits 348 and 330 connected to the servomotor 134 for the rear brake 33 are connected by means of the groove between the lands 340 and 341 directly with the bleed port 345, so that draining of the servomotor 134 at this time takes place exclusive of the restriction 356.

The unit A may also be utilized to start the vehicle in its low speed drive without a depression of the accelerator 370 to its kickdown position, the unit B remaining in its high speed ratio. For this operation, the manual valve 107 is put into its L or low range position. In this position, the manual valve piston 166 blocks the port 178 and the conduit 209 connected therewith; however, the ports 177 and 176 remain connected with the line pressure supply port 175 by means of the groove between the lands 169 and 170. In this position, the groove between the lands 169 and 168 connects the line pressure supply port 174 with the port 173 connected to the conduit 227, and therefore, the latter conduit as well as the branch conduit 315 are under these conditions supplied with line pressure. The conduit 209 connected with the port 178 which is now drained to the sump is utilized as has been previously described for supplying line pressure to the 2 to 3 shift valve 114 for completing the high speed ratio by engaging the clutch 31; and, therefore, this pressure is not available in low range drive and the third speed drive in unit A can never be completed in this range of drive. The line pressure supplied to the branch conduit 315 flows therethrough to the port 309 of the inhibitor valve 117 and holds the inhibitor valve piston 303 in its illustrated position. As has been previously described, the regulated governor pressure in the conduit 251 is impressed on the right end of the inhibitor valve piston 303; however, regardless of increases in speed of the vehicle, the valve piston 303 remains in its illustrated position due to the application of line pressure on the left end of the piston 303.

The line pressure in the conduit 227 flows to the port 219 of the downshift valve 108 and between the lands 216 and 217 of the downshift valve piston 215 to the port 220 and the connected conduit 228. As has been previously described in connection with high range operation, the application of line pressure to the conduit 228 completes in the transmission unit A its low speed drive, and therefore, the vehicle will start in its low speed drive at this time. In brief, line pressure in the conduit 228 flows therethrough to the port 195 of the 2 to 3 shift valve 114 so as to apply line pressure on the left face of the port 184 of the 2 to 3 shift valve 114 for thereby holding the 2 to 3 shift valve piston 182 in its intermediate speed, downshifted, position. Line pressure in the conduit 228 is also applied to the left end of the 2 to 1 shift valve 113 and moves the piston 293 of this valve to the right to the limit of its movement against the action of the spring 296. Line pressure is present in the conduit 302, and flows through the 2 to 1 shift valve 113, the conduit 316, the inhibitor valve 117, the conduit 335, and the orifice control valve 112 to both the conduit 334 and 355 for application of line pressure to the servomotor 134 for the low speed brake 33 and the application of line pressure to the disapply cavity 132 of the servomotor 126 for the front brake 32 as previously described. The low speed brake 33 is thus applied and the intermediate speed brake 32 is disengaged. The clutch 30 remains applied by fluid pressure supplied from the port 177 of the manual valve 107, and the transmission unit A is in low speed drive.

While the vehicle is travelling, the transmission unit A may be downshifted from intermediate speed drive to low speed drive by moving the manual valve piston 166 from its D to its L position, assuming that the speed of the vehicle is not unduly high. As has been previously described, when the manual valve 107 is in its L position, it provides line pressure to the conduits 227 and 315. The conduit 315 is connected with the inhibitor valve 117 to thereby supply line pressure to the latter, and this valve is also under the control of the regulated governor pressure in the conduit 251. Assuming that the vehicle speed is sufficiently high so that the corresponding high regulated governor pressure in the conduit 251 is sufficient to hold the inhibitor valve piston 303 to the limit of its movement to the left against the action of the spring 306 when the manual valve piston is moved to its L position, the pressure supplied to the conduit 315 is drained to the sump through the port 309, the cavity 307, the passage 308 and the bleed port 310. A change to low speed drive in the unit A thus does not take place with the vehicle travelling at this high speed.

As soon, however, as the vehicle speed decreases sufficiently so that the inhibitor valve piston 303 moves to the limit of its movement to the right under the action of the spring 306, the bleeding effect of the conduit 315 by the inhibitor valve is stopped with the passage 308 in the piston 303 now being blocked, and the line pressure in the conduits 315 and 227 builds up to its regulated value and is transmitted to the port 219 of the downshift valve piston 215. It is assumed that the accelerator is in a relaxed position corresponding to this decrease in vehicle speed, and the line pressure flows through the ports 219 and 220, the conduit 228 and the port 297 to the left end of the 2 to 1 shift valve piston 293. This application of line pressure, similarly as in the case of a downshift in drive range by movement of the accelerator to an open throttle kickdown position, moves the 2 to 1 shift valve 113 to the right, and the line pressure in the conduit 302 is transmitted through the 2 to 1 shift valve 113, the conduit 316, the inhibitor valve ports 313 and 312, the conduit 335, and the orifice control valve ports 327 and 328 connected by means of the groove between the lands 321 and 322 to the conduit 334. The orifice control valve pistons 317 and 318 are at this time at the limit of their movement to the left under the action of the spring 336, since there is at this time no throttle pressure present in the conduit 230 and connected port 324 to be effective on the land 319 of the piston 318, and there is at this time no substantial pressure present in the conduit 330 connected with the low speed brake servomotor 134 and acting on the plug 317. The fluid in the conduit 334 branches off to both the branch conduit 355 for supplying the servomotor 134 and also to the port 200 of the 2 to 3 shift valve 114 for supplying the release cavity 132 of the servomotor 126 for the front brake 32. The line pressure flows from the conduit 334 through the 2 to 3 shift valve ports 200 and 199, the restriction 331 of the orifice control valve 112, the port 325 and the conduit 332 to the disapply cavity 132 of the front brake servomotor 126. The line pressure in the branch conduit 355 flows through the check valve 115 as has been previously described in connection with the downshift under the control of the accelerator 370, the conduit 354 to the port 343 of the transition valve 116, and when the pressure in the conduit 332 and in the release cavity 132 builds up sufficiently, the inhibitor valve piston 337 shifts to the right and applies pressure through the transition valve to the conduits 348 and 330 to the low speed brake servomotor 134.

The orifice control valve 112 by means of its restriction 331 acts to slow application of the rear brake 33 and disapplication of the front brake 32 on this change from intermediate speed to low speed ratio with the accelerator being in closed throttle position. Initially, on this change of drive, the pistons 317 and 318 of the orifice control valve 112 are at the limit of their movement to the left. As is apparent, all of the fluid flow to the conduit 332 and the disapply cavity 132 flows through the restriction 331 of the orifice control valve 112 which slows fluid pressure application to the servomotor 126 and cushions its action; and, as has been described, the transition valve piston 337 does not move to initiate engagement of the rear brake 33 until the pressure within the disapply cavity 132 and in the connected conduits 332 and 347 builds up sufficiently to move the transition valve piston 337 against the action of its spring 349. When this piston 337 eventually does move, line pressure then flows through the conduit 355, the check valve 115, the conduit 354, the ports 343 and 344 of the transition valve 116, the conduits 348 and 330 to the rear brake servomotor 134. The orifice control valve 112 has an additional function in further restricting this fluid flow to the servomotor 134 after application of pressure to this motor has begun. The plug 317 of the orifice control valve 112 has the pressure within the conduit 330 connected to the servomotor 134 applied to it through the port 323, and after the transition valve piston 337 has moved, the pressure in the conduits 348 and 330 builds up and eventually reaches a predetermined value at which it is sufficiently effective on the plug 317 to move the pistons 317 and 318 of the orifice control valve to the right. During such movement, the land 321 blocks the ports 327 and 328 with respect to each other, and the fluid pressure which flows through the conduits 335 and 334 for application to the release cavity 132 of the servomotor 126 and also to the rear brake servomotor 134 flows through the restriction 333, and the disengaging action of the front brake 32 and the engaging action of the rear brake 33 are thus further slowed. Thus, during a downshift from intermediate speed ratio to low speed ratio with the accelerator released, due to a movement of the manual valve piston 166 from its D to its L position, as the vehicle is travelling and decreasing speed, the restriction 331 functions to retard disengaging fluid pressure flow to the front band servomotor 126, and the restriction 333 functions to retard both the disengagement of the front band 32 and the engagement of the rear band 33 once the fluid pressure applied to the rear brake servomotor 134 reaches a predetermined value sufficient to move the orifice control valve 112. The smoothing of this downshift is particularly desirable, since, under closed throttle conditions, the vehicle tends to drive the engine from the driven shaft 78 to the drive shaft 25, and the reaction on the brake 33 for this direction of drive is in the direction indicated by the arrow Z, tending to wrap the band 66 on its drum 67. The completion of the low speed power train in the unit A will thus be too harsh, unless measures are taken to engage the brake 33, in particular, gradually for completion of this downshift.

The unit A is changed to reverse drive condition by moving the manual selector valve piston 166 into its R position, with the rear unit B remaining in high speed drive. In its R position, the piston 166 connects the line pressure supply port 175 with the ports 176 by means of the groove between the lands 169 and 168, and line pressure is thus supplied through the conduit 179 to the apply cavity 131 of the front brake servomotor 126. The brake 32 is, however, disengaged, since line pressure is also supplied to the disapply cavity 132 as will be described. The line pressure supplied to the lower port 176 flows through the conduit 302 to the 2 to 1 shift valve 113. In the R position of the valve piston 166, the groove between the lands 168 and 167 connects the line pressure supply port 174 with the ports 173 and 172. The line pressure supplied to the port 172 flows through the conduit 210 to the port 203 of the 2 to 3 shift valve 114 and from thence through the groove between the lands 186 and 187 of this valve, the port 202, and the conduit 208 to the piston 63 for the rear clutch 31 engaging this clutch. The throttle modulator valve 111 is also connected with the conduit 210, and line pressure is supplied to the left end of the valve 111. The throttle modulator valve piston 254 is thus moved to the limit of its movement to the right, so that this valve piston connects together the ports 265, 264 and 266. The throttle pressure in the conduit 230 is thus supplied to both the ports 264 and 266 of the throttle modulator valve and thereby to the connected ports 286 and 287 of the compensator valve 110. Throttle pressure is thus applied between the lands 275 and 276 of the compensator valve 110 and also to the right end of the compensator valve piston 270, and the throttle pressure is thus more effective in reverse drive on the compensator valve piston 270 than for any of the forward drives, tending to maintain the land 274 blocking the line pressure supply port 284. The compensator pressure in the conduit 291 thus, in general, for reverse drive is lower than for the forward drives; and, therefore, the line pressure in the conduit 148 and the pressure in the converter 29 for reverse are higher than for the forward drives. The increased line pressure for reverse drive is necessary, particularly, since the rear brake 33 must take a higher reaction for the reverse drive than for the low speed forward drives in the unit A.

The line pressure supplied to the port 173 is effective, as in the case in which the fluid pressure is applied to this port for the low range drive, to apply line pressure in the release cavity 132 of the front brake servomotor 126 and to the rear brake servomotor 134. Line pressure is supplied through the conduits 227 and 315 to the inhibitor valve 117; and under reverse drive conditions, the inhibitor valve piston 303 is at the limit of its movement to the right under the influence of the spring 306, and the conduit 315 is thus blocked under these conditions by the inhibitor valve 117. The line pressure flowing through the conduit 227 to the port 219 of the downshift valve 108 flows through the downshift valve and the conduit 228 to the port 297 of the 2 to 1 shift valve 113 moving the piston 293 of this valve to the right. Line pressure then flows from the conduit 302 through the 2 to 1 shift valve 113, the conduit 316, the inhibitor valve ports 313 and 312, the conduit 335 and the orifice control valve ports 328 and 327 to the conduit 334. The line pressure flow branches off at this point and flows through the 2 to 3 shift valve ports 200 and 199, the restriction 331, the port 325 and the conduit 332 to the release cavity 132 of the front brake servomotor 126. The line pressure in the branch conduit 355 connected with the conduit 334 flows through the check valve 115, the conduit 354, the transition valve 116, the conduits 348 and 330 to the rear brake servomotor 134, similarly as for low speed forward drive, and the rear brake 33 is engaged. Since the rear clutch 31 as well as the rear brake 33 are engaged under these conditions, the reverse drive power train is completed through the unit A.

All of the shifting between speed ratios that has been so far described has been done in the front unit A, with the rear unit B effectively connecting the shafts 26 and 78 in direct drive. It is thus apparent that, if desired, the front unit A could be used exclusively of the rear unit B, with the shaft 26 being connected directly with the driving road wheels of the vehicle. In this case, the hydraulic valves for the unit B, in particular, the valves 124, 125, 123, 122, 121, and 416 would be deleted, and the hydraulic connections from the valves of FIGS. 1A, 1B, 1C and 1D to these deleted valves would be cut and blocked. In order to use only the valves applicable to the unit A, referring to FIG. 1E, the conduit 251 which receives governor pressure from the governor regulator valve 124 would be cut and blocked at the line h—h; the conduit 252 which supplies line pressure to the valves 125 and 124 would be cut and blocked at the line j—j; the conduit 415 which supplies line pressure to the low-high shift valve 123 for the L and R positions of the manual valve 107 would be cut and blocked at the line k—k; and the governor pressure conduit 253 which supplies governor pressure to the valves 416 and 123 would be cut and blocked on the line l—l. In addition to such blocking of these conduits, the conduit 253 would be connected directly with the conduit 251, the conduit 253 at point m being connected to the conduit 251 at point m, so as to supply the governor pressure from the governor 118 directly to the governor conduit 251. As has been previously explained, when the unit B is in direct drive, the regulated governor pressure in the conduit 251 is the same as the output governor pressure in the conduit 253; and, therefore, the pressure in the conduit 253 can be directly used if the shaft 26 is connected directly to the driving road wheels.

Referring now to FIGS. 1A to 1E, unchanged, the auxiliary unit B may be operated in low range by moving the auxiliary manual valve piston 385 into its L position. In this position, the line pressure port 389 is blocked by the land 386; the port 390 and the conduit 418 connected therewith are drained to the sump by means of the groove between the lands 386 and 387 and the bleed port 391; and the groove between the lands 387 and 388 connects the line pressure supply port 392 with the port 393. Since the conduit 418 is exhausted, the governor pressure in the conduit 253 when there is movement of the vehicle, moves the ball 419 of the check valve 416 across the port 422, so that the ports 420 and 421 are connected, and governor pressure thus flows through the conduit 417 and the port 412 between the plug 397 and the piston 396. At high vehicle speeds, the governor pressure is high enough to hold the piston 396 to the left in its high speed position against the action of its spring 403 and also against line pressure acting on the land 401 from the ports 393 and 409 (the lands 402 and 401 are slightly larger in diameter than the lands 398, 399 and 400); however, initially, the governor pressure is relatively low, and the spring 403 is effective to move and hold the piston 396 to the limit of its movement to the right. The conduits 227 and 315, as has been previously described, contain line pressure only in the L and R positions of the manual valve 107 for the main transmission unit A which is transmitted through the branch conduit 415 and the port 413 to the right end of the piston 397 for moving the pistons 396 and 397 to the left; however, it is assumed at the present time that the manual valve 107 is in its D position and that such line pressure is therefore not present in the conduit 415.

With the low-high shift valve piston 396 being at the limit of its movement to the right, the line pressure flows from the port 393 through the connected ports 409 and the conduit 433 to the port 428 of the brake transition valve 122, and line pressure also flows through the branch conduit 446 to the port 443 of the clutch transition valve 121. Line pressure also flows through the groove between the lands 400 and 401 of the low-high shift valve 123, the port 408 and the conduit 435 to the right end of the brake transition valve 122, so that the line pressure augments the force due to the spring 426 and moves and holds the brake transition valve piston 423 to the limit of its movement to the left. Line pressure flows from the port 428 of the brake transition valve 122 between the lands 424 and 425 and through the port 429 and conduit 434 to the piston 96 for the brake 77, and the brake 77 is thus engaged to complete the low speed power train through the auxiliary unit B. The line pressure in the conduit 434 is also transmitted through the port 444 of the clutch transition valve 121, and this line pressure moves the piston 436 of this valve to the limit of its movement to the left against the action of the spring 439, so that the land 438 blocks the port 443 which is supplied with line pressure. In this position of the piston 436, the groove between the lands 437 and 438 connects the ports 442 and 441, so that the conduit 432 connected with the piston 90 for the clutch 76 is drained to the sump through the bleed port 441.

As has been explained, in the H position of the auxiliary manual valve piston 385 with the low-high shift valve piston 396 shifted to the left into its high speed position, line pressure is applied to the left end of the clutch transition valve 121 through the conduit 445 from the low-high valve 123; and line pressure also flows from the ports 409 through the conduits 433 and 446, the ports 443 and 442 and the conduit 432 to the clutch 76. When the low-high shift valve 123 moves to its low speed position, the conduits 433 and 446 remain pressurized, but the conduit 445 is drained to the sump through the ports 410 and 411 simultaneously with the admission of line pressure through the ports 409 and 408 and the conduit 435 to the right hand end of the brake transition valve 122. The spring 439 holds the clutch transition valve piston 436 in its illustrated position connecting the ports 443 and 442 for a time, until the pressure that is applied through the ports 428 and 429 and the conduit 434 on the brake piston 96 builds up to a predetermined value. This pressure on the piston 96 is also impressed on the right end of the clutch transition valve piston 436 through the port 444, and when this pressure reaches this predetermined value, it moves the piston 436 against the action of the spring 439 and blocks the pressure supply port 443 by means of the land 438 and connects the port 442 and the clutch supply conduit 432 with the bleed port 441 by means of the groove between the lands 437 and 438. Thus, when the brake apply pressure reaches this predetermined value, the pressure for applying the clutch 76 is blocked by movement of the clutch transition valve piston 436, and the clutch 76 is drained to the sump. The clutch transition valve 121 thus assures that the clutch 76 continues to have apply pressure supplied thereto and is not drained until the pressure applied on the brake 96 increases to a sufficient value so as to provide a suitable overlap of engagement between the brake 77 and the clutch 76 whereby there is never a complete breakage of power trains between the shafts 26 and 78 when a change is made from high speed ratio to low speed ratio in the auxiliary unit B.

If a change is made back again from the L to the H position of the auxiliary manual valve piston 385, the brake transition valve 122 acts similarly to the clutch transition valve 121 in assuring that the brake 77 remains engaged until the apply pressure on the clutch 76 reaches a predetermined value. When the auxiliary manual valve piston 385 is moved from its L to its H position, the low-high shift valve piston 396 moves from its illustrated low speed position to its high speed position; the conduits 433 and 446 remain pressurized; and the conduit 445 is pressurized at the same time that the conduit 435 is drained to the sump. The line pressure on the left end of the clutch transition valve 121 moves the piston 436 to its illustrated position, and pressure flows through the valve 121 and the conduit 432 to the clutch 76. The brake transition valve remains in its illustrated position supplying the brake 77 through the conduit 434 until the pressure in the conduit 432 and applied on the clutch 76 builds up sufficiently to move the brake transition valve piston 423 to the right against the spring 426 so as to drain the brake supply conduit 434 through the ports 429 and 430. The clutch pressure in the conduit 432 must thus reach the predetermined value necessary for shifting the brake transition valve piston 423 against its spring 426 before disengagement of the brake 77 is initiated, thus assuring suitable overlap of engagement.

With the auxiliary manual valve 125 being in its L position and the low-high shift valve piston 396 being in its corresponding low speed position, the groove between the lands 398 and 399 connects the ports 405 and 406. The port 405 is supplied with governor pressure from the conduit 253, and governor pressure is thus transmitted through the conduit 414 to the port 249 of the governor regulator valve 124. This governor pressure in the port 249 acts on the left face of the land 244 and augments the governor pressure as applied to the right end of the piston 241 in tending to move the governor valve piston 240 to the left. Such movement of the governor valve piston 240 tends to open the line pressure supply port 246, so that increased pressure is supplied to the conduits 251 and 290 and all connected valves; and the pressure in the conduit 251 is applied, as before, through the port 245 on the left end of the governor regulator valve piston 240 tending to return the piston 240 to a position blocking the line pressure supply port 246. The overall effect of the application of governor pressure through the port 249 is to multiply the governor pressure in the conduit 251 by some constant, such as, for example, 2.18 for a certain embodiment of the invention. The regulated governor pressure in the conduit 251 is thus always equal to this constant multiplied by the value of governor pressure in the conduit 253. The valve 124 is preferably so designed that the regulated governor pressure existing in the conduit 251 and connected conduits is equal to the governor pressure that would exist in the conduit 253 assuming that the governor valve 118 were driven by the intermediate shaft 26 instead of the shaft 78, so that in effect, the governor pressure that is effective on the valving system for the unit A shown in FIGS. 1A, 1B and 1C is the governor pressure that would be obtained from the shaft 26 which is in reality the output shaft of the unit A. Thus, the upshifts and downshifts that will occur in the unit A will take place at the same speeds of the vehicle engine regardless of whether the unit B is in its reduced speed ratio or is driving in direct drive, even though the governor valve 118 is separated from the unit A by the unit B which may be in either of two different speed ratios.

The low-high shift valve piston 396 is always in its high speed position in which the clutch 76 is engaged when the auxiliary manual valve piston 385 is in its H position; since, under these conditions, line pressure is present in the conduits 418 and 417 and is applied thereby on the right end of the piston 396; however, when the manual valve 125 is in its L position, the low-high shift valve piston 396 is not under all conditions in its low speed position due to the presence of the conduit 415 connecting the manual valve 107 for the main unit A with the low-high shift valve 123 and due to the fact that governor pressure from the conduit 253 is supplied through the check valve 416 and the conduit 417 to the port 412 with the auxiliary manual valve 125 being in its L position. As has been previously explained, the conduits 227 and 315, and therefore the connected branch conduit 415, have line pressure therein in the L and R positions of the manual valve 107, and the line pressure from the conduit 415 is applied to the right end of the piston 397 through the port 415 and moves and holds the pistons 396 and 397 of the low-high shift valve 123 in their high speed positions. Thus, whenever the main unit A is operated in low range or in reverse drive, the rear unit B is in its high speed drive, and possible excessive engine speeds cannot result under conditions in which both the units A and B are in their low speed drives for protracted periods of time or in which the unit A is driving in reverse drive that is a rather low ratio and the unit B is in its low speed drive, the governor pressure that is applied through the port 412 assures that the low-high shift valve 396 cannot move from its high speed position to its low speed position, even though the auxiliary manual valve piston 385 is moved from its H position to its L position, when the vehicle speed is so high that such a movement of the piston 396 and the consequent completion of the low speed power train in the unit B in lieu of the high speed power train would result in overspeeding of the vehicle engine.

The action of the governor regulator valve 124 in connection with the 2 to 3 shift valve 114 for the unit A should be noted. Assuming that the vehicle is not travelling at an unduly high speed, whenever the auxiliary valve 125 is shifted from its L to its H position when the vehicle is travelling, resulting in a movement of the low-high shift valve piston 396 into its high speed position and a resultant decrease of the regulated governor pressure in the conduit 251 due to the action of the governor regulator valve 124, this reduction in regulated governor pressure will cause the 2 to 3 shift valve piston 182 to move back from its high speed position to its intermediate speed position, assuming that the vehicle has previously been moving at a speed sufficient to have caused the movement of the 2 to 3 shift valve piston 182 into its high speed position. Thus, at the same time that the unit B is shifted into its high speed drive, a reduction of the speed ratio in the unit A may be expected, unless the vehicle speed and governor pressure are so high as to prevent such a movement of the 2 to 3 shift valve 114. With these exceptions, the unit A shifts automatically under the control of the valving shown in FIGS. 1A, 1B and 1C in the same manner for the low speed drive in the auxiliary unit B as is described for the high speed drive in the auxiliary unit B.

The second embodiment of the invention which is shown by FIGS. 1A, 1B, 1C, 1D and 1F is the same in many respects as that shown in FIGS. 1A, 1B, 1C, 1D and 1E, the principal difference being that in the second embodiment, the auxiliary transmission unit B is automatically rather than manually controlled. The same governor regulator valve 124, brake transition valve 122 and clutch transition valve 121 with their connections to the parts shown in FIGS. 1A to 1D are used in the second embodiment as in the first embodiment. A different low-high shift valve 455 and a new auxiliary manual valve 456 are used in the FIG. 1F embodiment, taking the places of the low-high shift valve 123 and the auxiliary manual valve 125 in FIG. 1E.

The low-high shift valve 455 comprises valve pistons 457 and 458. The valve piston 457 is a simple plug, and the piston 458 comprises lands 459, 460, 461, 462, 463 and 464 and a stem 465. A spring 466 is disposed between the land 459 and an opposite fixed surface for yieldably holding the piston 458 to the limit of its movement to the right as seen in FIG. 1F, and a spring 467 is provided between the plug 457 and the piston 458. The valve 455 is provided with ports 468, 469, 470, 471, 472, 473, 474, 475, 476, 477, 478, 479 and 480. There are upper and lower ports 476, and these are permanently connected with each other. The ports 469 and 471 are connected together as shown; the port 470 is connected by means of a branch conduit 481 with the conduit 228; the ports 472 and 480 are connected with the governor pressure supply conduit 253; the port 473 is connected by means of a conduit 482 with the port 249 of the governor regulator valve 124; the ports 474 and 478 are bleed ports; the port 475 is connected by means of a conduit 483 with the port 431 of the brake transition valve 122; the upper port 476 is connected by a conduit 484 and a branch conduit 485 with the ports 428 and 443 of the brake and clutch transition valves, respectively; the port 477 is connected by means of a conduit 486 with the port 440 of the clutch transition valve 121; and the port 479 is connected with the conduit 415.

The auxiliary manual valve 456 comprises a valve piston 487 having lands 488 and 489. A spring 490 is provided acting on the piston 487 yieldably holding it in its neutral position in which it is illustrated. The valve 456 comprises ports 491, 492 and 493. The port 491 is a bleed port; the port 492 is connected by means of a conduit 494 with the lower port 476 of the low-high shift valve 455; and the port 493 is connected with the line pressure supply conduit 252.

A throttle check valve 495 is provided to be effective on three different conduits, blocking one and simultaneously connecting the other two. The check valve 495 comprises a ball 496 and three ports 497, 498 and 499. The port 497 is connected with the conduit 415; the port 498 is connected by means of a conduit 500 with the port 468 of the low-high shift valve 455; and the port 499 is connected with a conduit 501 which is tapped into the throttle pressure supply conduit 230.

In the operation of this embodiment of the invention shown in FIGS. 1A, 1B, 1C, 1D and 1F, the auxiliary unit B is shifted automatically along with the unit A under the control of the vehicle accelerator 370 and the governor 118. In the neutral position of the auxiliary manual valve piston 487, the unit B is maintained in neutral condition, inasmuch as the land 489 of the piston 487 at this time blocks the line pressure conduit 252 and its port 493. In order to complete a drive through the unit B, the auxiliary manual valve piston 487 is moved to its "GEAR" position in which the piston 487 connects the line pressure supply port 493 with the port 492 by means of the groove between the lands 488 and 489. Initially, the low-high shift valve piston 458, as the vehicle starts, is in its illustrated low speed drive position; and the line pressure from the port 492 of the auxiliary manual valve 456 thus flows through the conduit 494, the ports 476, the groove between the lands 461 and 462 and the port 475 to the conduits 484 and 485 and the conduit 483. This results in application of fluid pressure to the ports 431 and 428 of the brake transition valve 122 and also to the port 443 of the clutch transition valve 121. As has been previously described in connection with FIG. 1E, this application of pressure results in the engagement of the brake 77, and the unit B is in its low speed drive.

Assuming that the manual valve 107 is in its D position when the vehicle is being started, the intermediate speed drive will be completed in the unit A by the action of the shift valves 113 and 114 as previously described. As the vehicle speed increases, the governor regulator valve 124 which has the governor output pressure applied to it through the conduit 253 and the port 250 and also through the ports 472 and 473 connected together by means of the groove between the lands 459 and 460, the conduit 482 and the port 249, provides a regulated governor pressure in the conduit 251 which is proportional to and higher than the governor pressure in the conduit 253. The pressure in the conduit 251 is impressed on the 2 to 3 shift valve 114 through the ports 206 and 197, and eventually, the governor pressure will move the 2 to 3 shift valve piston 183 to the left into its high speed position causing the unit A to be shifted to its high speed drive.

On still further increases in vehicle speed, the low-high shift valve 455 is effective to cause a change from low speed drive to high speed drive in the unit B. The valve 455 has the governor pressure from the conduit 253 impressed through the port 480 on its right end, and when the governor pressure in the conduit 253 increases sufficiently, it will move the low-high shift valve piston 458 to the left into its high speed position. The low-high shift valve 455 is quite similar in operation to the 2 to 3 shift valve 114 in that it is moved to a relatively high speed drive position by governor pressure acting against spring and throttle pressure. Throttle pressure is impressed on the left end of the low-high shift valve 455 through the conduits 230 and 501, the ports 499 and 498 of the throttle check valve 495, the conduit 500 and the port 468. The throttle pressure is effective through the plug 457 and the spring 467 tending to hold the low-high shift valve piston 458 from movement into its high speed position, and the plug 457 has a function similar to the plug 181 in the 2 to 3 shift valve 114 in providing a "shift valve plug pressure" through the ports 469 and 471 into the cavity in which the shift valve piston 458 is disposed, augmenting the action of the springs 467 and 466 in holding the piston 458 from movement into its high speed position.

The low-high shift valve piston 458 in its high speed position connects the ports 476 and 477 together by means of the groove between the lands 462 and 463. Line pressure continues to flow through the upper and lower ports 476 and the conduits 484 and 485 to the ports 428 and 443 of the clutch and brake transition valves 121 and 122. Line pressure flows from the ports 476 to the port 477 and through the conduit 486 to the port 440 of the clutch transition valve 121, and under these conditions, as previously described, the clutch 76 is engaged to complete the high speed power train through the unit B and the brake 77 is disengaged.

The low-high shift valve piston 458 in its high speed position blocks the governor pressure port 472 and connects the port 473 with the bleed port 474 by means of the groove between the lands 460 and 461. The port 249 of the governor regulator valve 124 is thus vented through the conduit 482 and the ports 473 and 474, and the governor regulator valve 124 is then effective to provide the regulated governor pressure in the conduit 251 which is the same as that in the governor output conduit 253 and which is reduced with respect to the multiplied governor pressure previously supplied to the conduit 251 by the valve 124. This reduction in governor pressure in the conduit 251 which takes place when the low-high shift valve 455 moves into its high speed position is effective with respect to the 2 to 3 shift valve 114 to cause it to return to its intermediate speed position so that the unit A is returned to its intermediate speed drive at the same time as the unit B is shifted into its high speed drive. Subsequently, on still further increases in vehicle speed and governor pressure in the conduits 253 and 251, the 2 to 3 shift valve 114 will be returned again into its high speed position changing the unit A from its intermediate speed drive to its direct drive so that both of the units A and B are now in their direct drives.

With the manual valve 107 remaining in its D position and the auxiliary manual valve 456 in its "Gear" position, assuming that the accelerator 370 is depressed to its kickdown position when the vehicle is being started, both the 2 to 3 shift valve 114 and the low-high shift valve 455 will be in their downshifted positions, and the 2 to 1 shift valve 113 will also be in its downshifted position, so that the unit A will start in low speed and will subsequently be upshifted to its intermediate speed and finally to its high speed, with the unit B remaining in its low speed drive. These changes in drive are by virtue of the upshifting movements of the inhibitor valve 117 and the 2 to 3 shift valve 114 due to the increasing regulated governor pressure in the conduit 251, all as previously described. The downshift valve 215 connects the ports 219 and 220 in its downshifted position supplying line pressure to the conduit 228 which is connected to the port 195 of the 2 to 3 shift valve 114; however, this application of line pressure is overcome when the governor pressure in the conduit 251 increases sufficiently. Subsequently, on a further increase in speed of the vehicle, with the accelerator 370 remaining in its kickdown position, the low-high shift valve 455 will move into its high speed position. Under these conditions, this movement is against not only the actions of the springs 466 and 467 and the throttle pressure applied on the left end of the plug 457 but is also against the action of line pressure which is applied through the conduits 228 and 481 into the cavity for the valve piston 458 on the left face of the land 459. When the valve piston 458 moves into its upshifted position, the port 249 of the governor regulator valve 241 is drained to the sump as previously described, and the governor pressure in the conduit 251 is reduced so as to be equal to the governor pressure in the conduit 253. This reduction in governor pressure effective on the 2 to 3 shift valve 114 through the ports 197 and 206 is sufficient so as to cause a return of the 2 to 3 shift valve 183 to its intermediate speed position so that the unit A is downshifted from high speed drive to intermediate speed drive at the same time that the unit B is upshifted into its high speed drive. Subsequently, on an increase in governor pressure, the 2 to 3 shift valve 114 is returned by the governor pressure into its high speed position so as to upshift the unit A into its high speed drive.

Assuming that the vehicle is travelling with both the unit A and the unit B in high speed drive with the manual valve 107 being in its D position and the auxiliary manual valve 456 being in its "Gear" position, and the accelerator is suddenly moved from a mid-position to its kickdown position, the unit A may be downshifted from high to intermediate speed drive with the unit B remaining in high speed drive or the unit B may be downshifted to its low speed drive with the unit A remaining in its high speed drive. As has been explained, the downshift valve 215 in kickdown position of the accelerator 370 provides line pressure to the conduits 228 and 481 providing line pressure for kickdown purposes to the port 195 of the 2 to 3 shift valve 114 and to the port 470 of the low-high shift valve 455. Assuming that the vehicle speed is relatively high, only the 2 to 3 shift valve 114 moves from its upshifted position to its downshifted position which will return the unit A from its high speed drive to its intermediate speed drive. Assuming that the vehicle speed is lower, the line pressure applied to the port 470 on the low-high shift valve will move the valve piston 458 to its downshifted position so as to downshift the unit B which will at the same time, through the governor regulator valve 124, provide a multiplied governor pressure in the conduit 251. This multiplied governor pressure in the conduit 251 will keep the 2 to 3 shift valve 114 in its upshifted position so as to maintain the unit A in its direct drive while the unit B is downshifted.

Assuming that the vehicle is started with the manual valve 107 in its L position and the auxiliary valve 456 in its "Gear" position; as has been previously described, the manual valve 107 will drain the port 178 and its conduit 209, and fluid pressure will be supplied to the ports 177, 176 and 173. The port 178 and its conduit 209 are connected to the port 201 of the 2 to 3 shift valve which supplies pressure for the rear clutch 31 for direct drive in the unit A, and therefore, there can be no direct drive for this position of the manual valve 107. The line pressure supplied to the port 173 flows through the conduit 227 and the downshift valve 215 to the conduit 228 so as to be impressed through the port 195 on the 2 to 3 shift valve 114, through the port 297 on the 2 to 1 shift valve 113 and through the port 470 on the low-high shift valve 455, as for the kickdown condition in drive range position of the valve 107. Line pressure also flows through the conduit 227 and the conduit 315 to the left end of the inhibitor valve 117 holding this valve in its low speed position, so that low speed drive exists in the unit A. Line pressure is also supplied from the conduits 227, 315 and 415 to the port 479 of the low-high shift valve 455 and is supplied through the ports 497 and 498 and the conduit 500 to the port 468 of the valve 455 which assures that the valve 455 remains in its low speed position. Therefore, the unit B also remains in low speed drive.

Assuming that the vehicle is travelling with the manual valve 107 in D position and the auxiliary valve 456 in its "Gear" position, and then the manual valve 107 is moved into its L position, the front unit A will immediately be shifted from its high speed drive to its intermediate speed drive, since the port 178 of the manual valve 107 is drained to the sump in the L position of the manual valve piston 166; and then as the vehicle speed decreases, the low-high shift valve 455 will move into its low speed position under the action of the line pressure supplied to the ports 468 and 470. Once this shift of the piston 458 has taken place, the line pressure supplied to the port 479 and which is previously blocked by the land 464 is released to the left side of the land 464 assuring that the piston 458 remains in its downshifted position. The unit B is thus in its low speed drive. Subsequently, on a further reduction in vehicle speed, the governor pressure in the conduit 251 decreases so as to cause the spring 306 to be effective on the inhibitor valve 117 moving it back into its low speed position at the limit of its movement to the right so as to shift the unit A into its low speed drive.

When the manual valve 107 is moved to its R position with the auxiliary manual valve 456 being in its "Gear" position, the reverse drive will be completed through the unit A as previously described. The low-high shift valve 455 will be in its low position, since with the manual valve 107 in its R position, there is no pressure supplied to the governor valve 118, and the low speed drive will be effective in the unit B.

The embodiment of the invention illustrated in FIGS. 1A, 1B, 1G, 1D, 1H and 1I comprises, in addition to the valves previously described and shown in FIGS. 1A, 1B and 1D, the following additional valves: a 2 to 3 shift valve 520, a 1 to 2 shift valve 521, a transition valve 522, an interlock valve 523, a governor valve 524, a governor regulator valve 525, a governor transition valve 526, a high-low shift valve 527, the brake transition valve 122, a clutch transition valve 528, and an orifice control valve 529.

The 2 to 3 shift valve 520 is similar to the 2 to 3 shift valve 114 differing therefrom only in details. The valve 520 comprises pistons 530, 531 and 532. The piston 530 is a simple plug. The piston 531 comprises lands 533, 534, 535 and 536 and a stem 537. The piston 532 comprises lands 538 and 539. A spring 540 is disposed between the land 533 and an opposite stationary part, and a spring 541 is disposed between the land 533 and the piston 530. The valve 520 comprises ports 542, 543, 544, 545, 546, 547, 548, 549, 550, 551, 552, 553, 554, 555, 556 and 557. The ports 552 and 553, although in the same plane, are not permanently connected. The port 542 is connected with the conduit 230; the ports 543 and 545 are connected together; the port 544 is connected with the conduit 228; the ports 546, 552 and 556 are connected together; the ports 547 and 551 are connected to the conduit 208; the port 548 is connected with the conduit 347;

the port 553 is connected with the conduit 210; the port 554 is a bleed port; and the port 557 is connected with the conduit 251.

The 1 to 2 shift valve 521 comprises a piston 558 provided with lands 559, 560, 561, 562 and 563. The land 560 is slightly larger in diameter than the land 559, and the land 561 is slightly larger in diameter than the land 560. A stem 564 is anchored in the end of the cavity for the piston 558 to limit its movement to the left, and a spring 565 is disposed about the stem 564 and yieldably moves the piston 558 to the limit of its movement to the right.

The valve 521 is provided with ports 566, 567, 568, 569, 570, 571, 572, 573 and 574. The ports 566 and 568 are connected with the ports 543 and 545 of the 2 to 3 shift valve 520 by means of a conduit 575; the ports 567, 569 and 572 are bleed ports; the port 570 is connected by means of a conduit 576 with the port 549 of the valve 520; the port 571 is connected with the conduit 302; the port 573 is connected by means of a conduit 577 with the port 555 of the valve 520; and the port 574 is connected to the conduit 251.

The transition valve 522 corresponds with the transition valve 116 but differs in some details therefrom. The valve 522 comprises a valve piston 578 having lands 579, 580 and 581. A spring 582 is disposed between the left end of the piston 578 and the adjacent end of the cavity in which the piston 578 is disposed for yieldably holding the piston to the limit of its movement to the right. The valve 522 comprises ports 583, 584, 585 and 586. The port 583 is a bleed port; the port 584 is connected with the conduit 330; the port 585 is connected by means of a conduit 587 with the conduit 576; and the port 586 is connected with the conduit 332.

The interlock valve 523 comprises a piston 588 having lands 589, 590 and 591. A spring 592 is provided between the land 589 and the adjacent end of the cavity in which the piston 588 is disposed for yieldably holding the piston 588 to the limit of its movement to the right. The valve 523 comprises ports 593, 594, 595, 596, 597, 598, 599 and 600. The port 593 is a bleed port; the ports 594 and 599 are connected by means of a branch conduit 601 with the conduit 577; the port 595 is connected by means of a branch conduit 602 with the conduit 180; the port 596 is connected by means of a conduit 603 with the port 550 of the valve 520; the port 597 is connected with the conduit 209; the port 598 is connected with the conduit 315; and the port 600 is connected by means of a branch conduit 604 with the conduit 434.

The governor valve 524 is generally similar to the governor valve 118 but differs in some details. The governor valve 524 comprises a piston 605 having lands 606 and 607. The piston 605 is hollow and a weight 608 having most of its mass on one end extends through the piston 605. A spring retainer 609 is fixed on the weight 608 opposite a surface 610, and a spring 611 is disposed between the retainer 609 and an opposite end surface of the valve piston 605. The piston 605 and weight 608 are slidably disposed in a casing 612 rotatably mounted on the shaft 78, and the casing 612 is provided with ports 613, 614, 615 and 616. The ports 613 and 616 are bleed ports; and the port 614 is connected with the conduits 180 and 602.

The high-low shift valve 527 corresponds in general to the low-high shift valve 123. The valve 527 comprises valve pistons 617 and 618. The piston 618 is a simple plug, and the piston 617 comprises lands 619, 620, 621 and 622. A spring 623 is disposed between the left end of the piston 617 and the adjacent end of the cavity in which the piston 617 is disposed. The valve 527 comprises ports 624, 625, 626, 627, 628, 629, 630, 631 and 632. The ports 624, 626 and 630 are bleed ports; the port 625 is connected with the conduit 415; the port 628 is connected by means of a conduit 633 with the port 393 of the manual valve 125; the port 631 is connected by means of a conduit 634 with the port 390 of the valve 125; and the port 632 is connected by means of a conduit 635 with the port 615 of the governor valve 524. It will be noted that the land 619 is slightly less in diameter than the land 620.

The clutch transition valve 528 corresponds generally to the clutch transition valve 121 but differs therefrom in some respects. The clutch transition valve 528 comprises a piston 636 having lands 637, 638 and 639. A spring 640 is disposed between the left end of the piston 636 and the adjacent end of the cavity in which the piston is disposed for yieldably holding the piston to the limit of its movement to the right. The valve 528 comprises ports 641, 642, 643, 644, 645 and 646. The port 641 is connected by means of a conduit 647 with the port 629 of the shift valve 527; the port 642 is a bleed port; the port 643 is connected with the conduit 432; the port 644 is connected with the conduit 633; the port 645 is connected by means of a branch conduit 648 with the conduit 604; and the port 646 is connected by means of a branch conduit 649 with the conduit 635.

The governor regulator valve 525 corresponds in general with the governor regulator valve 124 but differs in some detail. The valve 525 comprises a piston 650 having lands 651, 652 and 653. A spring 654 is provided on one end of the piston 650 for urging it toward the right, and a plug 655 having an orifice 656 therethrough is provided on the other end of the valve piston 650 for limiting its movement to the right. The valve 525 comprises ports 657, 658, 659, 660, 661 and 662. The ports 658 and 661 are bleed ports; the port 659 is connected with the conduit 252; and the port 662 is connected with the conduit 649.

The governor transition valve 526 comprises a piston 663 having lands 664 and 665. A spring 666 acts on the right end of the piston 663 and yieldably holds it to the limit of its movement to the left in the cavity in which the piston is disposed. The valve 526 comprises ports 667, 668, 669, 670 and 671. The port 667 is connected to the conduit 648; the port 668 is connected to the conduit 649; the port 669 is connected to the conduit 251; the port 670 is connected by means of a conduit 672 with the ports 657 and 660 of the governor regulator valve 525; and the port 671 is a bleed port.

The orifice control valve 529 comprises a piston 673 having lands 674 and 675. A spring 676 is provided between the right end of the valve piston 673 and a plug 677 fixed in an end of the cavity in which the valve piston 673 is disposed. The valve 529 is provided with ports 678, 679 and 680. The port 678 is connected by means of a conduit 681 with the ports 566 and 568 of the 1 to 2 shift valve 521 and with the conduit 575; the port 679 is connected by means of a branch conduit 682 with the conduit 633 and the port 628 of the high-low shift valve 527; and the port 680 is connected by means of a conduit 683 with the port 428 of the brake transition valve 122. A restricted passage 684 is provided between the conduits 683 and 682.

The auxiliary manual valve 125 in this embodiment has its ports 389 and 392 connected with the conduit 252. As previously described, the port 390 is connected with the conduit 634 and the port 393 is connected with the conduit 633. The brake transition valve 122 in this embodiment has its port 427 connected by means of a branch conduit 685 with the conduit 432; its port 428 is connected to the conduit 683 as above described; its port 429 is connected to the conduit 434 as in the first embodiment; and its port 431 is connected by means of a conduit 686 with the port 627 of the high-low shift valve 527.

The embodiment of the invention shown in FIGS. 1A, 1B, 1G, 1D, 1H and 1I operates with the rear unit B under manual control while the front unit A remains automatically controlled. The principal difference in operation, with respect to the first embodiments shown in FIGS. 1A to 1E, lies in the fact that the front unit A begins drive in its low speed ratio rather than its intermediate speed ratio with the accelerator 370 being in an intermediate position thereof. The unit A is under the control of the governor 524 which supplies an output governor pressure in the conduit 635 that increases with the speed of the driven shaft 78, functioning somewhat the same as the governor 118.

The principal difference between the governors 118 and 524 lies in the provision of the yieldable spring 611 between the valve piston of the governor 524 and the weight 608, the spring 611 having no counterpart in the governor 118. The governor 524, due to the presence of the spring 611, produces an output governor pressure that increases faster with increases in vehicle speed at relatively low vehicle speeds as compared to the increases in governor pressure that takes place at higher vehicle speeds.

As has been previously described, line pressure is supplied to the conduit 180 whenever the manual valve piston 166 for the unit A is in its L or D position—initially for this description of operation, the manual valve piston 166 is assumed to be in its D position. The auxiliary manual valve piston which controls the rear unit B is assumed to be in its H position. Returning to the governor valve 524, when the shaft 78 rotates, the piston 605 is urged outwardly due to the centrifugal force effect on the piston 605 and also that on the weight 608 which is transmitted through the spring 611 to the piston 605. On such outward movement of the piston 605, the land 606 of the piston uncovers the port 614 connected with the conduit 180 having line pressure therein, and fluid pressure is thus supplied to the port 615 and the connected conduit 635 through the groove between the lands 606 and 607. The land 607 is larger in diameter than the land 606, and the pressure within the output governor pressure conduit 635 functions to move the piston 605 back so that its land 606 again blocks the line pressure supply port 614. It is assumed that the speed of the shaft 78 has not increased sufficiently thus far so that there is any relative movement between the weight 608 and the piston 605, the spring 611 holding the retainer 609 and the inner end of the piston 605 spaced at a maximum distance with the enlarged outer end of the weight 608 bearing against the outer end of the piston 605. With no such relative movement between the weight 608 and the piston 605, the governor 524 functions at the relative low speeds of the shaft 78 substantially the same as the governor 118 in which there is no relative movement at any time between the parts of the piston 231.

Eventually however, the vehicle speed will increase sufficiently so that the spring retainer 609 makes contact with the surface 610, with the piston 605 moved outwardly by the centrifugal force effect on the piston 605 exclusive of the weight 608 and also by the spring 611 and with the pressure in the conduit 635 effective on the large land 607 moving the piston 605 inwardly so that the land 606 continues to meter fluid flow through the port 614. During this second stage of governor operation, the weight 608 is thus not effective tending to move the piston 605 outwardly and the spring 611 is compressed; and the increases of governor pressure in the conduit 635 are thus less with increases in speed of the driven shaft 78 than during the initial stage of governor operation in which the outer end of the weight 608 is held in contact with the outer end of the piston 605 by the spring 611. It will be understood that the effect of the spring 611 in this second phase of governor operation is to add a constant value to the governor pressure in the conduit 635 as compared to the case in which only the piston 605 is present, exclusive of the spring 611 and the weight 608. Thus, the governor output pressure in the conduit 635 increases relatively fast initially during the first phase of operation of the governor 524 since the centrifugal force effect of the weight 608 is effective on the piston 605; and, during the second phase of operation of the governor 524, the governor pressure in the conduit 635 increases relatively slowly since the retainer 609 fixed to the weight 608 is at this time in contact with the surface 610 which absorbs the centrifugal force effect on the weight 608, and the weight 608 is out of action at this time.

The governor pressure is transmitted through the branch conduit 649 and the ports 668 and 669 of the governor transition valve 526, which are connected by means of the groove between the lands 664 and 665 of this valve, to the conduits 251 and 290. The governor pressure is effective through the port 557 on the 2 to 3 shift valve 520 and also is effective through the port 574 on the 1 to 2 shift valve 521, this governor pressure tending to move both of these shift valves from their low speed positions in which they are illustrated into their high speed positions for the purpose of shifting the unit A first from its low speed ratio to its intermediate speed ratio and finally to its high speed ratio as the speed of the shaft 78 and of the vehicle increases.

With the auxiliary manual valve 125 in its H condition, the groove between the lands 386 and 387 connects the ports 389 and 390, and line pressure is thus transmitted from the line pressure conduit and through the ports 389 and 390 and the conduit 634 to the port 631 of the high-low shift valve 527. This application of line pressure on the high-low piston 617 moves the piston against the action of its spring 623 into its high speed position. Line pressure also flows from the port 392 connected with the line pressure supply conduit 252 through the groove between the lands 387 and 388, the port 393, and the conduits 633 and 682 to the port 644 of the clutch transition valve 528, the port 628 of the high-low shift valve 527 and the port 679 of the orifice control valve 529. The high-low shift valve piston 617 in its high speed position connects the ports 628 and 629 by means of the groove between the lands 621 and 622, and line pressure is thus supplied from the conduit 633 through the ports 628 and 629, the conduit 647 and the port 641 to the left end of the clutch transition valve 528 augmenting the action of the spring 640 and holding the clutch transition valve piston 636 in its illustrated position. Line pressure flows from the conduit 633 through the port 644 of the clutch transition valve 528, the groove between the lands 637 and 638 of this valve, the port 643 and the conduit 432 to the clutch 76 for engaging this clutch to complete the high ratio drive through the transmission unit B. The line pressure in the conduit 432 is transmitted through the branch conduit 685 and port 427 to the left end of the brake transition valve 122 and moves the piston 423 of this valve against the action of the spring 426 to the limit of its movement to the right so that the land 424 blocks the port 428 of this valve. Line pressure is transmitted from the conduit 682 through the restriction 684 and the conduit 683 to the port 428 of the brake transition valve 122, but the line pressure is blocked by the land 424 as just described. It will be noted that in this position of the brake transition valve 122, the port 429 connected with the conduit 434 is connected by means of the groove between the lands 424 and 425 with the bleed port 430. The conduit 434 is connected with the brake 77 and is connected through the conduits 604 and 648 and the port 667 with the governor transition valve 526, and pressure supplied through these conduits and ports at times tends to move the governor transition valve piston 663 to the right; however, with the auxiliary manual valve 125 in its H condition, the governor transition valve piston 663 is in its illustrated position for reasons just mentioned, so that governor pressure is directly transmitted unchanged through the governor transition valve 526 from the conduit 649 to the conduit 251 and thereby to the 2 to 3 shift valve 520 and the 1 to 2 shift valve 521.

The governor pressure applied through the ports 557 and 574 from the governor pressure conduit 251 tends to move both the 1 to 2 shift valve piston 558 and also the 2 to 3 shift valve piston 532 to the left respectively into their intermediate speed position and their high speed position. Both of these shift valve pistons are illustrated in their downshifted position, namely, in the low speed position of the 1 to 2 shift valve piston 558 and the intermediate speed position of the 2 to 3 shift valve piston 532. With the manual valve piston 166 in its D position, as previously explained, line pressure is supplied to the ports 178, 177 and 176. The line pressure from the port 177 is supplied to the clutch 30 for engaging it and also to the governor valve 524 through the conduit 180. The line pressure in the upper port 176 is supplied through the conduit 179 to the apply cavity 131 of the brake servomotor 126. The line pressure from the port 178 is supplied through the conduit 209 to the port 597 of the interlock valve 523, and with the interlock valve piston 588 being in its illustrated position, the groove between the ports 589 and 590 connects the ports 597 and 596, so that line pressure flows through the latter port and the conduit 603 to the port 550 of the 2 to 3 shift valve 520 where it is blocked by the land 535. The line pressure supplied to the lower port 176 flows through the conduit 302 to the port 571 of the 1 to 2 shift valve 521, and with the valve piston 558 being in its illustrated position, the groove between the lands 560 and 561 connects the ports 571 and 570 so that line pressure flows through the latter port to the conduits 576 and 587. The line pressure in the conduit 576 flows to the port 549, and with the 2 to 3 shift valve being in its illustrated position, the groove between the lands 534 and 535 connects the ports 549 and 548 so that line pressure flows through the latter port and the connected conduits 347 and 332 to the disapply cavity 132 of the front brake servomotor 126 maintaining the front brake 32 disengaged even though line pressure is also supplied to the apply cavity 131 of this servomotor. The conduit 332 is connected also to the transition valve 522 and its port 586, so that line pressure is applied to the right end of the transition valve piston 578 moving the piston 578 to the left against the action of the spring 582. The line pressure that exists in the conduit 587 from the port 570 of the 1 to 2 shift valve 521 flows to the port 585 of the transition valve 522, and with the transition valve piston 578 moved to the left, the groove between the lands 580 and 581 connects the ports 585 and 584 so that line pressure flows through the conduit 330 connected with the latter port to the servomotor 134 for the rear brake 33. The brake 33 is thus engaged along with the front clutch 30 to complete the low speed power train through the unit A. As previous described, with the auxiliary manual valve 125 remaining in its H position, the unit B is in its high ratio drive, and a composite low-high ratio drive (low ratio in the unit A and high ratio in the unit B) exists between the shafts 25 and 73.

When the vehicle speed increases sufficiently so that the governor valve 524 produces a sufficiently increased output governor pressure, this pressure in the conduit 251 moves the 1 to 2 shift valve piston 558 to the left. This movement is against the action of the spring 565 and also the "shift valve plug pressure" which is produced by the 2 to 3 shift valve 520 as will now be described.

The 2 to 3 shift valve 520 is quite similar to the 2 to 3 shift valve 114 previously described, and the plug 530 produces a "shift valve plug pressure" applied within the cavity of the shift valve similarly as the plug 181. In brief, the throttle pressure from the line 230 is applied to the left end of the valve 520 on the plug 530 tending to move the plug to the right against the action of the spring 541. Pressure is thus supplied to the port 543 from the port 542, and this pressure which is the so-called "shift valve plug pressure" is supplied through the connected port 545 within the cavity of the valve 520 against the left face of the land 533 and also on the right end of the plug 530. This "shift valve plug pressure" together with the spring 541 tends to return the plug 530 to block the port 543, and the plug 530 thus regulates and produces the "shift valve plug pressure" in the ports 543 and 545.

The ports 543 and 545 are connected by means of the conduit 575 with the ports 566 and 568 of the 1 to 2 shift valve 521, and the "shift valve plug pressure" is thus applied through the port 566 on the left end of the piston 558 and is applied through the port 568 on the left face of the land 560. The land 560 is slightly larger than the land 559, and this "shift valve plug pressure" thus puts a force on the piston 558 tending to hold it from movement to the left. When, however, the speed of the vehicle and the governor output pressure increases sufficiently, it overcomes the effect of the spring 565 and the "shift valve plug pressure" tending to hold the piston 558 from movement, and the 1 to 2 shift valve piston 558 moves to the left into its intermediate speed position. In the intermediate speed position, the piston 558 blocks the port 568, so that the "shift valve plug pressure" varying with accelerator position is not effective through the port 568 on the piston 558, and there is thus a fluid latching effect in which the "shift valve plug pressure" is not as effective in the intermediate speed position of the piston 558 as in the low speed position, so that hunting movement of the piston 558 is prevented.

In the intermediate speed position of the 1 to 2 shift valve piston 558, the land 561 blocks the port 571 carrying line pressure, and the groove between the lands 560 and 561 connects the port 570 with the bleed port 569 thus draining the conduits 576 and 587. As has been described, the conduit 576 is connected through the 2 to 3 shift valve 520 and the conduits 347 and 332 with the disapply cavity 132 of the servomotor 126, and this cavity is thus drained, so that the pressure within the apply cavity 131 engages the brake 32. The conduit 587 initially on shift of the valve 521 is connected through the transition valve 522 and the conduit 330 with the rear brake servomotor 134, and the servomotor 134 is thus drained along with the disapply cavity 132 of the servomotor 126 to disengage the brake 33. The conduit 332 connects the right end of the transition valve 522 with the disapply cavity 132 of the servomotor 126, and when the pressure in the cavity 132 decreases to a certain value, the spring 582 is effective to move the transition valve piston 578 to the right, and the conduit 330 connected with the rear brake servomotor 134 is then drained through the ports 584 and 583 which are now connected around the left end of the piston 578. In connection with the 1 to 2 shift valve, it is to be noted that the land 561 is slightly larger than the land 560, and the line pressure flowing between the lands 560 and 561 in the low speed position of the 1 to 2 shift valve piston 558 tends to hold the piston in its low speed position. In the intermediate speed position of the piston 558, this pressure is not present between the lands 560 and 561, and this also produces a latching effect augmenting that of the "shift valve plug pressure" in the port 568 which is blocked in the intermediate speed position of the piston 558.

As the speed of the vehicle increases still further, the governor pressure in the conduit 251 eventually is sufficient to move the 2 to 3 shift valve pistons 531 and 532 to the left into their high speed positions. This movement is against the "shift valve plug pressure" effective through the ports 543 and 545 on the land 533, the forces due to the springs 540 and 541 and the force due to the throttle pressure effective on the left end of the piston 530. The 2 to 3 shift valve piston 531 in its high speed position connects the ports 550 and 551 by means of the groove between the lands 535 and 536, and the line pressure which is in the conduit 603 flows through the ports 550 and 551 and the conduit 208 to the piston 63 for engaging the clutch 31. The pressure in the conduit 208 will also flow through the port 547 of the 2–3 shift valve 520, the groove between the lands 534 and 535, the port 548 and the conduits 347 and 332 to the disapply cavity 132 of the servomotor 126 for the front brake 32 so as to disengage this brake. The transmission unit A is now in high speed drive. It should be noted that when the valve 520 is in its high speed condition, the land 539 is moved off the port 556 so as to connect the ports 557 and 556. Governor pressure thus flows to the port 546 so as to be impressed on the right hand face of the land 533, and this application of governor pressure tends to hold the piston 531 in its high speed position. The land 533 in this manner functions as a fluid latch or hysteresis area and prevents hunting movement of the valve 520. In the intermediate speed position of the piston 531, the ports 552 and 553 are connected by the groove between the lands 535 and 536 for bleeding the ports 546 and 556 to the sump 146 through the port 553, the conduit 210, and the ports 172 and 171 of the manual valve 107; however, in the high speed position of the piston 531, the land 536 blocks the ports 552 and 553 with respect to each other, inasmuch as the ports 552 and 553 are not permanently connected together although they are in the same plane.

A downshift may be obtained from third speed ratio to second speed ratio in the unit A by moving the accelerator 370 to its kickdown position. As previously described in connection with other downshifts, this movement connects the ports 221 and 220 by means of the downshift valve piston 108, and line pressure is thus supplied from the line pressure supply conduit 229 through the ports 221 and 220 and the conduit 228 to the port 544 of the 2 to 3 shift valve 520 onto the left face of the land 533 of the valve 531. Assuming that the governor pressure on the right end of the valve 520 is not unduly great resulting from an unduly high speed of the vehicle, this application of line pressure on the land 533 will move the 2 to 3 shift valve piston 531 to its intermediate speed position, thus downshifting the unit A from its high speed drive to its intermediate speed drive.

As has been previously described, when the manual selector valve piston 166 is in its L position, the port 178 and its conduit 209 are blocked from the line pressure supply conduit 148, and the port 173 and its conduits 227 and 315 have line pressure supplied thereto. The conduit 315 is connected to the port 598 of the interlock valve 523 and is blocked by the land 590 of this valve. Line pressure also flows through the downshift valve 108, particularly between its ports 219 and 220, and flows though the conduit 228 to the port 544 of the 2 to 3 shift valve 520, similarly as for a kickdown by movement of the accelerator 370 to its kickdown position. Similarly, as for a kickdown, this application of line pressure will move the 2 to 3 shift valve piston 531 from its high speed drive position to its intermediate speed drive position, and the unit A will change from high speed drive to intermediate speed drive, assuming that the vehicle speed is not unduly high resulting in a high governor pressure effective to hold the piston 531 from such movement.

When the manual valve piston 166 is moved into its R position, as has been previously described, line pressure is admitted to the ports 176, 173 and 172. The line pressure in the conduit 227 connected with the port 173 flows similarly as for the low speed position of the manual valve piston 166, through the downshift valve 108 and the conduit 228 to the port 544 of the 2 to 3 shift valve 520 holding the 2 to 3 shift valve piston 531 to the limit of its movement to the right. The line pressure in the conduit 315 connected with the conduit 227 flows to the port 598 of the interlock valve 523, but is blocked by the land 590 of this valve. The line pressure supplied to the upper port 176 flows to the apply cavity 131 of the front brake servomotor 126, and the line pressure supplied to the lower port 176 flows through the conduit 302 to the port 571 of the 1 to 2 shift valve 521. The shift valve piston 558 of this valve is in its illustrated position, and fluid pressure thus flows to the conduits 576 and 587. As for low speed drive, the pressure in the conduit 576 flows through the 2 to 3 shift valve 520 and the conduits 347 and 332 to the disapply cavity 132 of the servomotor 126 thus maintaining the front brake 65 disengaged. The line pressure in the conduit 332, as for low speed drive, is applied to the right end of the transition valve 522 moving this valve to the limit of its movement to the left so that the line pressure in the conduit 587 flows therethrough and through the conduit 330 to the servomotor 134 for the rear brake 33. The brake 33 is thus engaged. The line pressure supplied to the port 172 of the manual valve 107 flows through the conduit 210 to the throttle modulator valve 111 which raises the line pressure in the conduit 148 and connected conduits as previously described and also flows to the port 553 of the 2 to 3 shift valve 520. The valve piston 531 of this valve is in its illustrated position, and line pressure thus flows between the ports 553 and 551 and through the conduit 208 to the piston 63 for engaging the rear clutch 31. The reverse drive through the unit A is thus completed. Line pressure, under these conditions, also flows through the port 552 of the 2 to 3 valve 520 to the ports 556 and 546, but has no effect.

When the auxiliary manual valve piston is moved into its L position, it causes the rear unit B to change from high speed drive to low speed drive. The piston 385 in its L position connects the line pressure supply port 392 with the port 393 by means of the groove between the lands 387 and 388, but the land 386 blocks the other line pressure supply port 389. There thus is no line pressure existing under these conditions in the conduit 634, and the conduit 634 is drained to the sump through the groove between the lands 386 and 387 and the bleed port 391. It is assumed that this change of the valve 125 is made when the vehicel is travelling at a low speed or stationary; and under these conditions, with the conduit 634 drained, the high-low shift valve piston 617 is moved by the spring 623 to the limit of its movement to the right in which it is illustrated. This movement of the high-low shift valve piston 617 causes drainage of the conduit 647 through the port 629, the groove between the lands 621 and 622 and the bleed port 630, and the clutch transition valve 528 thus is relieved from line pressure application on its left end. At the same time, the groove between the lands 620 and 621 of the high-low shift valve 527 connects the port 628 supplied with line pressure from the conduit 633 and the port 393 with the port 627 and thereby with the right end of the brake transition valve 122 through the conduit 686. This application of line pressure to the right end of the brake transition valve 122 moves its valve piston 423 to the left, and line pressure then flows from the conduit 633 through the conduit 682, the restriction 684, the conduit 683, the port 428, the groove between the lands 424 and 425 of the brake transition valve 122, the port 429 and the conduit 434 to the brake apply piston 96, causing engagement of the brake 77 and a completion of the low speed power train in the unit B. The application of fluid pressure to the brake piston 96 is retarded by the restriction 684, as just described, when the accelerator 370 is in a relatively relaxed position. The port 678 of the orifice control valve 529 is connected through the conduit 681 with the conduit 575 that has "shift valve plug pressure" in it, and when the "shift valve plug pressure" is relatively high with relatively open throttle conditions, the orifice control valve piston 673 is moved to the right against the action of its spring 676 by the "shift valve plug pressure" impressed on the left end of the piston. When so moved, the valve piston 673 connects the port 679 and 680 by means of its groove between the lands 674 and 675, and a relatively high rate of fluid flow takes place from the conduit 682 through the ports 679 and 680 to the conduit 683 and ultimately to the brake piston 96 so that with the increased torque from the vehicle engine accompanying a depressed condition of the accelerator 370, a relatively fast application of the brake 77 will take place.

As the pressure applied on the brake piston 96, which is present in the conduit 434 and in the connected conduits 604 and 648, rises; the clutch transition valve piston 636 is shifted to the left against the action of its spring 640 so as to connect together the ports 643 and 642 by means of the groove between the lands 637 and 638. At this time, the clutch 76 is freely drained to the sump 146 through the conduit 432 and the ports 642 and 643, the engaging capacity of the brake 77 at this time being sufficient so as to complete a power train between the shafts 26 and 78.

The pressure applied to the brake 77 present in the conduit 434 and therefore present in the connected conduits 604 and 648 is applied to the left end of the governor transition valve 526, and this pressure moves the governor transition valve piston 663 to the limit of its movement to the right. The piston 663 in this moved position connects the ports 670 and 669 by means of the groove between the lands 664 and 665. The governor regulator valve 525 functions much like the governor regulator valve 124 in providing an increased output governor pressure that varies along with the actual pressure output of the governor as in the conduit 635, but which is increased at a predetermined proportion. Governor output pressure in the conduits 635 and 649 is impressed through the port 662 and restriction 656 on the right end of the land 653 of the governor regulator valve piston 650, moving the piston 650 to the left against the action of the spring 654 so as to open the line pressure port 659 with respect to the port 660 and the conduit 672. The pressure in the conduit 672 is impressed through the port 657 on the left end of the piston 650, augmenting the action of the spring 654 tending to return the piston 650 to the right so as to block the port 659. The valve piston 650 thus provides the regulated increased governor pressure in the conduit 672, increasing the flow from the line pressure supply port 659 to the output port 660 when the pressure in the conduit 672 is lower than the proper regulated valve and draining the conduit 672 through the ports 657 and 658 when the pressure in the conduit 672 is higher than the proper value. The regulated governor pressure in the conduit 672 is transmitted through the governor transition valve 526 and the conduit 251 to the governor controlled parts of the hydraulic controls of the unit A shown in FIGS. 1A and 1B and 1G so that, as previously explained, the unit A controls have impressed on them the equivalent of a pressure that would be supplied by a governor driven directly from the intermediate shaft 26.

The brake apply pressure within the conduit 604 is impressed on the right end of the interlock valve 523 through the port 600, and this pressure shifts the piston 588 to the left against the action of the spring so as to connect the ports 595 and 596 by means of the groove between the lands 589 and 590 and to block the port 597. As has been previously described, the line pressure from the conduit 209 connected with the port 597 is applied through the port 596 for the H position of the auxiliary valve 125. Since the conduits 180 and 602 are also provided with line pressure from the manual valve 107 in the D position of the piston 166; the line pressure flows in this case when the interlock valve piston 588 has been shifted with the auxiliary valve 125 being in its L position, from the conduit 602 through the ports 595 and 596 to the conduit 603, so that the 2 to 3 shift valve 520 remains effective for shifting the unit A in its direct drive.

It should be noted that when the rear unit B is in its low ratio condition, the higher regulated governor pressure is applied to the conduit 251, and this higher governor pressure tends to upshift the unit A and maintain it in its upshifted ratios. It should also be noted that the high-low shift valve 527 is under the influence of the basic governor pressure in the conduit 635, and assuming that the speed of the vehicle is unduly high, the governor pressure effective on the plug 618 maintains the high-low shift valve piston 617 in its high ratio position, even though pressure is drained from the conduit 634 when the auxiliary manual valve piston 385 is moved into its L position from its H position. With such unduly high governor pressure, the rear unit B remains in its high speed ratio.

It should also be noted that governor pressure is applied to the right end of the clutch transition valve 528 through the conduit 649 and port 646. Therefore, the greater the speed of the vehicle is, the greater is the governor pressure in the conduits 635 and 649, and the greater is the tendency of the clutch transition valve piston 636 to move to the left or to remain moved to the left. Thus, the greater the speed of the vehicle is, the sooner the clutch transition valve piston 636 moves to the left when a change is made to low range drive in the unit B so as to vent the clutch apply conduit 432; and, when the change is made oppositely from the low speed drive to the high speed drive in the unit B, the greater the pressure in the conduit 647 must become in order to shift the clutch transition valve piston 636 to the right so as to apply line pressure to the conduit 432 and to the clutch 76. This use of governor pressure on the clutch transition valve 528 assures smooth transitions between speed ratios in the unit B.

Assuming that both the manual valve 107 and also the auxiliary valve 125 are put into their L positions, with the vehicle moving at some relatively high speed, the unit A will downshift from its high speed ratio to its intermediate speed ratio and finally to its low speed ratio with the unit B remaining in its high ratio drive, and then the unit B will downshift to its low ratio drive and at the same time the unit A will upshift to its high speed drive and then, finally, the unit A will again downshift to intermediate and finally to its low speed drive, all under the influence of the governor valve 524 as it and the vehicle decrease in speed. The high-low shift valve 527 does not initially shift to its low speed position from its high speed position due to the governor pressure effective through the port 632 on the plug 618. The governor pressure in the conduits 635 and 649 is transmitted directly through the governor transition valve 526 to the 2 to 3 shift valve 520 and to the 1 to 2 shift valve 521. As the governor pressure decreases, first the valve 520 will move into its intermediate speed position downshifting the unit A to its intermediate speed ratio and subsequently, the valve 521 will shift to its low speed position downshifting the unit A to its low speed ratio. In the L position of the manual valve 166, as has been previously described, the conduit 209 is blocked from line pressure while the conduits 227, 228, 315 and 415 are supplied with line pressure. The pressure in the conduit 228 is applied through the port 544 of the 2 to 3 shift valve 520 tending to move this valve to its intermediate speed position against the action of governor pressure. This pressure is also transmitted through the port 545 and the conduit 575 to the ports and lands 559 and 560 to tend to move the 1 to 2 shift valve piston 558 to its low speed position. On a return of the unit A to its low speed ratio drive, the governor pressure decreases sufficiently so that the high-low shift valve piston 617 returns to its low speed position which is against the action of the governor pressure applied through the port 632 on the right end of the valve 527. The return movement of the piston 617 is due to the action of the spring 623 and the line pressure which is present in the conduit 415 at this time, the pressure in the conduit 415 being applied through the port 625 on the land 620. When the brake 77 in the rear unit B is applied by line pressure in the conduit 434, this line pressure is also applied on the left end of the governor transition valve 526 and on the right end of the interlock valve 523 by means of the conduits 604 and 648. The governor transition valve shifts to the right, as previously described, so as to provide the greater regulated governor pressure in the conduit 251, and this increased pressure applied to the 2 to 3 shift valve 520 and on the 1 to 2 shift valve 521 moves these valves into their high speed positions. The transmission unit A is thus shifted into its high speed ratio simultaneously with shifting of the rear unit B into its low speed ratio. The line pressure applied on the right end of the interlock valve 523 moves the piston 588 of this valve to the limit of its movement to the left so as to connect the ports 595 and 596 by means of the groove between the lands 589 and 590 and to connect the ports 598 and 599 by means of the groove between the lands 590 and 591. The conduit 315 carries line pressure from the manual valve 107 in its L position, and line pressure is thus supplied to the conduits 601 and 577 through the interlock valve 523. Conduits 602 and 180 carry line pressure from the manual valve 107 in its L position, and line pressure from these conduits is supplied through the ports 595 and 596 to the conduit 603. It will be recalled that the conduit 209 carrying line pressure for supplying the port 550 of the 2 to 3 shift valve 520 for application of the rear clutch 31 through the ports 596 and 597 and the conduit 603 is drained in the L position of the manual valve 107, and with the interlock valve piston 588 being shifted to the left in low speed drive of the unit B, line pressure is made available to the port 550 of the 2 to 3 shift valve for the rear clutch 31 from the conduit 602 and through the ports 595 and 596 and the conduit 603, so that the pressure is available for completion of the high speed drive in the unit A.

On further decreases in vehicle and governor speed, the governor pressure will decrease so that the 2 to 3 shift valve 520 will again move to its intermediate speed position, and the 1 to 2 shift valve 521 will again move to its low speed position, first decreasing the drive in the unit A from its high speed drive to its intermediate speed drive and then subsequently, to its low speed drive, with the unit B remaining in its low ratio drive. The line pressure in the conduits 601 and 577 with the rear unit B being in its low speed drive is effective to act on the land 539 of the 2 to 3 shift valve 520 providing an additional force tending to move the piston 532 to the right against the action of governor pressure, and when the piston 532 is moved to the limit of its movement to the right, the line pressure flows from the conduit 577 through the port 555 onto the land 538 and holds the piston 532 in its intermediate speed position regardless of subsequent increases in vehicle speed and governor pressure. The line pressure in the conduit 577 is similarly effective on the land 563 and on the land 562 of the 1 to 2 shift valve 521 tending to move the piston 558 to its low speed position and subsequently holding it in this position regardless of subsequent increases in vehicle speed and governor pressure, so that the unit A is downshifted to low speed drive and remains in this drive.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In a transmission, the combination of a drive shaft, a driven shaft, means for providing two different power trains between said shafts, first and second fluid pressure engaged friction engaging devices for completing said power trains respectively, a source of fluid pressure, first and second valves for respectively applying fluid pressure from said source to said first and second friction devices, each of said valves having a position connecting said pressure source with the respective friction device and a position disconnecting said pressure source and the respective friction device and exhausting the respective friction device in its last-named position, a spring effective on said second valve for yieldably holding it in its position connecting said pressure source and said second device, and a conduit for connecting said first friction device and said second valve so that the pressure applied to said first friction device acts to move said second valve against its said spring to exhaust said second friction device when the fluid pressure on said first friction device reaches a predetermined value.

2. In a transmission, the combination of a drive shaft, a driven shaft, means for providing two different power trains between said shafts, first and second fluid pressure engaged friction engaging devices for completing said power trains respectively, a source of fluid pressure, first and second valves for supplying fluid pressure to said first and second friction devices and each of said valves having a position connecting said pressure source and the respective friction device and having a position blocking said respective friction device with respect to said pressure source and exhausting the respective friction device in the latter position, a spring for holding each of said valves in its blocking position, a conduit connecting said first friction device and said second valve and a conduit connecting said second friction device and said first valve for applying the pressure on said devices also on said valves against the action of the respective springs so that said first valve is moved to its blocking position when the pressure on said second friction device reaches a predetermined value and said second valve is moved to its blocking position when the pressure on said first friction device reaches a predetermined value.

3. In a transmission, the combination of a drive shaft, a driven shaft, means for providing two different power trains between said shafts, first and second fluid pressure engaged friction engaging devices for completing said power trains respectively, a source of fluid pressure, a first valve having a position connecting said pressure source and said first friction device and having a position blocking said pressure source with respect to said device and draining the said device, a second valve having a position connecting said pressure source and said second friction device and having a position blocking said pressure source with respect to the latter friction device and exhausting the latter friction device, a spring for holding each of said valves in its respective blocking position, a conduit connecting said second friction device and said first valve and a conduit connecting said first friction device and said second valve for applying the pressure of said devices on said valves tending to move them against their said springs so that said first valve is moved to a blocking position when the pressure on said second friction device reaches a predetermined value and said second valve is moved to its blocking position when the fluid pressure on said first friction device reaches a predetermined value, and a control valve for selectively supplying pressure from said source to said valves augmenting the force from said springs so as to selectively hold said valves in their said positions connecting the pressure source and the respective friction devices.

4. In transmission mechanism, the combination of a drive shaft, a driven shaft, a main transmission unit and an auxiliary transmission unit connected in series between said shafts and each of which provides low and high ratios therethrough, control mechanism for each of said units for changing it from its high ratio to its low ratio, a hydraulic governor means driven by said driven shaft for providing a governed pressure that changes with driven shaft speed, and a hydraulic means interconnecting said governor and said first unit control means with said control mechanism for said auxiliary unit, both of said hydraulic means being operable on said control mechanism for said auxiliary unit so as to prevent a change from high ratio to low ratio therein when the control mechanism for said main unit causes the low ratio of said main unit to be completed.

5. In transmission mechanism, the combination of a drive shaft, a driven shaft, a main and an auxiliary transmission unit connected in series between said shafts and each of which provides low and high ratios therethrough, a governor mechanism driven by said driven shaft, control mechanism under the control of said governor mechanism for changing said main transmission unit between its said ratios, control mechanism for changing said auxiliary unit between its said ratios, and a valve means having a small piston surface hydraulically actuated by said governor mechanism and having a large piston surface actuated by said auxiliary unit control mechanism for multiplying the effect of said governor mechanism in controlling said main transmission unit when the ratio in said auxiliary unit is changed.

6. In transmission mechanism, the combination of a drive shaft, a driven shaft, a main transmission unit and an auxiliary transmission unit connected in series between said shafts and each of which provides low and high ratios therethrough, a hydraulic governor mechanism driven by said driven shaft and providing a governed pressure that changes with driven shaft speed, fluid pressure responsive controlling mechanism for said main transmission unit for causing changes of drive in said main unit in accordance with the speed and the pressure output of said governor, controlling mechanism including a shiftable valve for changing the drive in said auxiliary unit between its said ratios, and a conduit interconnecting said shiftable valve and said governor mechanism for applying a fluid pressure on said governor mechanism in the position of said shiftable valve corresponding to one of the ratios in said auxiliary unit so as to change the effect of the governor mechanism on said main transmission unit.

7. In transmission mechanism, the combination of a drive shaft, a driven, shaft, an intermediate shaft, a main transmission unit connected between said drive and intermediate shafts and an auxiliary transmission unit connected between said intermediate and driven shafts, each of said units providing low and high ratios respectively therethrough, control mechanism for changing each of said transmission units between its low and high ratios, a governor mechanism driven by said driven shaft and connected with the control mechanism for said main unit for changing the drive through the unit according to driven shaft speed, and means interconnecting said governor mechanism and the control mechanism for said auxiliary unit so that the effect of the governor mechanism is changed when said auxiliary unit is in its low speed ratio so that the effect of the governor mechanism on said main unit is the same as if the governor mechanism were driven by said intermediate shaft.

8. In transmission mechanism, the combination of a drive shaft, a driven shaft, an intermediate shaft, a main transmission unit connected between said drive and intermediate shafts, an auxiliary transmission unit connected between said intermediate and driven shafts, each of said units providing low and high ratios respectively therethrough, fluid pressure responsive control mechanism for said main transmission unit for changing it between its high and low ratio drives, a hydraulic governor mechanism driven by said driven shaft and providing an output fluid pressure that changes with driven shaft speed and connected with said control mechanism so that the main transmission unit is changed in accordance with driven shaft speed, control mechanism for said auxiliary unit for changing it between its two said ratios, said last-named mechanism including a valve having a low ratio position and a high ratio position for the auxiliary unit, and a conduit connecting said shiftable valve and said governor mechanism for applying the said output pressure thereof on an additional portion of the governor mechanism so as to provide an increased governor pressure effective on the control mechanism for said main unit when the auxiliary unit is in its low ratio.

9. In transmission mechanism, the combination of a drive shaft, a driven shaft, an intermediate shaft, a main transmission unit connected between said drive and intermediate shafts, an auxiliary transmission unit connected between said intermediate and driven shafts, each of said units providing low and high ratios therethrough, fluid pressure operated control mechanism for said main transmission unit for changing it between its ratios, hydraulic governor mechanism driven by said driven shaft and comprising valving providing an output governor pressure that increases with driven shaft speed and is applied to said control mechanism for said main transmission unit for changing the drive in the main transmission unit in accordance with driven shaft speed, controlling mechanism for said auxiliary unit comprising a shiftable valve having a low ratio position and a high ratio position, said shiftable valve in its low ratio position connecting the output governor pressure with a certain land on the governor valving so as to increase the governor output pressure, the governor valving being so arranged that the output governor pressure is increased by substantially the same ratio that exists between the speeds of said intermediate and driven shafts when the auxiliary unit is in low ratio drive.

10. In transmission mechanism, the combination of a drive shaft, a driven shaft, an intermediate shaft, a main transmission unit connected between said drive and intermediate shafts, an auxiliary transmission unit connected between said intermediate and driven shafts, each of said units providing low and high ratios therethrough, a fluid pressure responsive control mechanism including a shiftable valve moved from a low speed position to a high speed position by application of fluid pressure thereto for changing the drive through the main transmission unit from its low ratio to its high ratio, hydraulic governor mechanism driven by said driven shaft and providing a governed pressure that increases with the speed of said driven shaft and is applied to said shiftable valve tending to shift the valve from its low ratio position to its high ratio position, hydraulic controlling mechanism for said auxiliary unit for changing the drive through the unit and comprising a second shiftable valve having a low ratio position and a high ratio position for causing low and high ratio drives through the auxiliary unit respectively, and conduit means connecting said second shiftable valve and said governor mechanism for applying the output governor pressure on a certain land of said governor mechanism so that the governor mechanism provides an increased governor output pressure when the said second shiftable valve is in its low speed ratio position, the decreased governor output pressure in the high ratio position of said second shiftable valve causing said first shiftable valve to return to its low ratio position when said second valve is moved from its low ratio position to its high ratio position.

11. In transmission mechanism, the combination of a drive shaft, a driven shaft, an intermediate shaft, a main transmission unit connected between said drive and intermediate shafts, an auxiliary transmission unit connected between said intermediate and driven shafts, each of said transmission units providing low and high speed ratio drives therethrough, means for changing each of said units from its low ratio to its high ratio and including a shiftable valve having a low ratio position and a high ratio position for controlling the ratio changnig of the respective units, and a hydraulic governor driven by said driven shaft and providing a governor pressure increasing with driven shaft speed and impressed on each of said valves tending to move the valve from its low ratio position to its high ratio position, said valves being so arranged that the valve for said main unit is moved first by said governor pressure and subsequently the valve for said auxiliary unit is moved by the governor pressure as the driven shaft speed increases.

12. In transmission mechanism for an automotive vehicle having a driving engine with a throttle, the combination of a drive shaft, a driven shaft, an intermediate shaft, a main transmission unit between said drive and intermediate shafts, an auxiliary transmission unit between said intermediate and driven shafts, each of said transmission units providing low and high ratios therethrough, control mechanism for changing each of said transmission units from its low ratio to its high ratio and including a shiftable valve for each of the units having a low ratio position and a high ratio position, a hydraulic governor driven by said driven shaft and providing a governor pressure that increases with driven shaft speed that is impressed on said shiftable valves tending to move them from their low ratio positions to their high ratio positions, said valves being so arranged that said valve for said main unit is moved first and the valve for said auxiliary unit is moved subsequently on increasing governor pressure, an accelerator for the vehicle, and means under the control of said accelerator for providing a pressure that increases with the opening of the engine throttle and which is impressed on said shiftable valves tending to hold them from movement from their said low speed ratio positions to their high ratio positions.

13. In transmission mechanism for an automotive vehicle having a driving engine with a throttle, the combination of a drive shaft, a driven shaft, an intermediate shaft, a main transmission unit connected between said drive and intermediate shafts, an auxiliary transmission unit connected between said intermediate and driven shafts, each of said units providing low and high ratios therethrough, control mechanism for each of said units for changing the respective unit from its low ratio to its high ratio and including a shiftable control valve for each of the units having a low ratio and a high ratio position, governor mechanism driven by said driven shaft and supplying a governor pressure that increases with increasing speed of said driven shaft and which is applied on said shiftable valves tending to move them from their low ratio to their high ratio positions, an accelerator, means under the control of said accelerator for providing a pressure that increases with throttle opening and which is applied on said shiftable valves tending to hold them from moving from their low ratio to their high ratio positions, said valves being so arranged that the valve for said main unit shifts first with increasing governor pressure and then subsequently said valve for said auxiliary unit shifts with increasing governor pressure, and means under the control of said valve for said auxiliary unit for decreasing the governor pressure impressed on the other valve to a predetermined proportion of its original value when the shiftable valve for said auxiliary unit is shifted into its high ratio position so that said shiftable valve for said main unit is returned to its low ratio position to downshift the main unit back again to its low ratio condition.

14. In transmission mechanism for an automotive vehicle having a driving engine with a throttle, the combination of a drive shaft, a driven shaft, an intermediate shaft, a main transmission unit connected between said drive and intermediate shafts, an auxiliary transmission unit connected between said intermediate and driven shafts, each of said units providing low and high ratios therethrough, control mechanism for changing each of said transmission units from its low ratio to its high ratio and including a shiftable valve having a low ratio position and a high ratio position, a hydraulic governor mechanism driven by said driven shaft and providing a pressure that increases with driven shaft speed and which is applied onto said shiftable valves tending to move them from their low ratio positions to their high ratio positions, said shiftable valves being so arranged that the shiftable valve for said main transmission unit is first shifted from its low ratio position to its high ratio position as the governor pressure increases and subsequently the shiftable valve for said auxiliary unit is shifted from its low ratio position to its high ratio positon as the pressure of said governor increases, means for completing a reverse drive through said main unit, and means under the control of said reverse drive completing means for providing a pressure on said shiftable valves holding them in their low ratio positions when the reverse drive is completed.

15. In transmission mechanism, the combination of a drive shaft, a driven shaft, an intermediate shaft, a main transmission unit connected between said drive and intermediate shafts, an auxiliary transmission unit connected between said intermediate and driven shafts, each of said units providing low and high ratios therethrough, control mechanism for changing each of said transmission units between its low and high ratios and including a control valve having a low ratio position and a high ratio position, a hydraulic governor driven by said driven shaft and providing a fluid pressure that increases with driven shaft speed and which is applied on the shiftable valve for said main unit tending to move the shiftable valve from its low ratio position to its high ratio position, a regulator valve actuated by the fluid pressure from said governor providing a higher governed fluid pressure that increases with the output pressure of the governor but at a higher rate, and a transition valve under the control of said shiftable valve for said auxiliary unit for applying said higher speed responsive pressure on said shiftable valve for said main unit when the shiftable valve for the auxiliary unit is in its low ratio position.

16. In transmission mechanism, the combination of a drive shaft, a driven shaft, means for providing a low speed power train between said shafts and including a fluid pressure engaged friction engaging device for completing the power train, means for providing a high speed power train between said shafts and including a second fluid pressure engaged friction engaging device for completing the power train, a source of fluid pressure, hydraulic governor mechanism driven by said driven shaft and providing a governed pressure that increases with the speed of said driven shaft, means for alternatively supplying fluid pressure to said low and high speed friction devices from said source and including a transition valve that has a low speed position in which it drains said high speed friction device and a high speed position in which it connects said pressure source and said high speed friction device, and conduit means connecting said transition valve and said hydraulic governor mechanism for applying the governed pressure that increases with driven shaft speed on such a face of said transition valve to tend to move said valve into its low speed position.

17. In transmission mechanism, the combination of a drive shaft, a driven shaft, means for providing a low speed power train between said shafts and including a fluid pressure engaged friction brake for completing the power train, means for providing a high speed power train between said shafts and including a fluid pressure engaged friction clutch for completing the power train, a source of fluid pressure, hydraulic governor mechanism driven by said driven shaft and providing a governor fluid pressure that increases with the speed of said driven shaft, means for alternatively connecting said pressure source with either said clutch or brake and draining the other for applying one or the other, said last-named means including a shiftable valve having a low speed position for draining the clutch in this position and having a high speed position for connecting said pressure source and the clutch in the latter position, a spring for yieldably holding said shiftable valve in its high speed position, and conduit means connecting said hydraulic governor mechanism and said shiftable valve so that said governor pressure tends to hold said valve in its low speed position against the action of said spring.

18. In transmission mechanism, the combination of a drive shaft, a driven shaft, an intermediate shaft, a main transmission unit connected between said drive and intermediate shafts and an auxiliary transmission unit connected between said intermediate and driven shafts, each of said transmission units providing a low and a high speed ratio therethrough, a shiftable control element for shifting the drive in said auxiliary unit and having a low ratio and a high ratio position, a shiftable control element for causing changes between the drives in said main transmission unit and having a low ratio and a high ratio position, a governor driven by said driven shaft and providing a force that increases with driven shaft speed and which is applied on said shiftable elements so that as the driven shaft speed decreases the shiftable element for said main unit first causes a downshift in the main unit and then the shiftable element for said auxiliary unit causes a downshift in the auxiliary unit, mechanism under the control of said auxiliary unit for providing an increased governor force when the auxiliary unit is in low speed ratio and which is applied on said shiftable element for said main unit so that said last-named shiftable element is moved to upshift the main unit when the auxiliary unit downshifts, said shiftable element for said main unit subsequently again causing a downshifting from high speed ratio in the main unit to low speed ratio therein as the driven shaft subsequently decreases in speed still further, and interlock mechanism under the control of said auxiliary unit for locking said shiftable element for said main unit in its downshifted position once the said shiftable element moves into this position as last-mentioned.

19. In transmission mechanism, the combination of a drive shaft, a driven shaft, an intermediate shaft, a main transmission unit providing a low ratio and an intermediate ratio and a high ratio and connected between said intermediate and drive shafts, an auxiliary transmission unit providing a low ratio and a high ratio and connected between said intermediate and driven shafts, fluid pressure engaged friction engaging devices for completing the various drives through said units, a source of fluid pressure, a first shiftable control valve for said main unit having low and intermediate speed positions, a second shiftable control valve for said main unit having intermediate speed and high speed positions, a third shiftable control valve which is for said auxiliary unit and has a low speed and a high speed position, a hydraulic governor driven by said driven shaft and providing a governor output pressure that increases with driven shaft speed and which is applied onto said shiftable valves so that first said second shiftable valve and then said first shiftable valve and finally said third shiftable valve downshift as the speed of said driven shaft decreases and said governor pressure decreases, a regulating valve for providing a second higher governor pressure that increases with said first-named governor pressure, valve means under the control of said auxiliary unit for applying said increased governor pressure on said first and second valves when said third valve for said auxiliary unit shifts into its low speed position so as then to cause upshifting movement of said first and second valves, said second and first valves subsequently downshifting with further reductions in driven shaft speed and governor pressure, a manual control valve for said main unit having a low range position, and interlock valve mechanism under the control of said manual valve and under the control of said auxiliary unit for applying a pressure on said first and second valves respectively holding the latter valves in their downshifted positions once they have moved into these positions as last mentioned with decreasing driven shaft speed when the manual control valve is in its low range position.

20. In transmission mechanism, the combination of a drive shaft, a driven shaft, a main transmission unit and an auxiliary transmission unit connected in series between said shafts and each of which provides low and high ratios therethrough, hydraulically actuated control mechanism for each of said transmission units for changing it from its high ratio to its low ratio, said control mechanisms comprising a source of fluid pressure and a valve for each of the transmission units having a low ratio position and a high ratio position, a valve element operable to hold the valve for said auxiliary control mechanism in one ratio position, a hydraulic means interconnecting said control mechanism for said main transmission and said valve element, a hydraulic governor mechanism driven by said driven shaft for providing a governed pressure that changes with driven shaft speed, and a hydraulic means interconnecting said governor and said valve element, both of said hydraulic interconnecting means being operable on said valve element for holding the valve for said auxiliary unit in its high ratio position when the valve for the main unit is in its low ratio position.

References Cited in the file of this patent

UNITED STATES PATENTS

| | | |
|---|---|---|
| 2,292,633 | Griswold | Aug. 11, 1942 |
| 2,555,702 | Railton | June 5, 1951 |
| 2,693,260 | Lucia | Nov. 2, 1954 |
| 2,740,304 | Sheppard | Apr. 3, 1956 |
| 2,895,344 | Holdeman | July 21, 1959 |